(12) United States Patent
Hsia et al.

(10) Patent No.: US 12,742,931 B2
(45) Date of Patent: Sep. 22, 2026

(54) OPTICAL DEVICE AND METHOD OF MANUFACTURE

(71) Applicant: Taiwan Semiconductor Manufacturing Co., Ltd., Hsinchu (TW)

(72) Inventors: Hsing-Kuo Hsia, Jhubei City (TW); Jui Lin Chao, New Taipei City (TW); Chen-Hua Yu, Hsinchu (TW); Chih-Hao Yu, Tainan City (TW); Shih-Peng Tai, Xinpu Township (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 493 days.

(21) Appl. No.: 18/153,661

(22) Filed: Jan. 12, 2023

(65) Prior Publication Data

US 2024/0103218 A1 Mar. 28, 2024

Related U.S. Application Data

(60) Provisional application No. 63/377,096, filed on Sep. 26, 2022.

(51) Int. Cl.
*G02B 6/122* (2006.01)
*G02B 6/12* (2006.01)
*G02B 6/13* (2006.01)

(52) U.S. Cl.
CPC ............... *G02B 6/122* (2013.01); *G02B 6/13* (2013.01); *G02B 2006/12121* (2013.01)

(58) Field of Classification Search
CPC G02B 6/132; G02B 6/12002; G02B 6/12004; G02B 6/13; G02B 6/1347; G02B 6/122
See application file for complete search history.

(56) References Cited

U.S. PATENT DOCUMENTS 8,260,151 B2 9/2012 Pelley et al.
10,162,139 B1 12/2018 Wang et al.
10,393,959 B1 8/2019 Razdan et al.
10,672,820 B2 6/2020 Tsai
2005/0025199 A1 2/2005 Ma
2012/0183009 A1 7/2012 Adachi et al.
2016/0013866 A1* 1/2016 Doerr ........................ G02B 6/00 398/139
2017/0317471 A1 11/2017 Lor et al.
2018/0143374 A1* 5/2018 Coolbaugh ....... H01L 23/49822
2019/0331941 A1 10/2019 Coolbaugh et al.
2019/0379177 A1 12/2019 Menezo et al.
(Continued)

FOREIGN PATENT DOCUMENTS

KR 20060094224 A 8/2006
KR 20190059857 A 5/2019
(Continued)

*Primary Examiner* — Michael P Mooney
(74) *Attorney, Agent, or Firm* — Slater Matsil, LLP

(57) ABSTRACT

Optical devices and methods of manufacture are presented in which a laser die or other heterogeneous device is embedded within an optical device and evanescently coupled to other devices. The evanescent coupling can be performed either from the laser die to a waveguide, to an external cavity, to an external coupler, or to an interposer substrate.

20 Claims, 71 Drawing Sheets

(56) References Cited

U.S. PATENT DOCUMENTS

| | | | |
|---|---|---|---|
| 2021/0091056 | A1 | 3/2021 | Yu et al. |
| 2021/0126429 | A1 | 4/2021 | Venkatesan |
| 2021/0215897 | A1 | 7/2021 | Epitaux et al. |
| 2022/0263582 | A1 | 8/2022 | Ma et al. |

FOREIGN PATENT DOCUMENTS

| | | | |
|---|---|---|---|
| KR | 20190101362 | A | 8/2019 |
| TW | 200950077 | A | 12/2009 |
| TW | 201911503 | A | 3/2019 |
| WO | 2020062704 | A1 | 4/2020 |

* cited by examiner 105
103
101
100

203
103
101
100
201

625
626
603
600
600

625
626
603
627
600
600

626
603
600
627
B'
B'
600

627
626
603
625
602

OPTICAL DEVICE AND METHOD OF MANUFACTURE

PRIORITY CLAIM AND CROSS-REFERENCE

This application claims the benefit of U.S. Provisional Application No. 63/377,096, filed on Sep. 26, 2022, which application is hereby incorporated herein by reference.

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating long-range optical components and short-range electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 14A-20F illustrate formation of the first optical package with an external cavity, in accordance with some embodiments.

FIGS. 21A-27K illustrate formation of a first transmission device and second transmission device with a first external coupler and a second external coupler, in accordance with some embodiments.

DETAILED DESCRIPTION

Figures 1, 2:
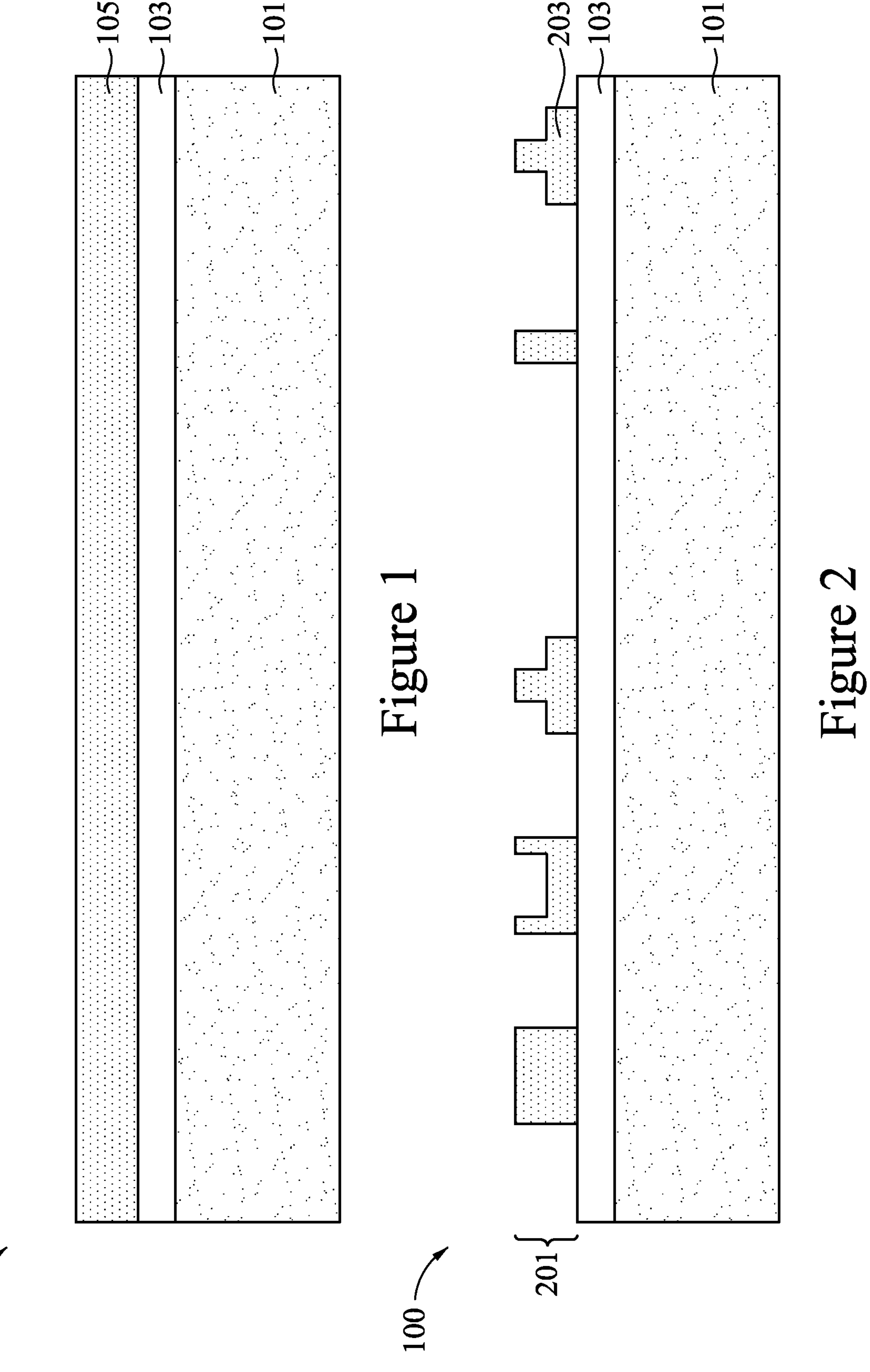
FIGS. 1-10G illustrate formation of a first optical package with an embedded laser die, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments will now be discussed with respect to certain embodiments in which one or more laser dies are embedded within a compact universal photonic engine (COUPE) and light from the laser dies is evanescently coupled to other optical devices. However, the embodiments presented herein are intended to be illustrative and are not intended to limit the embodiments to the precise descriptions as discussed. Rather, the embodiments discussed may be incorporated into a wide variety of implementations, and all such implementations are fully intended to be included within the scope of the embodiments.

With reference now to FIG. 1, there is illustrated an initial structure of an optical interposer 100 (seen in FIG. 5), in accordance with some embodiments. In the particular embodiment illustrated in FIG. 1, the optical interposer 100 is a photonic integrated circuit (PIC) and comprises at this stage a first substrate 101, a first insulator layer 103, and a layer of material 105 for a first active layer 201 of first optical components 203 (not separately illustrated in FIG. 1 but illustrated and discussed further below with respect to FIG. 2). In an embodiment, at a beginning of the manufacturing process of the optical interposer 100, the first substrate 101, the first insulator layer 103, and the layer of material 105 for the first active layer 201 of first optical components 203 may collectively be part of a silicon-on-insulator (SOI) substrate. Looking first at the first substrate 101, the first substrate 101 may be a semiconductor material such as silicon or germanium, a dielectric material such as glass, or any other suitable material that allows for structural support of overlying devices.

The first insulator layer 103 may be a dielectric layer that separates the first substrate 101 from the overlying first active layer 201 and can additionally, in some embodiments, serve as a portion of cladding material that surrounds the subsequently manufactured first optical components 203 (discussed further below). In an embodiment the first insulator layer 103 may be silicon oxide, silicon nitride, germanium oxide, germanium nitride, combinations of these, or the like, formed using a method such as implantation (e.g., to form a buried oxide (BOX) layer) or else may be deposited onto the first substrate 101 using a deposition method such as chemical vapor deposition, atomic layer deposition, physical vapor deposition, combinations of these, or the like. However, any suitable material and method of manufacture may be used.

The material 105 for the first active layer 201 is initially (prior to patterning) a conformal layer of material that will be used to begin manufacturing the first active layer 201 of the first optical components 203. In an embodiment the material 105 for the first active layer 201 may be a translucent material that can be used as a core material for the desired first optical components 203, such as a semiconductor material such as silicon, germanium, silicon germanium, combinations of these, or the like, while in other embodiments the material 105 for the first active layer 201 may be a dielectric material such as silicon nitride or the like, although in other embodiments the material 105 for the first active layer 201 may be III-V materials, lithium niobate materials, or polymers. In embodiments in which the material 105 of the first active layer 201 is deposited, the material 105 for the first active layer 201 may be deposited using a method such as epitaxial growth, chemical vapor deposition, atomic layer deposition, physical vapor deposition, combinations of these, or the like. In other embodiments in which the first insulator layer 103 is formed using an implantation method, the material 105 of the first active layer 201 may initially be part of the first substrate 101 prior to the implantation process to form the first insulation layer 103. However, any suitable materials and methods of manufacture may be utilized to form the material 105 of the first active layer 201.

FIG. 2 illustrates that, once the material 105 for the first active layer 201 is ready, the first optical components 203 for the first active layer 201 are manufactured using the material 105 for the first active layer 201. In embodiments the first optical components 203 of the first active layer 201 may include such components as optical waveguides (e.g., ridge waveguides, rib waveguides, buried channel waveguides, diffused waveguides, etc.), couplers (e.g., grating couplers, edge couplers that are a narrowed waveguide with a width of between about 1 nm and about 200 nm, etc.), directional couplers, optical modulators (e.g., Mach-Zehnder silicon-photonic switches, microelectromechanical switches, micro-ring resonators, etc.), amplifiers, multiplexors, demultiplexors, optical-to-electrical converters (e.g., P-N junctions), electrical-to-optical converters, lasers, combinations of these, or the like. However, any suitable first optical components 203 may be used.

To begin forming the first active layer 201 of first optical components 203 from the initial material, the material 105 for the first active layer 201 may be patterned into the desired shapes for the first active layer 201 of first optical components 203. In an embodiment the material 105 for the first active layer 201 may be patterned using, e.g., one or more photolithographic masking and etching processes. However, any suitable method of patterning the material 105 for the first active layer 201 may be utilized. For some of the first optical components 203, such as waveguides or edge couplers, the patterning process may be all or at least most of the manufacturing that is used to form these first optical components 203.

Figures 3, 4:
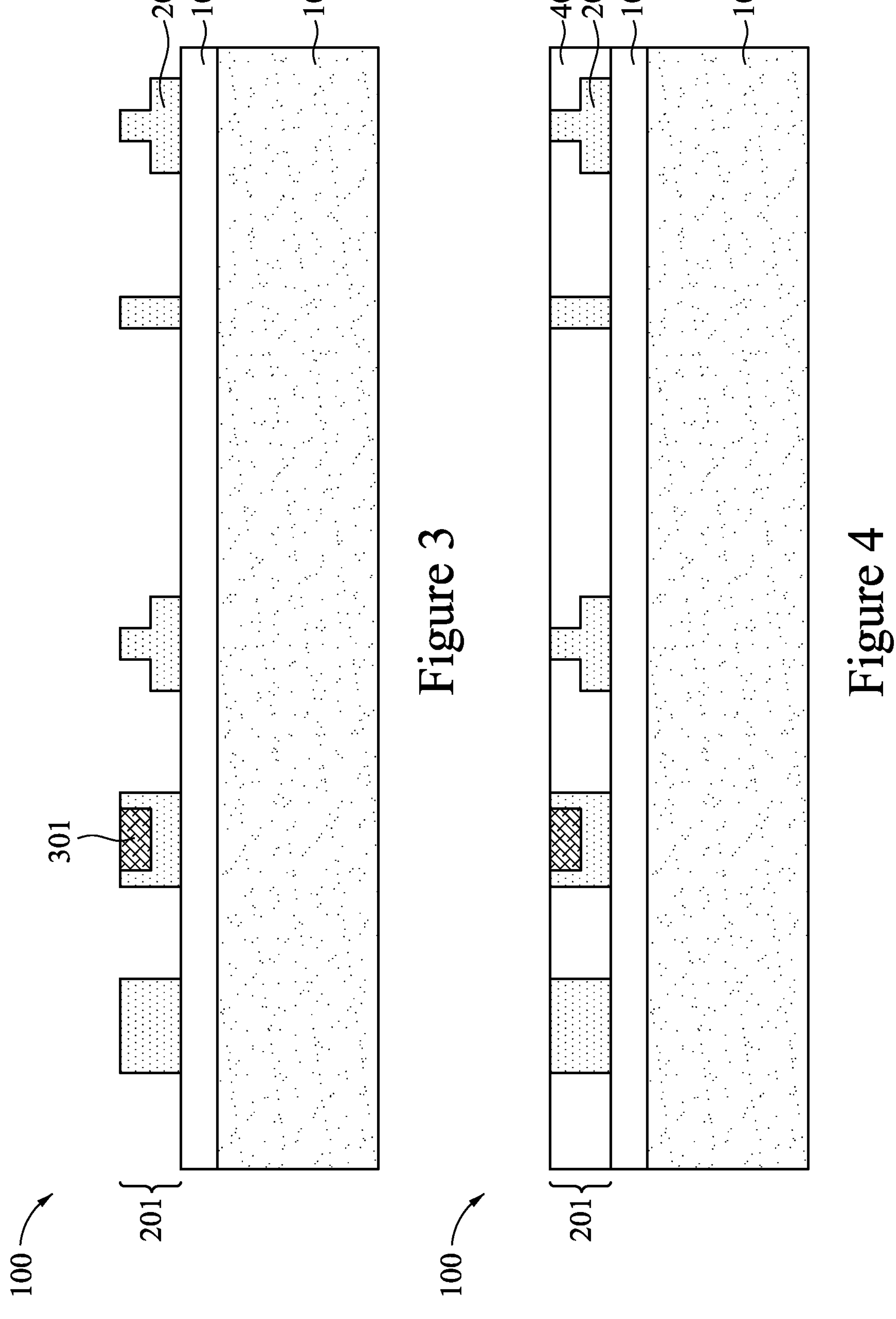

FIG. 3 illustrates that, for those components that utilize further manufacturing processes, such as Mach-Zehnder silicon-photonic switches that utilize resistive heating elements, additional processing may be performed either before or after the patterning of the material for the first active layer 201. For example, implantation processes, additional deposition and patterning processes for different materials (e.g., resistive heating elements, III-V materials for converters), combinations of all of these processes, or the like, can be utilized to help further the manufacturing of the various desired first optical components 203. In a particular embodiment, and as specifically illustrated in FIG. 3, in some embodiments an epitaxial deposition of a semiconductor material 301 such as germanium (used, e.g., for electricity/optics signal modulation and transversion) may be performed on a patterned portion of the material 105 of the first active layer 201. In such an embodiment the semiconductor material 301 may be epitaxially grown in order to help manufacture, e.g., a photodiode for an optical-to-electrical converter. All such manufacturing processes and all suitable first optical components 203 may be manufactured, and all such combinations are fully intended to be included within the scope of the embodiments.

FIG. 4 illustrates that, once the individual first optical components 203 of the first active layer 201 have been formed, a second insulating layer 401 may be deposited to cover the first optical components 203 and provide additional cladding material. In an embodiment the second insulator layer 401 may be a dielectric layer that separates the individual components of the first active layer 201 from each other and from the overlying structures and can additionally serve as another portion of cladding material that surrounds the first optical components 203. In an embodiment the second insulator layer 401 may be silicon oxide, silicon nitride, germanium oxide, germanium nitride, combinations of these, or the like, formed using a deposition method such as chemical vapor deposition, atomic layer deposition, physical vapor deposition, combinations of these, or the like. Once the material of the second insulating layer 401 has been deposited, the material may be planarized using, e.g., a chemical mechanical polishing process in order to either planarize a top surface of the second insulating layer 401 (in embodiments in which the second insulating layer 401 is intended to fully cover the first optical components 203) or else planarize the second insulating layer 401 with top surfaces of the first optical components 203. However, any suitable material and method of manufacture may be used.

Figure 5:
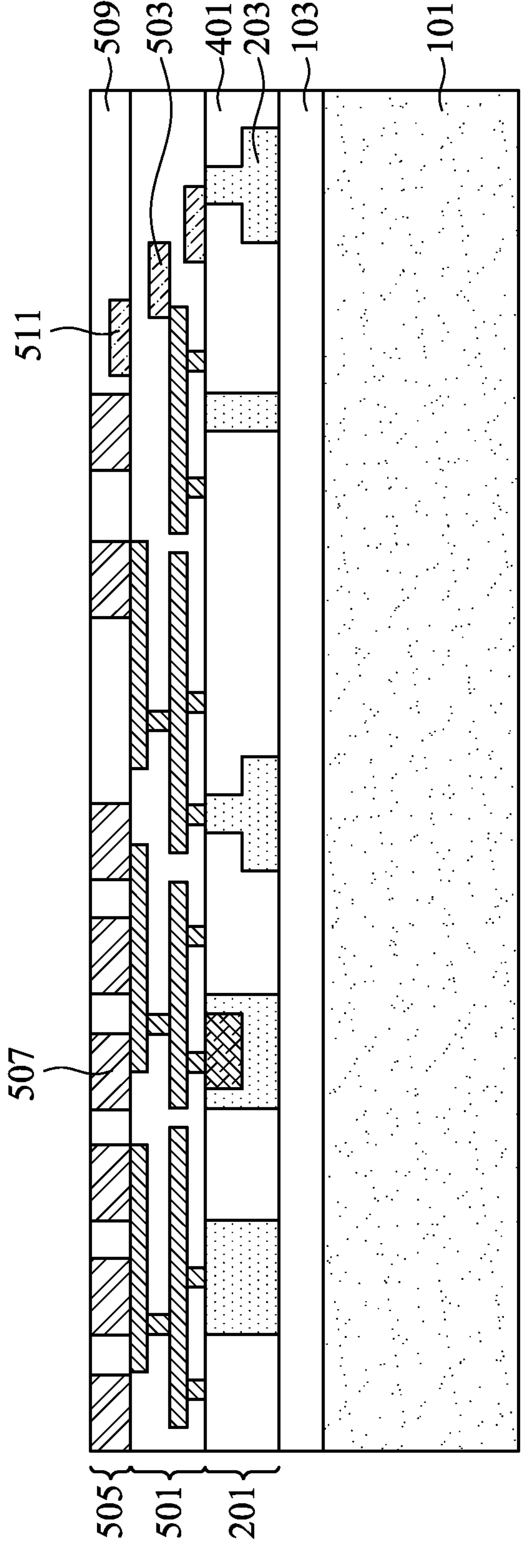

FIG. 5 illustrates that, once the first optical components 203 of the first active layer 201 have been manufactured and the second insulating layer 401 has been formed, first metallization layers 501 are formed in order to electrically connect the first active layer 201 of first optical components 203 to control circuitry, to each other, and to subsequently attached devices (not illustrated in FIG. 5 but illustrated and described further below with respect to FIG. 7). In an embodiment the first metallization layers 501 are formed of alternating layers of dielectric and conductive material and may be formed through any suitable processes (such as deposition, damascene, dual damascene, etc.). In particular embodiments there may be multiple layers of metallization used to interconnect the various first optical components 203, but the precise number of first metallization layers 501 is dependent upon the design of the optical interposer 100.

Additionally, during the manufacture of the first metallization layers 501, one or more second optical components 503 may be formed as part of the first metallization layers 501. In some embodiments the second optical components 503 of the first metallization layers 501 may include such components as couplers (e.g., edge couplers, grating couplers, etc.) for connection to outside signals, optical waveguides (e.g., ridge waveguides, rib waveguides, buried channel waveguides, diffused waveguides, etc.), optical modulators (e.g., Mach-Zehnder silicon-photonic switches, microelectromechanical switches, micro-ring resonators, etc.), amplifiers, multiplexors, demultiplexors, optical-toelectrical converters (e.g., P—N junctions), electrical-to-optical converters, lasers, combinations of these, or the like. However, any suitable optical components may be used for the one or more second optical components 503.

In an embodiment the one or more second optical components 503 may be formed by initially depositing a material for the one or more second optical components 503. In an embodiment the material for the one or more second optical components 503 may be a dielectric material such as silicon nitride, silicon oxide, combinations of these, or the like, or a semiconductor material such as silicon, deposited using a deposition method such as chemical vapor deposition, atomic layer deposition, physical vapor deposition, combinations of these, or the like. However, any suitable material and any suitable method of deposition may be utilized.

Once the material for the one or more second optical components 503 has been deposited or otherwise formed, the material may be patterned into the desired shapes for the one or more second optical components 503. In an embodiment the material of the one or more second optical components 503 may be patterned using, e.g., one or more photolithographic masking and etching processes. However, any suitable method of patterning the material for the one or more second optical components 503 may be utilized.

For some of the one or more second optical components 503, such as waveguides or edge couplers, the patterning process may be all or at least most manufacturing that is used to form these components. Additionally, for those components that utilize further manufacturing processes, such as Mach-Zehnder silicon-photonic switches that utilize resistive heating elements, additional processing may be performed either before or after the patterning of the material for the one or more second optical components 503. For example, implantation processes, additional deposition and patterning processes for different materials, combinations of all of these processes, or the like, and can be utilized to help further the manufacturing of the various desired one or more second optical components 503. All such manufacturing processes and all suitable one or more second optical components 503 may be manufactured, and all such combinations are fully intended to be included within the scope of the embodiments.

Once the one or more second optical components 503 of the first metallization layers 501 have been manufactured, a first bonding layer 505 is formed over the first metallization layers 501. In an embodiment, the first bonding layer 505 may be used for a dielectric-to-dielectric and metal-to-metal bond. In accordance with some embodiments, the first bonding layer 505 is formed of a first dielectric material 509 such as silicon oxide, silicon nitride, or the like. The first dielectric material 509 may be deposited using any suitable method, such as CVD, high-density plasma chemical vapor deposition (HDPCVD), PVD, atomic layer deposition (ALD), or the like. However, any suitable materials and deposition processes may be utilized.

Once the first dielectric material 509 has been formed, first openings in the first dielectric material 509 are formed to expose conductive portions of the underlying layers in preparation to form first bond pads 507 within the first bonding layer 505. Once the first openings have been formed within the first dielectric material 509, the first openings may be filled with a seed layer and a plate metal to form the first bond pads 507 within the first dielectric material 509. The seed layer may be blanket deposited over top surfaces of the first dielectric material 509 and the exposed conductive portions of the underlying layers and sidewalls of the openings and the second openings. The seed layer may comprise a copper layer. The seed layer may be deposited using processes such as sputtering, evaporation, or plasma-enhanced chemical vapor deposition (PECVD), or the like, depending upon the desired materials. The plate metal may be deposited over the seed layer through a plating process such as electrical or electro-less plating. The plate metal may comprise copper, a copper alloy, or the like. The plate metal may be a fill material. A barrier layer (not separately illustrated) may be blanket deposited over top surfaces of the first dielectric material 509 and sidewalls of the openings and the second openings before the seed layer. The barrier layer may comprise titanium, titanium nitride, tantalum, tantalum nitride, or the like.

Following the filling of the first openings, a planarization process, such as a CMP, is performed to remove excess portions of the seed layer and the plate metal, forming the first bond pads 507 within the first bonding layer 505. In some embodiments a bond pad via (not separately illustrated) may also be utilized to connect the first bond pads 507 with underlying conductive portions and, through the underlying conductive portions, connect the first bond pads 507 with the first metallization layers 501.

Additionally, the first bonding layer 505 may also include one or more third optical components 511 incorporated within the first bonding layer 505. In such an embodiment, prior to the deposition of the first dielectric material 509, the one or more third optical components 511 may be manufactured using similar methods and similar materials as the one or more second optical components 503 (described above), such as by being waveguides and other structures formed at least in part through a deposition and patterning process. However, any suitable structures, materials and any suitable methods of manufacture may be utilized.

Figure 6A:
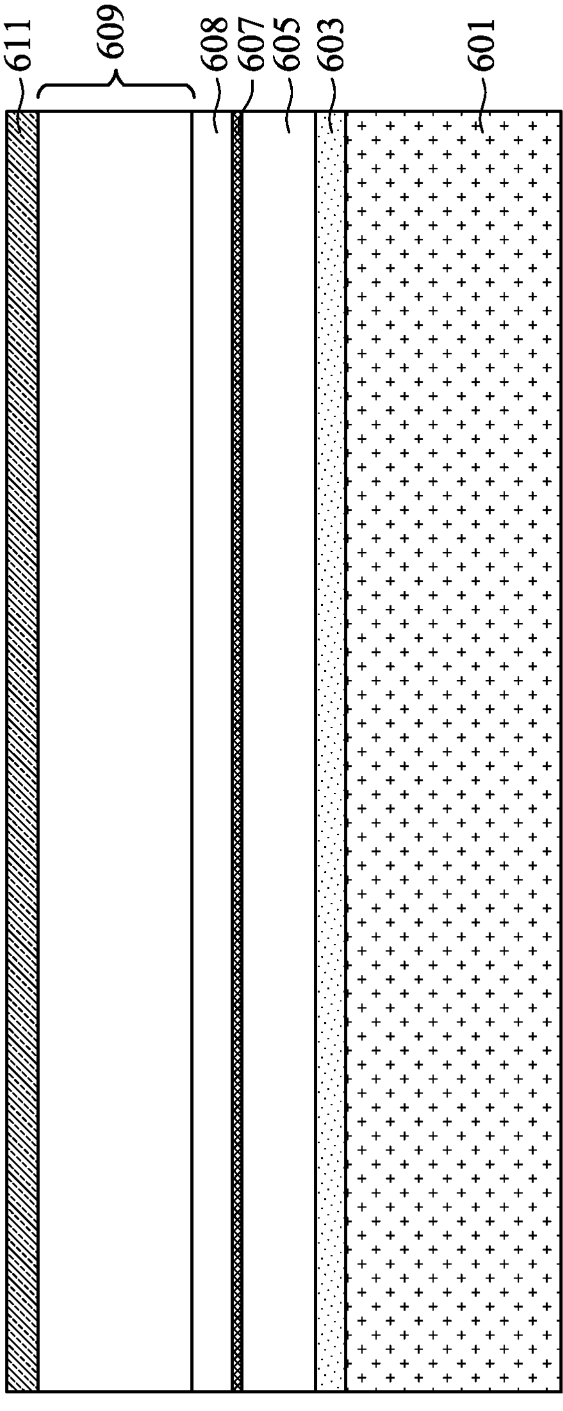
Figure 6B:
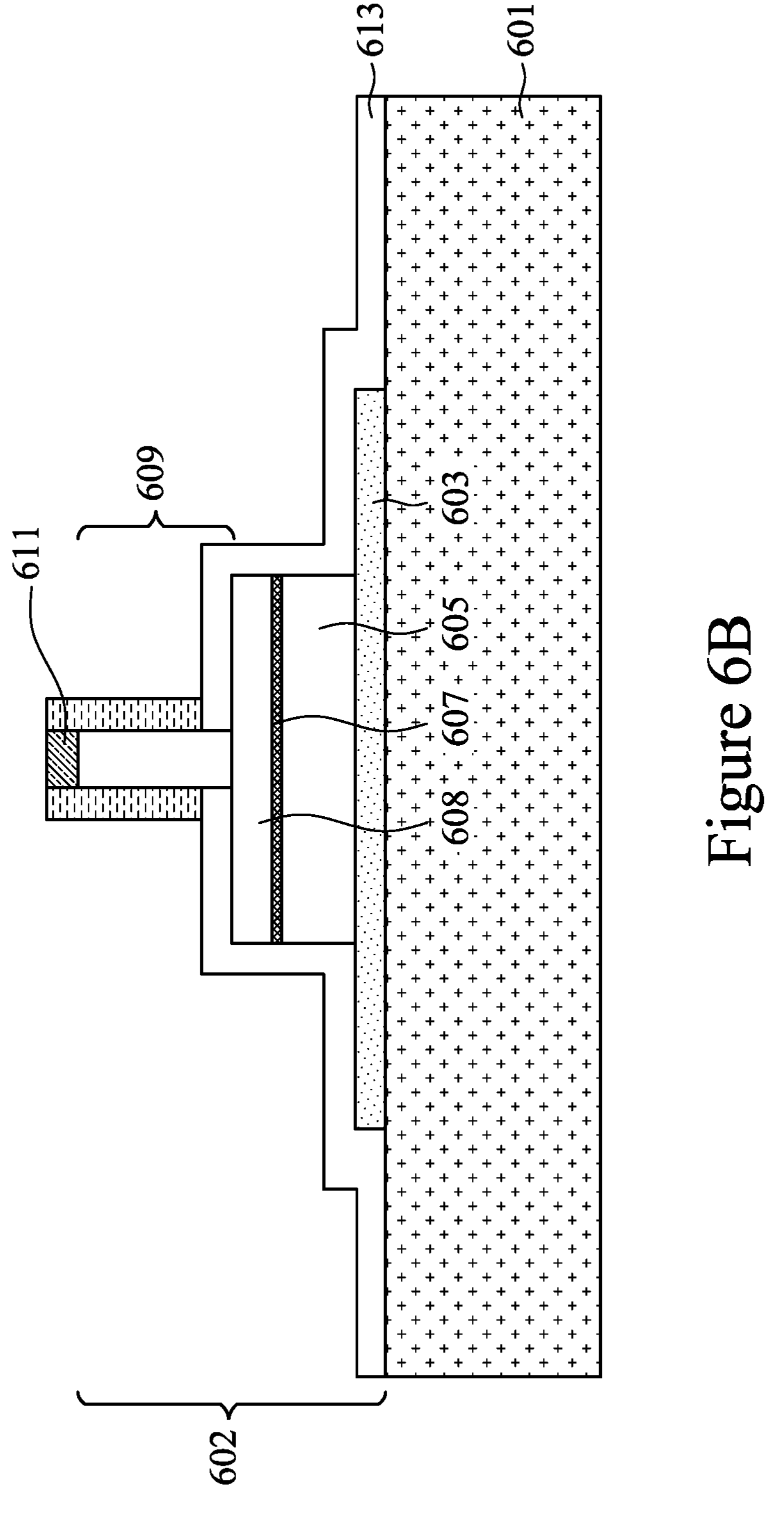
Figure 6C:
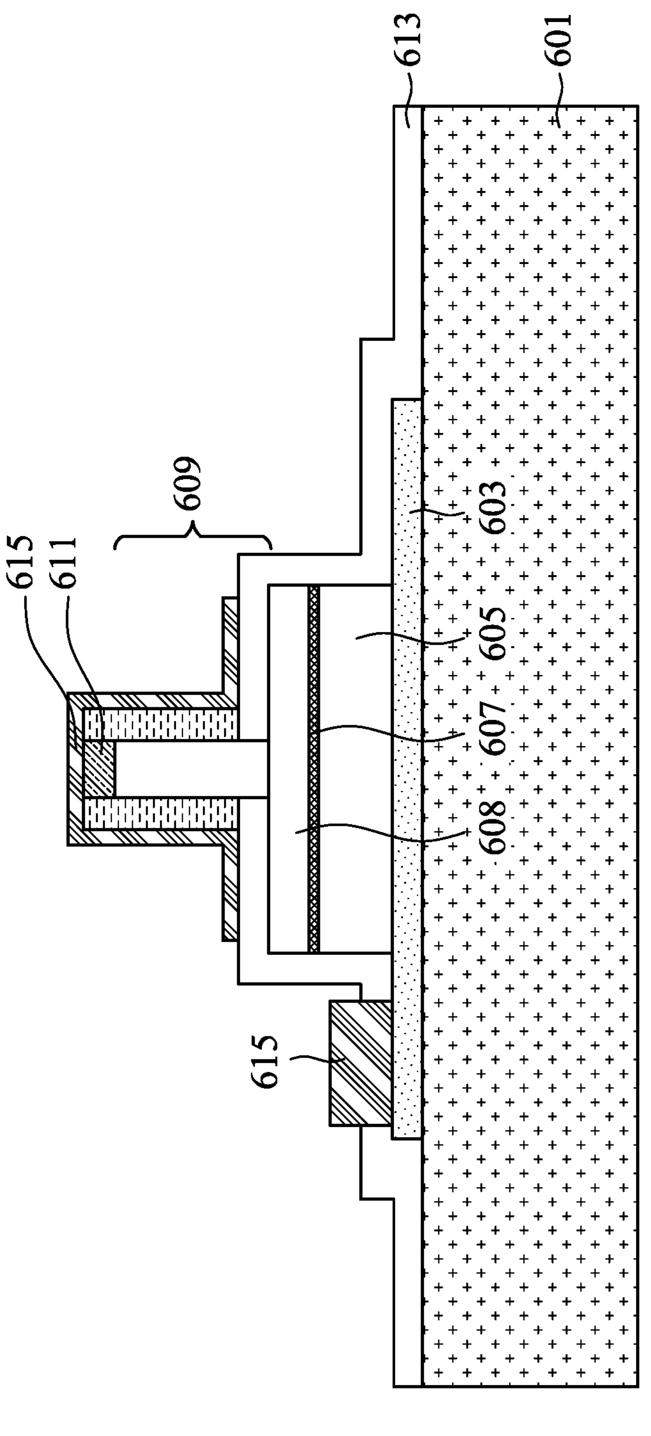
Figure 6D:
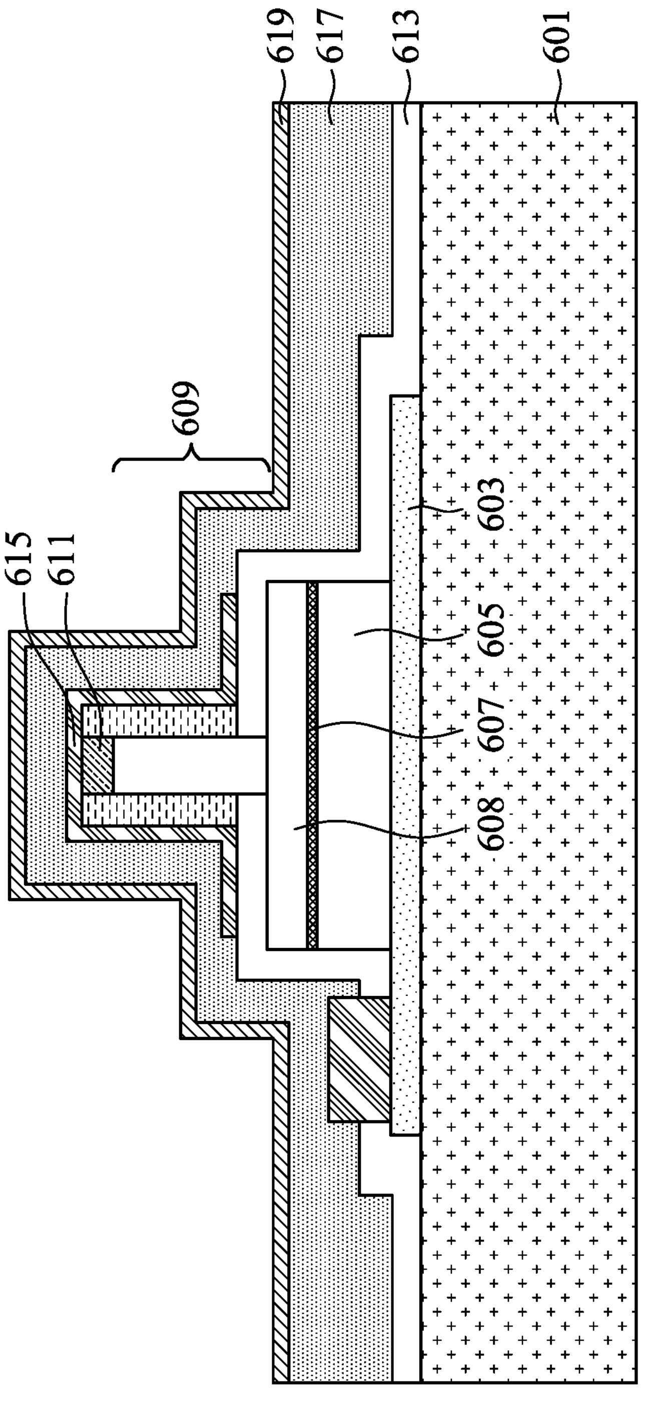
Figure 6E:
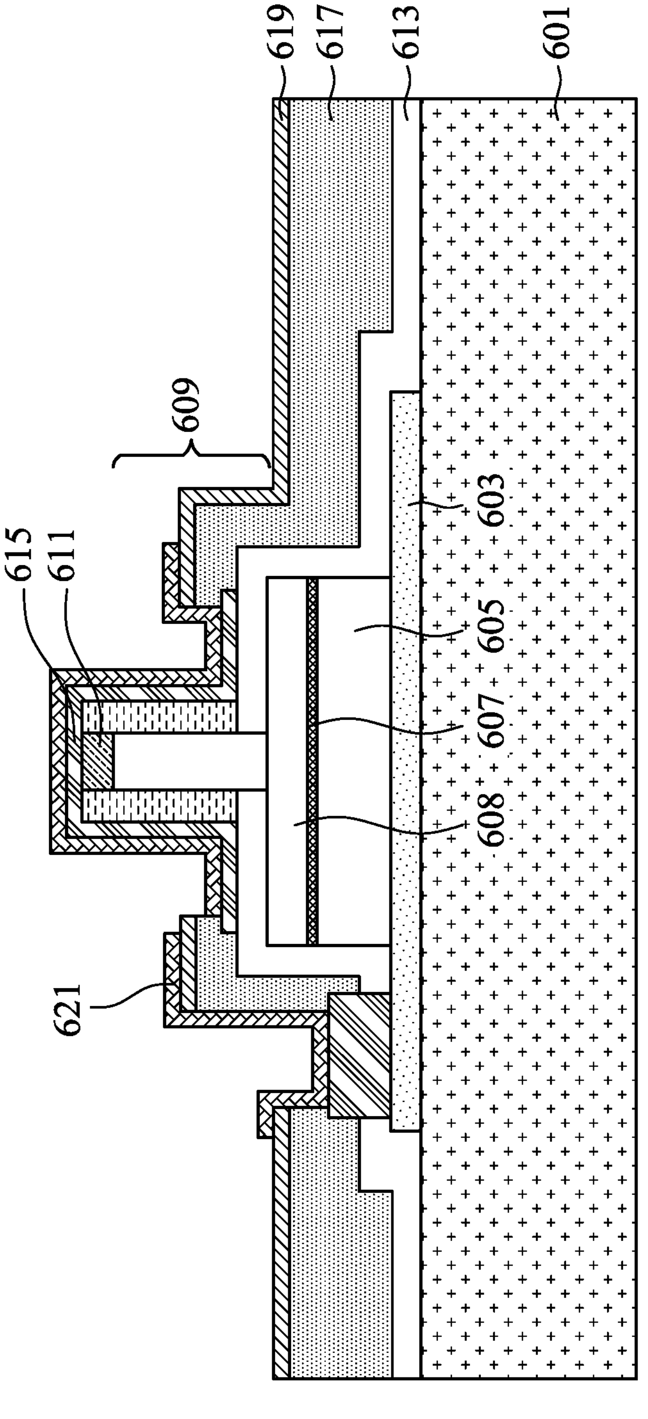
Figure 6F:
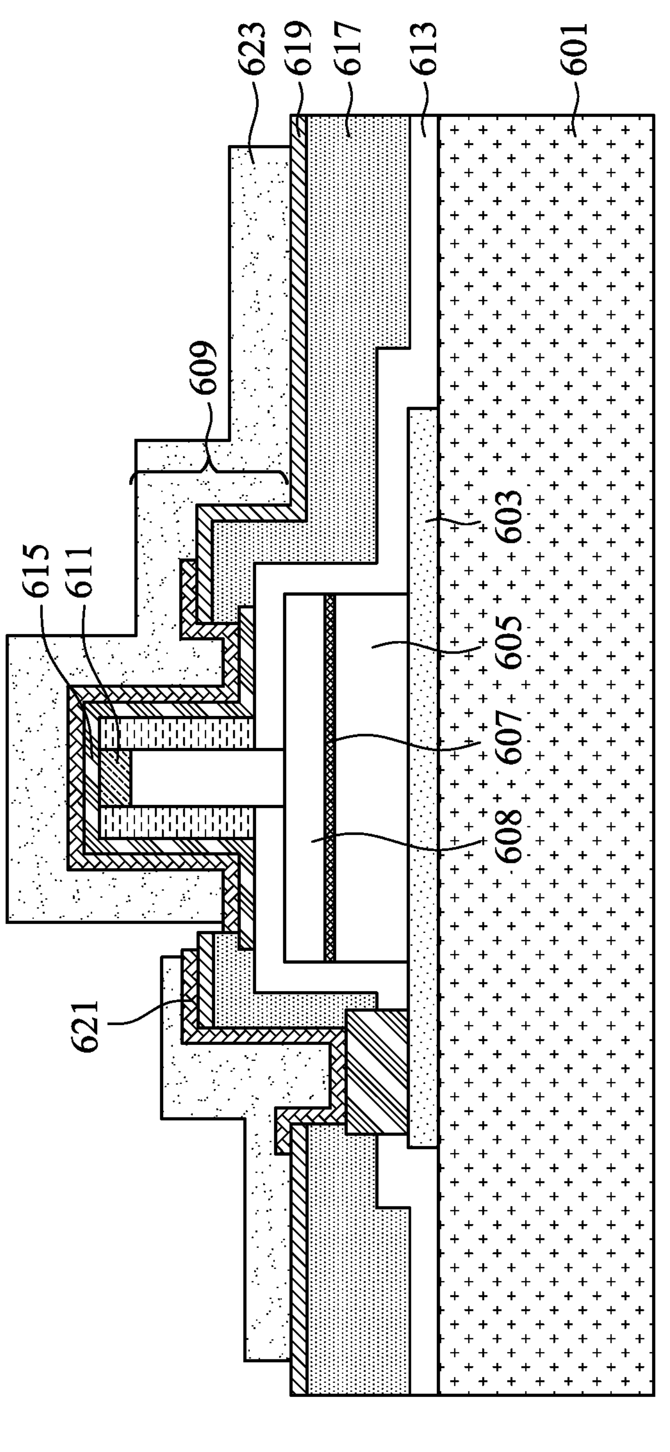
Figure 6G:
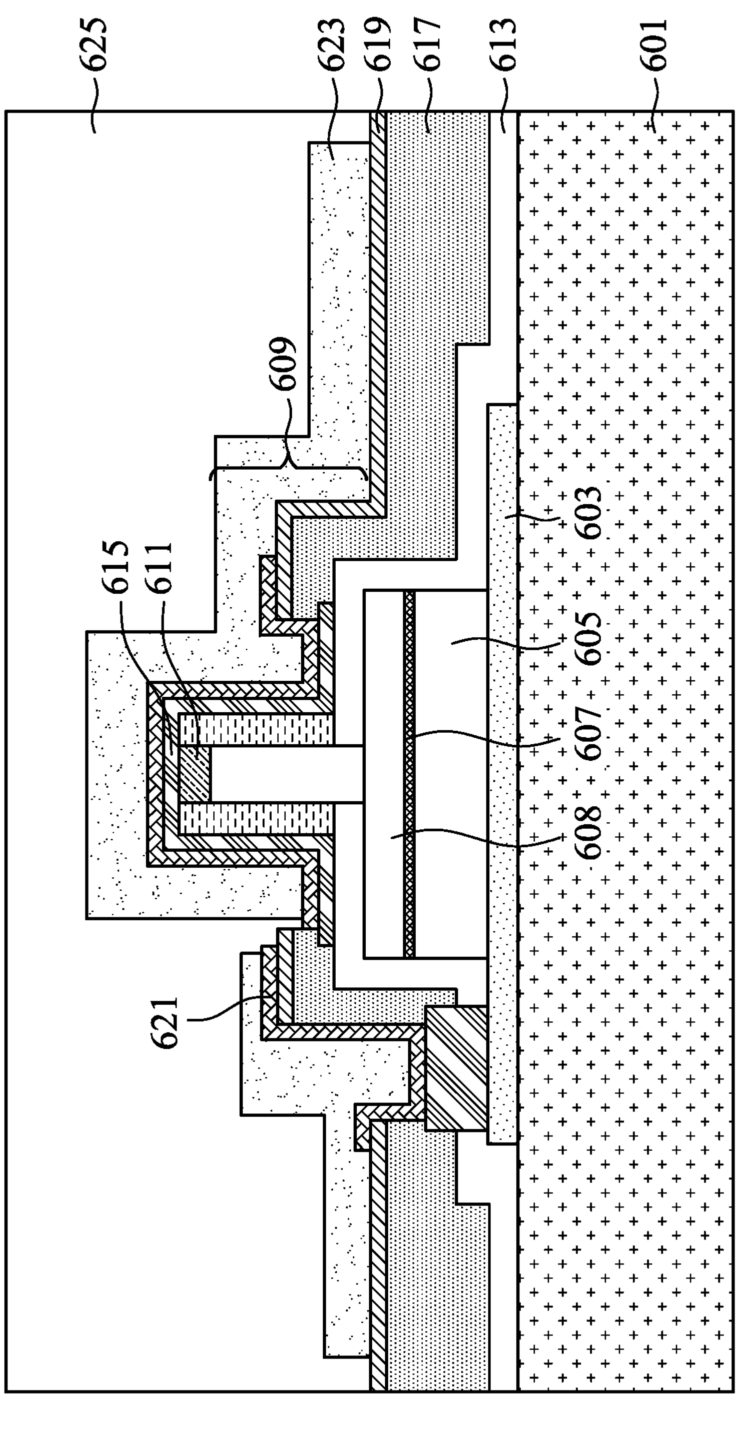
Figures 6H, 6I:
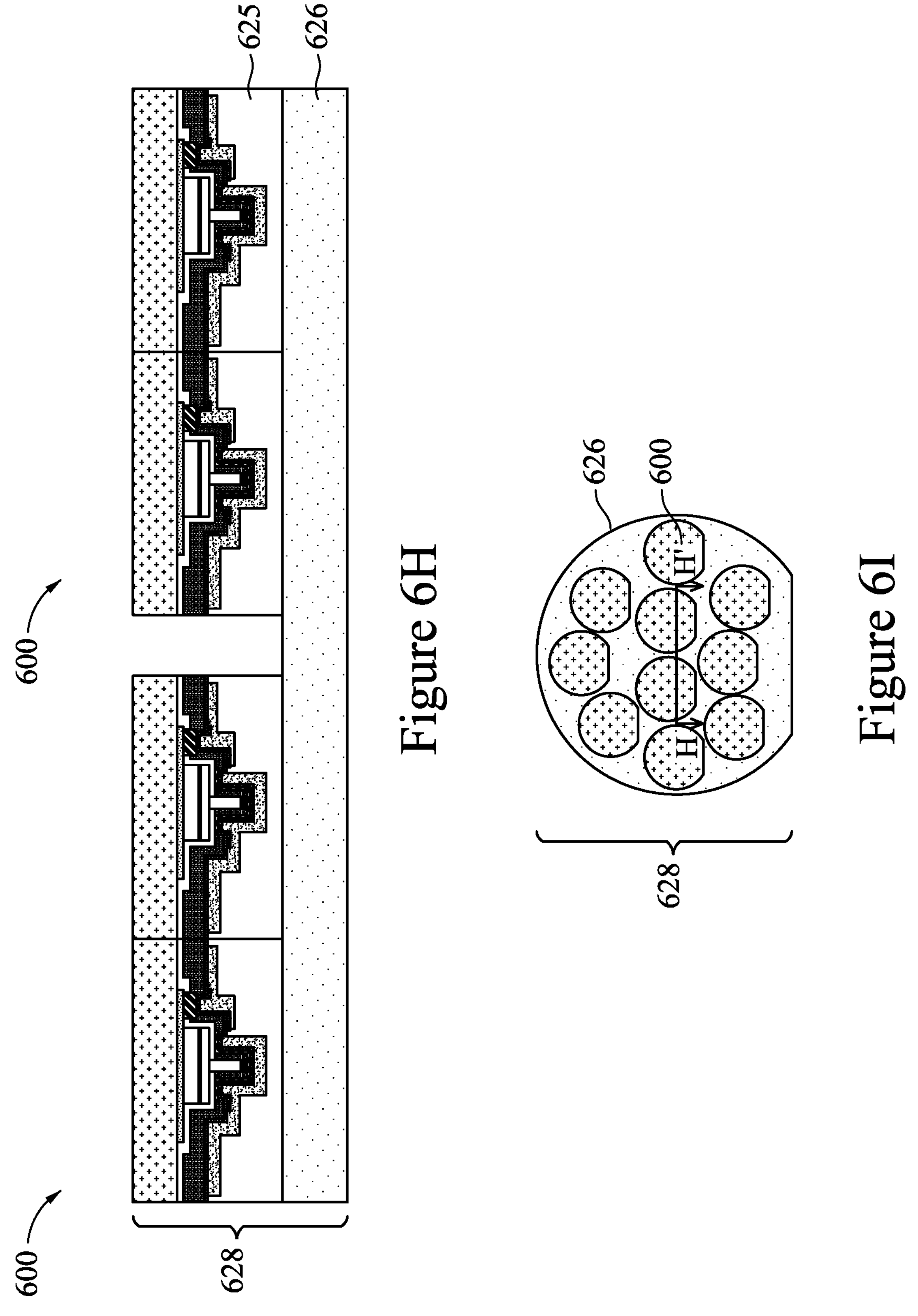
Figures 6J, 6K:
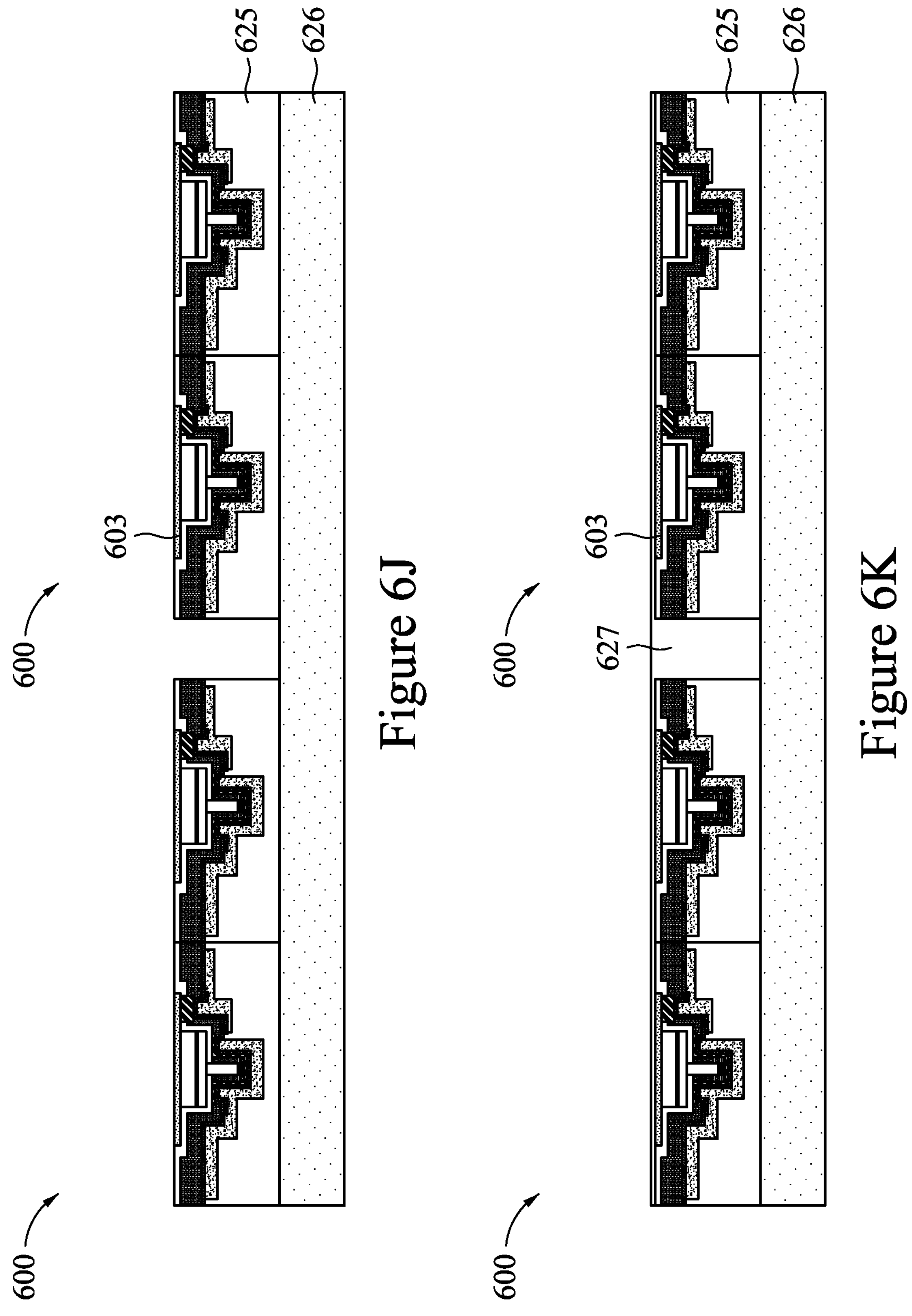
Figures 6L, 6M:
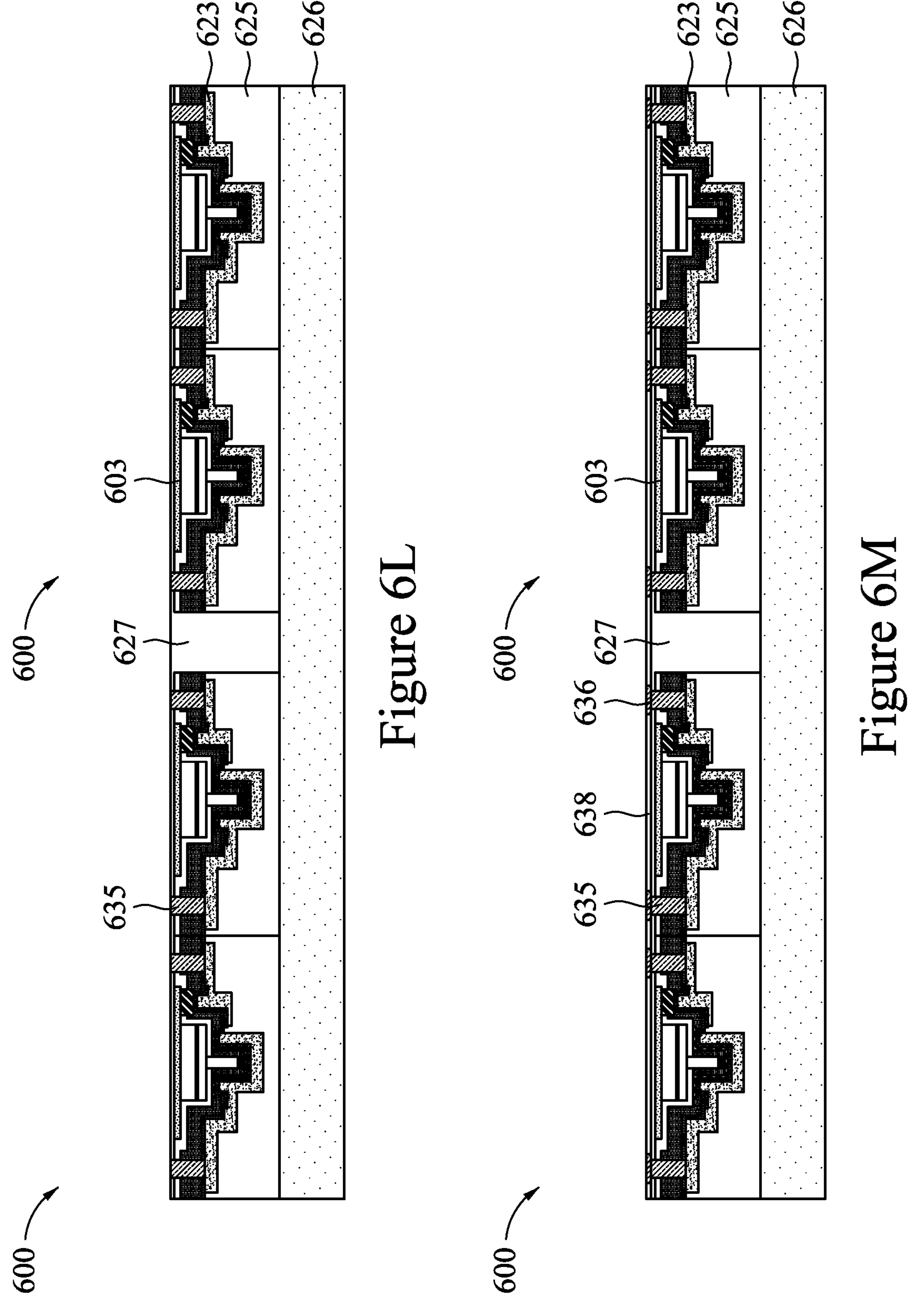
Figures 6N, 6O:
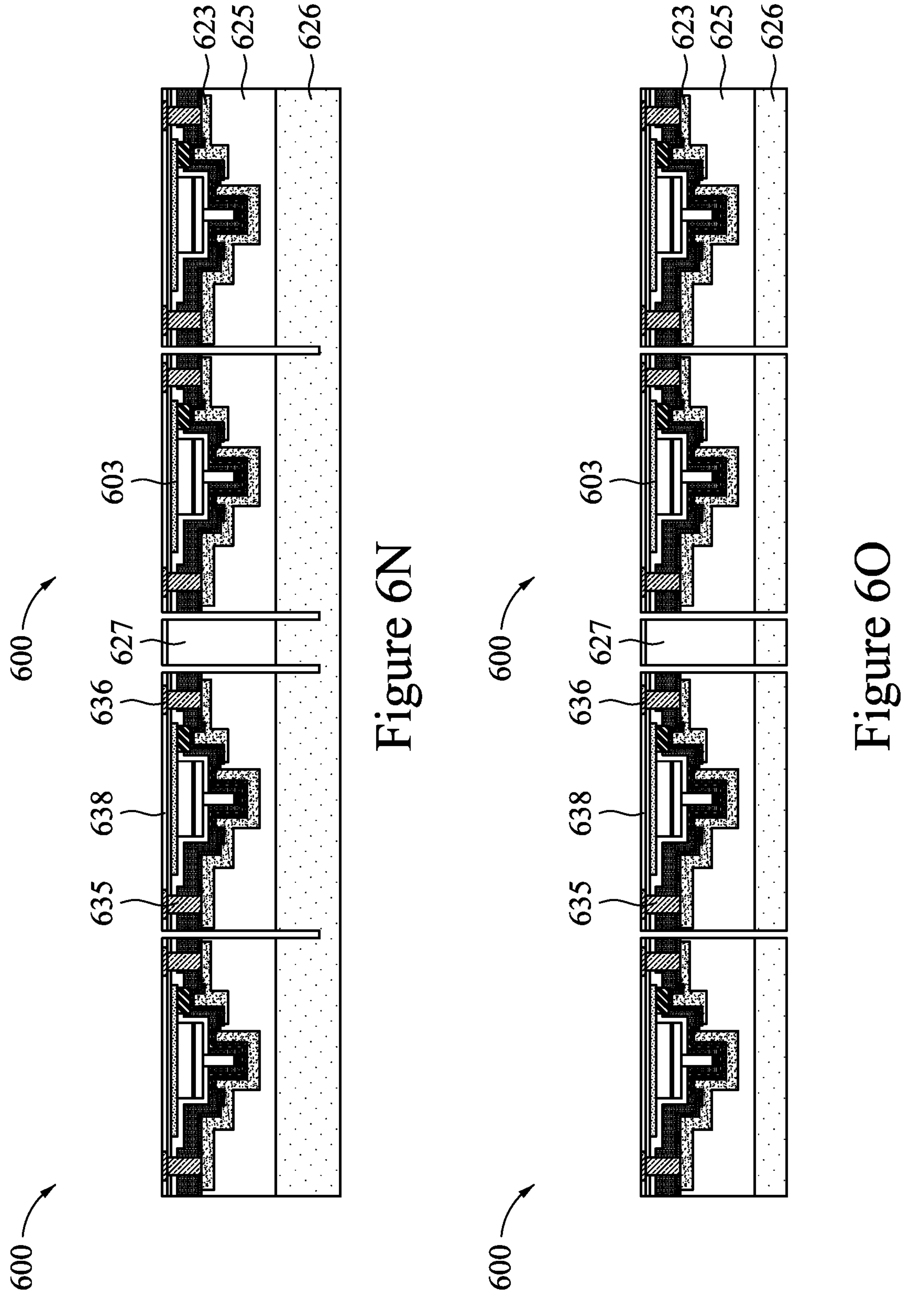

FIGS. 6A-6O illustrate a manufacturing process for formation of a laser die 600 that will be connected to the optical interposer 100. The laser die 600 is utilized to generate light in order to power the other optical components (e.g., the first optical components 203, the second optical components 503, the third optical components 511, etc.), and may comprise light generating structures such as a laser diode 602 (not separately illustrated in FIG. 6A, but illustrated and discussed further below with respect to FIG. 6B). In particular embodiments the laser diode 602 may be a Fabry-Perot Diode, and may be based on III-V materials, II-VI materials, or any other suitable set of materials.

In an embodiment the formation of the laser die 600 may be initiated by forming a first contact 603, a first buffer layer 605, a first active diode layer 607 comprising multiple quantum wells (MQWs), a second buffer layer 608, a ridge material 609, and a second contact 611 over a second substrate 601. In an embodiment the second substrate 601 may be a material that can be used not only for structural support but also may be used as a seed material for epitaxially growing overlying materials and may be, for example, a 2-inch or 4-inch wafer of material. In particular embodiments in which the laser die 600 utilizes III-V materials to form the desired lasers, the second substrate 601 may be a material such as InP, GaAs, or GaSb, while in embodiments in which the laser die 600 utilizes II-VI materials to form the desired lasers, the second substrate 601 may be a material such as GaAs, CdTe, ZnSe. In still further embodiments, the second substrate 601 may be a sapphire or a semiconductor material. All suitable materials may be utilized.

The first contact 603 is formed over the second substrate 601. The first contact 603 forms one part of the laser diode 602 used to emit the desired laser. In an embodiment in which the laser die 600 utilizes III-V compounds, the first contact 603 is a compound such as InP, GaN, InN, AlN, $Al_xGa_{(1-x)}N$, $Al_xIn_{(1-x)}N$, $Al_xIn_yGa_{(1-x-y)}N$, combinations thereof, or the like. Additionally, in embodiments in which the laser die 600 utilizes II-VI compounds, the first contact 603 may still use a III-V material such as GaAs, InP, GaSb, combinations of these, or the like.

Additionally, in order to help form the laser diode 602 (e.g., the n-p diode) to generate the desired laser, the first contact 603 may be doped with a dopant. In embodiments in which the first contact 603 is desired to have an n-type conductivity, the first contact 603 may be doped with an n-type dopant such as phosphorus, arsenic, antimony, bismuth, lithium, combinations of these, or the like. In other embodiments in which the first contact 603 is desired to have a p-type conductivity, the first contact 603 may be doped with p-type dopants such as boron, aluminum, gallium, indium, combinations of these, or the like. However, any suitable dopants may be utilized.

In some embodiments the first contact 603 is formed, for example, through an epitaxial growth process such as molecular beam epitaxy (MBE), although other processes, such as hydride vapor phase epitaxy (HYPE), liquid phase epitaxy (LPE), or the like, may also be utilized. The first contact 603 is preferably doped in situ during formation, although other processes, such as ion implantation or diffusion may be utilized.

The first buffer layer 605 is formed over the first contact 603 and is utilized in order to help the epitaxial growth of overlying layers (e.g., the first active diode layer 607) transition from the material of the first contact 603 to the material of the overlying layer. In an embodiment in which the laser die 600 utilizes III-V compounds, the first buffer layer 605 is a compound such as InGaAsP, InGaAlAs, InGaAs, combinations thereof, or the like. Additionally, in embodiments in which the laser die 600 utilizes II-VI compounds, the first buffer layer 605 may be a II-VI material such as BeMgZnSe, BeZnCdSe, BeTe, combinations of these, or the like. Additionally, the first buffer layer 605 may be deposited using an epitaxial growth process such as molecular beam epitaxy (MBE), although other processes, such as hydride vapor phase epitaxy (HYPE), liquid phase epitaxy (LPE), or the like, may also be utilized, and may be doped in a similar fashion as the first contact 603. However, any suitable material and any suitable method of deposition may be utilized.

The first active diode layer 607 is formed over the first buffer layer 605. The first active diode layer 607 is designed, among other things, to control the generation of light to desired wavelengths. For example, by adjusting and controlling the proportional composition of the elements in the first active diode layer 607, the bandgap of the materials in the first active diode layer 607 may be adjusted, thereby adjusting the wavelength of light that will eventually be emitted.

The first active diode layer 607 comprises multiple quantum wells (MQW). MQW structures in the first active diode layer 607 in embodiments which utilized III-V materials may comprise, for example, layers of InAlGaAs, InGaN, GaN, $Al_xIn_yGa_{(1-x-y)}N$ (where 0<=x<=1), or the like, while in embodiments which utilize II-VI based materials, the first active diode layer 607 may comprise materials such as BeZnCdSe. The first active diode layer 607 may comprise any number of quantum wells, such as 5 to 20 quantum wells, for example. The MQWs are preferably epitaxially grown using the first buffer layer 605 as a nucleation layer using metal organic chemical vapor deposition (MOCVD), although other processes, such as MBE, HYPE, LPE, or the like, may also be utilized.

The second buffer layer 608 is optionally formed over the first active diode layer 607 and is utilized in order to help the epitaxial growth of overlying layers (e.g., the ridge material 609) transition from the material of the first active diode layer 607 to the material of the overlying layer. In an embodiment in which the laser die 600 utilizes III-V compounds, the second buffer layer 608 is a compound such as InGaAsP, InGaAlAs, InGaAs, combinations thereof, or the like. Additionally, in embodiments in which the laser die 600 utilizes II-VI compounds, the second buffer layer 608 may be a II-VI material such as BeMgZnSe, BeZnCdSe, BeTe, combinations of these, or the like. Additionally, the second buffer layer 608 may be deposited using an epitaxial growth process such as molecular beam epitaxy (MBE), although other processes, such as hydride vapor phase epitaxy (HYPE), liquid phase epitaxy (LPE), or the like, may also be utilized, and may be doped in an opposite fashion from the first contact 603, such as by being doped to a p-type conductivity when the first contact 603 is doped to an n-type conductivity. However, any suitable material and any suitable method of deposition may be utilized.

The ridge material 609 is formed to help assist in the epitaxial growth of an overlying layer (e.g., the second contact 611) transition from the material of the second buffer layer 608 to the material of the overlying layer. In an embodiment in which the laser die 600 utilizes III-V compounds, the ridge material 609 is a compound such as InP or the like. Additionally, in embodiments in which the laser die 600 utilizes II-VI compounds, the ridge material 609 may be a II-VI material such as BeMgZnSe, BeZnCdSe, BeTe, combinations of these, or the like. Additionally, the ridge material 609 may be doped using dopants of an opposite conductivity than the first contact 603, such as by being doped to a p-type conductivity when the first contact 603 is doped to an n-type conductivity. The ridge material 609 may one or more layers and may be deposited using an epitaxial growth process such as molecular beam epitaxy (MBE), although other processes, such as hydride vapor phase epitaxy (HYPE), liquid phase epitaxy (LPE), or the like, may also be utilized. However, any suitable material and any suitable method of deposition may be utilized.

The second contact 611 is formed over the ridge material 609. The second contact 611 forms the second part of the laser diode 602 used to emit light in conjunction with the first contact 603. In an embodiment in which the laser die 600 is based on III-V materials, the second contact 611 comprises a group III-V compound such as InAlAs, GaN, InN, AlN, $Al_xGa_{(1-x)}N$, $Al_xIn_{(1-x)}N$, $Al_xIn_yGa_{(1-x-y)}N$, combinations thereof, or the like, doped with a dopant of a second conductivity type (e.g., p-GaN) opposite the first conductivity type in the first contact 603. In another embodiment in which the laser die 600 is based on II-VI materials, the second contact 611 may be a II-VI material such as BeTe, BeMgZnSe, BeZnCdSe, combinations of these, or the like. The second contact 611 may be formed, for example, through an epitaxial growth process such as MOCVD. However, any suitable materials and any other suitable processes, such as HYPE, LPE, MBE, or the like, may also be utilized.

FIG. 6B illustrates a patterning of the second contact 611, the ridge material 609, the second buffer layer 608, the first active diode layer 607, the first buffer layer 605, and the first contact 603 to form the layered structure of the desired laser diode 602. In an embodiment the second contact 611 and the ridge material 609 may be patterned using, e.g., a first photolithographic masking and etching process. Once the second contact 611 and the portion of the ridge material 609 have been patterned, the second buffer layer 608, the first active diode layer 607, and the first buffer layer 605 may be patterned using, e.g., a second photolithographic masking and etching process. Finally, the first contact 603 may be patterned using, e.g., a third photolithographic masking and etching process, to have an adiabatic taper to assist in evanescent coupling to underlying layers. However, any suitable patterning process, and any suitable number of patterning process may be utilized in order to obtain a desired pattern for the laser.

FIG. 6B additionally illustrates deposition of a first passivation layer 613 over the structure. In an embodiment the first passivation layer 613 is formed of a material used to electrically isolate and protect the structure from overlying structures, and may be a material such as silicon oxide, silicon nitride, silicon oxynitride, combinations of these, or the like, and may be deposited using a chemical vapor deposition process, an atomic layer deposition process, a physical vapor deposition process, combinations of these, or the like. However, any suitable materials and any suitable methods of deposition may be utilized.

FIG. 6C illustrates a patterning of the first passivation layer 613 in order to form via openings through the first passivation layer 613 and expose the first contact 603 and the second contact 611. In an embodiment the patterning may be performed using, e.g., a photolithographic masking and etching process. However, any suitable patterning process may be utilized.

FIG. 6C additionally illustrates a deposition of contacts 615 through the via openings and in electrical connection with the first contact 603 and the second contact 611. In an embodiment the contacts 615 may be a conductive material such as copper, aluminum, gold, tungsten, combinations of these, or the like, deposited using a method such as chemical vapor deposition, atomic vapor deposition, physical vapor deposition, plating, combinations of these, or the like. However, any suitable material or method of manufacture may be utilized.

FIG. 6D illustrates a deposition of a second passivation layer 617 and a third passivation layer 619 over the contacts 615. In an embodiment the second passivation layer 617 may be an insulative and protecting material such as silicon oxide ($SiO_2$), silicon nitride, silicon oxynitride, combinations of these, or the like, deposited using a deposition process such as chemical vapor deposition, atomic layer deposition, physical vapor deposition, combinations of these, or the like. However, any suitable material and method of manufacture may be utilized.

The third passivation layer 619 is deposited over the second passivation layer 617 in order to help protect portions of the second passivation layer 617 during subsequent patterning processes. In an embodiment the third passivation layer 619 may be an insulative and protecting material that is different from the second passivation layer 617, such as by being silicon nitride, silicon oxide, silicon oxynitride, combinations of these, or the like, deposited using a deposition process such as chemical vapor deposition, atomic layer deposition, physical vapor deposition, combinations of these, or the like. However, any suitable material and method of manufacture may be utilized.

FIG. 6E illustrates a patterning of the second passivation layer 617 and the third passivation layer 619 in order to form contact via openings through the second passivation layer 617 and the third passivation layer 619 and expose the contacts 615. In an embodiment the patterning may be performed using, e.g., a photolithographic masking and etching process. However, any suitable patterning process may be utilized.

FIG. 6E additionally illustrates a deposition of conductive protective layers 621 through the contact via openings and in electrical connection with the contacts 615. In an embodiment the conductive protective layers 621 may be one or more layers of conductive materials that can help with etching selectivity and also help seal (from, e.g., moisture) subsequently forming conductive extensions 623 to help prevent process damage from occurring to the conductive extensions 623. In particular embodiments the conductive protective layers 621 may be materials such as tantalum, titanium, tantalum nitride, titanium nitride, combinations of these, or the like, deposited using a method such as chemical vapor deposition, atomic vapor deposition, physical vapor deposition, plating, combinations of these, or the like. However, any suitable material or method of manufacture may be utilized.

FIG. 6F illustrates a formation of conductive extensions 623 that make contact with the conductive protective layers 621. In an embodiment the conductive extensions 623 may be a conductive material such as a metal like aluminum, copper, germanium, combinations of these, or the like, deposited using a deposition method such as chemical vapor deposition, atomic vapor deposition, physical vapor deposition, plating, combinations of these, or the like. However, any suitable material and method of manufacture may be utilized.

FIG. 6F additionally illustrates that the conductive extensions 623 are pattered. In an embodiment in which the conductive extensions 623 are plated, the conductive extensions 623 may be patterned during the deposition process, while in other processes the conductive extensions 623 may be patterned after deposition using, for example, a photolithographic masking and etching process. However, any suitable process may be utilized.

FIG. 6G illustrates deposition of a fourth passivation layer 625 over the conductive extensions 623. In an embodiment the fourth passivation layer 625 is a protective dielectric material such as silicon oxide, silicon nitride, silicon oxynitride, combinations of these, or the like, deposited using a deposition process such as chemical vapor deposition, atomic layer deposition, physical vapor deposition, combinations of these, or the like. However, any suitable materials and methods may be used to form the fourth passivation layer 625.

FIG. 6H illustrates that, once the fourth passivation layer 625 has been formed, multiple ones of the laser diodes 602 (with multiple structures being illustrated on each second substrate 601 in FIG. 6H) may be bonded to a semiconductor substrate 626 to form a reconstituted wafer 628. In an embodiment the semiconductor substrate 626 may be a semiconductor material used for structural support during subsequent processing and as a heat sink to help with laser overheat issues, and may be, e.g., a silicon wafer, a silicon germanium wafer, a silicon-on-insulator wafer, or the like. In some embodiments the semiconductor substrate 626 is a 12-inch wafer, although any suitable size and material may be utilized.

In an embodiment the multiple ones of the laser diodes 602 may be bonded to the semiconductor substrate 626 using, for example, a fusion bonding process. For example, in some embodiments the fusion bonding process may activate surfaces of the fourth passivation layer 625 and the semiconductor substrate 626, and then the fourth passivation layer 625 and the semiconductor substrate 626 are placed in physical contact to initiate the bonding process, and further strengthening of the bond may be performed. However, any other suitable attachment process, including using an adhesive, may be utilized.

FIG. 6I illustrates a top down view of the reconstituted wafer 628, with FIG. 6H illustrating a cross-sectional view of the reconstituted wafer 628 along line H-H' in FIG. 6I. As can be seen in this top down view, the reconstituted wafer 628 comprises multiple ones of the individual laser diodes 602 attached to the semiconductor substrate 626. However, while FIG. 6I illustrates ten individual laser dies 600, any suitable number of laser dies 600 may be attached to the semiconductor substrate 626.

FIG. 6J illustrates a removal of the second substrate 601 to expose the first contacts 603 of the laser dies 600. In an embodiment the second substrate 601 may be removed using a planarization process, such as a chemical mechanical polishing process, a grinding process, or the like. In other embodiments the second substrate 601 may be removed using one or more etching processes in order to expose the first contacts 603. Any suitable method may be utilized.

FIG. 6K illustrates that, once the first contacts 603 have been exposed, a gap fill material 627 is deposited in order to both fill the regions between the individual laser dies 600 and also to re-cover the now exposed first contacts 603. In an embodiment the gap fill material 627 may be a dielectric material that can also work as a bottom cladding material. In a particular embodiment the gap fill material 627 may be silicon oxide, silicon nitride, spin on glass, combinations of these, or the like, deposited using a method such as chemical vapor deposition, physical vapor deposition, atomic layer deposition, combinations of these, or the like. However, any suitable material and any suitable method of deposition may be utilized.

FIG. 6K additionally illustrates that, once the gap fill material 627 has been deposited, the gap fill material 627 may be planarized and thinned. In an embodiment the gap fill material 627 may be planarized using, e.g., a chemical mechanical planarization process, a grinding process, or the like. In some embodiments the gap fill material 627 may be planarized to have a thickness over the first contacts 603 that is suitable for optical coupling between the first contact 603 and subsequently placed devices. In a particular embodiment the gap fill material 627 may be formed to have a thickness of between about 5 μm and about 8 μm. However, any suitable material, method of deposition, and thickness may be utilized.

FIG. 6L illustrates that, once the gap fill material 627 has been deposited and planarized, conductive vias 635 may be formed to create electrical contact with the conductive extensions 623. In an embodiment the conductive vias 635 may be formed by initially forming openings through the second passivation layer 617. Once the openings have been formed, the openings are then filled with a conductive material, such as copper using a seed layer and plating process to fill and overfill the openings. Once the openings have been filled, a planarization process, such as a chemical mechanical planarization process, may be used to planarize the conductive material with the gap fill material 627.

FIG. 6M illustrates formation of second bond pads 636 over the conductive vias 635. In an embodiment the second bond pads 636 may be formed of a conductive material such as copper, aluminum, gold, combinations of these, or the like, formed using a process such as photolithographic masking and plating, blanket deposition followed by photolithographic masking and etching, or the like. However, any suitable materials and any suitable process of formation may be utilized.

FIG. 6M additionally illustrates deposition and planarization of a fifth passivation layer 638 over the second bond pads 636. In an embodiment the fifth passivation layer 638 may be formed using similar materials and processes as the gap fill material 627 described above with respect to FIG. 6H, such as by being silicon oxide formed using a chemical vapor deposition process. However, any suitable material and process may be utilized.

Once the material of the fifth passivation layer 638 has been deposited, the fifth passivation layer 638 is planarized in order to re-expose the second bond pads 636 and also to thin the second bond pads 636 and fifth passivation layer 638 in preparation for subsequent coupling to other devices. In a particular embodiment the planarization process may be a chemical mechanical polishing process, a grinding process, combinations of these, or the like, and may be used to thin the fifth passivation layer 638 to a thickness suitable for coupling, such as a thickness of between about 50 nm and about 400 nm. However, any suitable process and any suitable thickness may be utilized.

FIGS. 6N-6O illustrate a singulation process that may be used in order to singulate the individual laser dies 600 in preparation for bonding. In an embodiment, and as illustrated in FIG. 6N, the singulation process is initiated by etching openings between the individual laser dies 600 and at least partially, but not fully, into the semiconductor substrate 626. However, any suitable method of partially dicing the laser dies 600, such as by a laser dicing process, may also be used.

FIG. 6O illustrates that, once the laser dies 600 have been partially diced, the semiconductor substrate 626 may be thinned in order to expose the openings and finish the singulation. In an embodiment the thinning may be performed using, e.g., a planarization process such as a grinding process, a chemical mechanical polishing process, combinations of these, or the like. However, any suitable thinning process may be utilized.

Figure 6P:
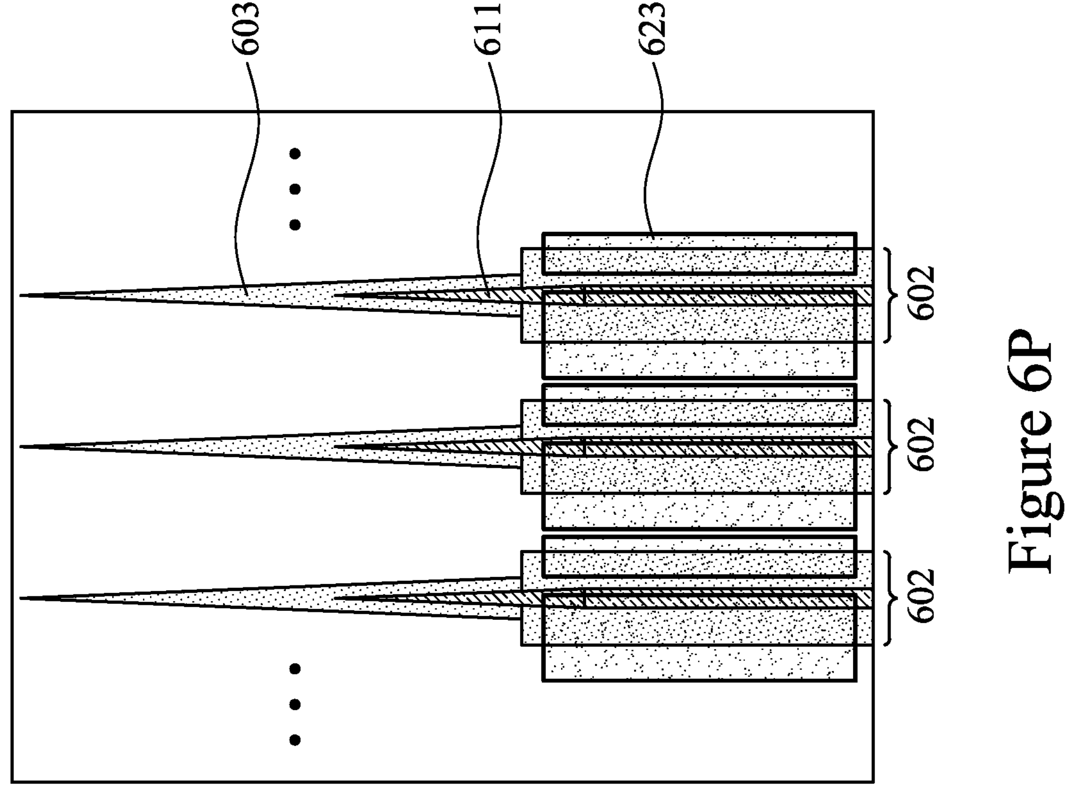

FIG. 6P illustrates a top down view of multiple laser diodes 602 that can be formed on the semiconductor substrate 626, with the first contact 603 being formed into a adiabatic tapered shape. In particular, while one or two laser diodes 602 are illustrated as being manufactured on the semiconductor substrate 626 in the above descriptions within FIGS. 6A-6O, this is intended to illustrative and is not intended to be limiting, as any suitable number of laser diodes 602 may be manufactured, such as the three laser diodes 602 that are illustrated in FIG. 6P. For example, any number of laser diodes 602, from 1 to 3 or from 10 to 12 laser diodes 602, may be manufactured. All such numbers of laser diodes 602 are fully intended to be included within the scope of the embodiments.

Figure 6Q:
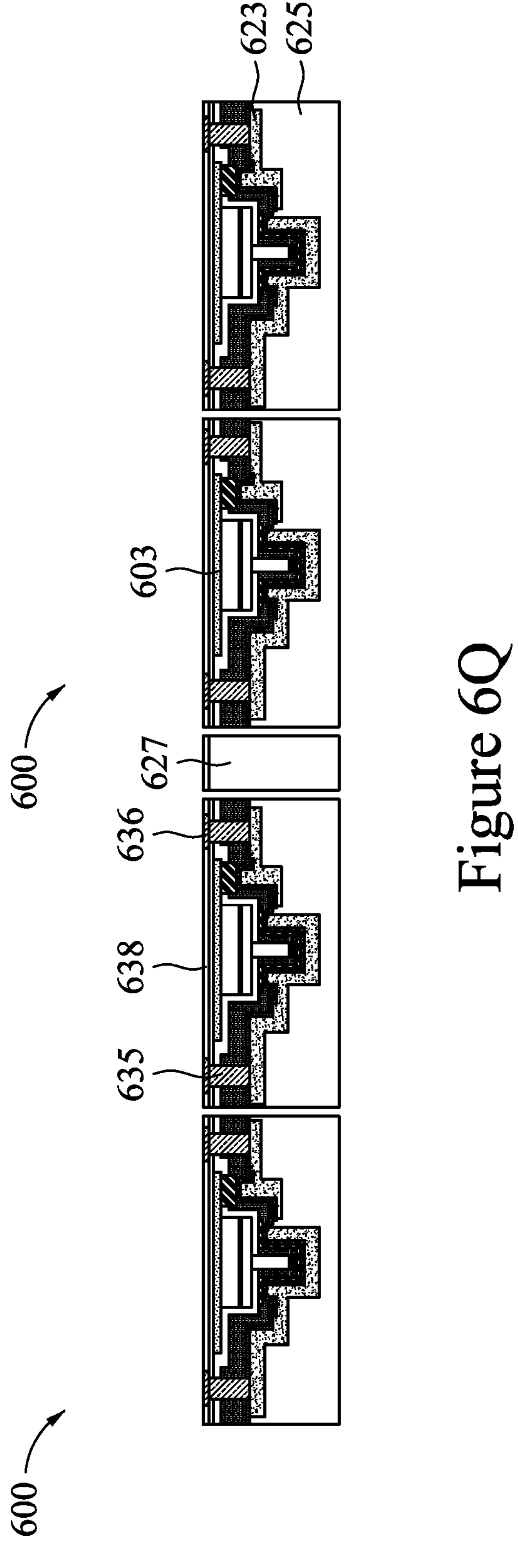

FIG. 6Q illustrates an optional removal of the semiconductor substrate 626 after singulation. In an embodiment the semiconductor substrate 626 may be removed using a removal process such as physical de-attachment (in embodiments in which an adhesive is used) or a process such as chemical mechanical polishing may be used (in embodiments in which a bonding process was used to attach the semiconductor substrate 626). However, any suitable process may be utilized.

By utilizing the process as described above, the fabrication process isolates the materials of the laser diode 602 as the materials of the laser diode 602 are encapsulated by the other dielectric materials. As such, there is less contamination to the materials of the laser diode 602 during later processes. For example, because the via holes for the conductive vias 635 penetrate only inside of the dielectric material, and stop on the metal surfaces, and the metal is of a material such as tantalum, titanium, or tantalum nitride, there is less risk of high drifting speed particle contamination.

Figure 7:
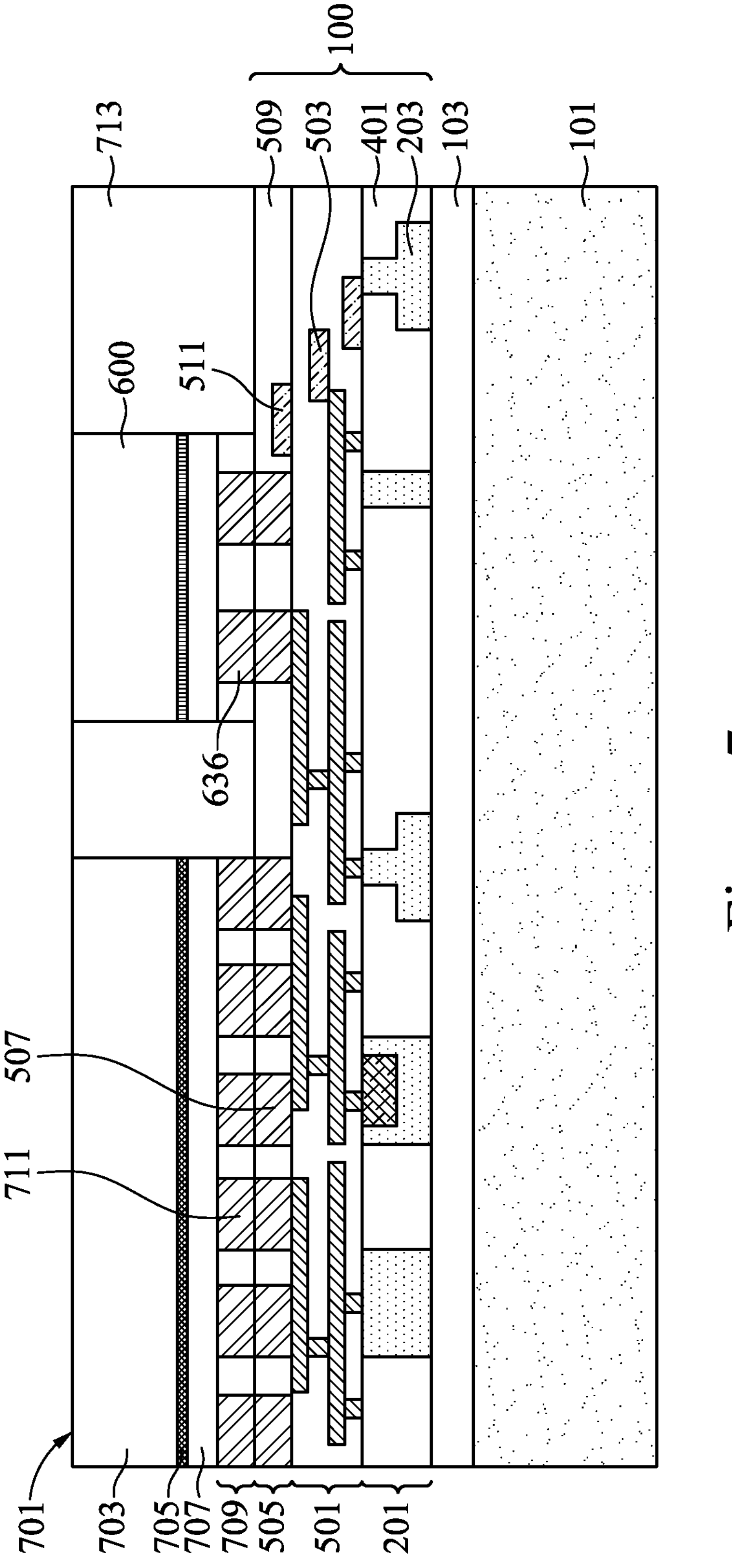

FIG. 7 illustrates a bonding of one of the singulated laser dies 600 to the first bonding layer 505 of the optical interposer 100. In a particular embodiment the laser die 600 and the first bonding layer 505 may be bonded using a dielectric-to-dielectric and metal-to-metal bonding process. However, any other suitable bonding process may also be utilized.

In a particular embodiment which utilizes a dielectric-to-dielectric and metal-to-metal bonding process, the process may be initiated by activating the surfaces of the laser die 600 and the surfaces of the first bonding layer 505. Activating the top surfaces of the first bonding layer 505 and the laser die 600 may comprise a dry treatment, a wet treatment, a plasma treatment, exposure to an inert gas plasma, exposure to $H_2$, exposure to $N_2$, exposure to $O_2$, combinations thereof, or the like, as examples. In embodiments where a wet treatment is used, an RCA cleaning may be used, for example. In another embodiment, the activation process may comprise other types of treatments. The activation process assists in the bonding of the first bonding layer 505 and the laser die 600.

After the activation process the optical interposer 100 and the laser die 600 may be cleaned using, e.g., a chemical rinse, and then the laser die 600 is aligned and placed into physical contact with the optical interposer 100. The optical interposer 100 and the laser die 600 are then subjected to thermal treatment and contact pressure to bond the optical interposer 100 and the laser die 600. For example, the optical interposer 100 and the laser die 600 may be subjected to a pressure of about 200 kPa or less, and a temperature between about 25° C. and about 250° C. to fuse the optical interposer 100 and the laser die 600. The optical interposer 100 and the laser die 600 may then be subjected to a temperature at or above the eutectic point for material of the first bond pads 507 and the second bond pads 636, e.g., between about 150° C. and about 650° C., to fuse the metal. In this manner, the optical interposer 100 and the laser die 600 forms a dielectric-to-dielectric and metal-to-metal bonded device. In some embodiments, the bonded dies are subsequently baked, annealed, pressed, or otherwise treated to strengthen or finalize the bond.

Additionally, while specific processes have been described to initiate and strengthen the bonds, these descriptions are intended to be illustrative and are not intended to be limiting upon the embodiments. Rather, any suitable combination of baking, annealing, pressing, or combination of processes may be utilized. All such processes are fully intended to be included within the scope of the embodiments.

Once the laser die 600 has been bonded, or else before the laser die 600 has been bonded, a first semiconductor device 701 may also be bonded to the optical interposer 100. In some embodiments, the first semiconductor device 701 is an electronic integrated circuit (EIC—e.g., a device without optical devices) and may have a semiconductor substrate 703, a layer of active devices 705, an overlying interconnect structure 707, a second bond layer 709, and associated third bond pads 711. In an embodiment the semiconductor substrate 703 may be similar to the first substrate 101 (e.g., a semiconductor material such as silicon or silicon germanium), the active devices 705 may be transistors, capacitors, resistors, and the like formed over the semiconductor substrate 703, the interconnect structure 707 may be similar to the first metallization layers 501 (without optical components), the second bond layer 709 may be similar to the first bond layer 505, and the third bond pads 711 may be similar to the first bond pads 507. However, any suitable devices may be utilized.

In an embodiment the first semiconductor device 701 may be configured to work with the optical interposer 100 for a desired functionality. In some embodiments the first semiconductor device 701 may be a high bandwidth memory (HBM) module, an xPU, a logic die, a 3DIC die, a CPU, a GPU, a SoC die, a MEMS die, combinations of these, or the like. Any suitable device with any suitable functionality, may be used, and all such devices are fully intended to be included within the scope of the embodiments.

Once the first semiconductor device 701 has been prepared, the first semiconductor device 701 may be bonded to the optical interposer 100. In an embodiment the first semiconductor device 701 may be bonded to the optical interposer 100 using, e.g., a dielectric-to-dielectric and metal-to-metal bonding process. In such an embodiment the first semiconductor device 701 is bonded to the first bonding layer 505 of the optical interposer 100 by bonding both the first bond pads 507 to the third bond pads 711 and by bonding the dielectrics within the first bonding layer 505 to the dielectrics within the second bond layer 709. In this embodiment the top surfaces of the first semiconductor device 701 and the optical interposer 100 may first be activated utilizing, e.g., a dry treatment, a wet treatment, a plasma treatment, exposure to an inert gas, exposure to $H_2$, exposure to $N_2$, exposure to $O_2$, or combinations thereof, as examples. However, any suitable activation process may be utilized.

After the activation process the first semiconductor device 701 and the optical interposer 100 may be cleaned using, e.g., a chemical rinse, and then the first semiconductor device 701 is aligned and placed into physical contact with the optical interposer 100. The first semiconductor device 701 and the optical interposer 100 are then subjected to thermal treatment and contact pressure to bond the first semiconductor device 701 and the optical interposer 100. For example, the first semiconductor device 701 and the optical interposer 100 may be subjected to a pressure of about 200 kPa or less, and a temperature between about 25° C. and about 250° C. to fuse the first semiconductor device 701 and the optical interposer 100. The first semiconductor device 701 and the optical interposer 100 may then be subjected to a temperature at or above the eutectic point for material of the first bond pads 507, e.g., between about 150° C. and about 650° C., to fuse the metal bond pads. In this manner, the first semiconductor device 701 and the optical interposer 100 forms a bonded device. In some embodiments, the bonded dies are subsequently baked, annealed, pressed, or otherwise treated to strengthen or finalize the bond.

Additionally, while the above description describes a dielectric-to-dielectric and metal-to-metal bonding process, this is intended to be illustrative and is not intended to be limiting. In yet other embodiments, the optical interposer 100 may be bonded to the first semiconductor device 701 by metal-to-metal bonding, or another bonding process. For example, the first semiconductor device 701 and the optical interposer 100 may be bonded by metal-to-metal bonding that is achieved by fusing conductive elements. Any suitable bonding process may be utilized, and all such methods are fully intended to be included within the scope of the embodiments.

FIG. 7 additionally illustrates that, once the laser die 600 and the first semiconductor device 701 have been bonded, a second gap-fill material 713 is deposited in order to fill the spaces between the laser die 600 and the first semiconductor device 701 and provide additional support. In an embodiment the second gap-fill material 713 may be a material such as silicon oxide, silicon nitride, silicon oxynitride, combinations of these, or the like, deposited to fill and overfill the spaces between the laser die 600 and the first semiconductor device 701. However, any suitable material and method of deposition may be utilized.

Once the second gap-fill material 713 has been deposited, the second gap-fill material 713 may be planarized in order to expose the laser die 600 and the first semiconductor device 701. In an embodiment the planarization process may be a chemical mechanical planarization process, a grinding process, or the like. However, any suitable planarization process may be utilized.

Figure 8:
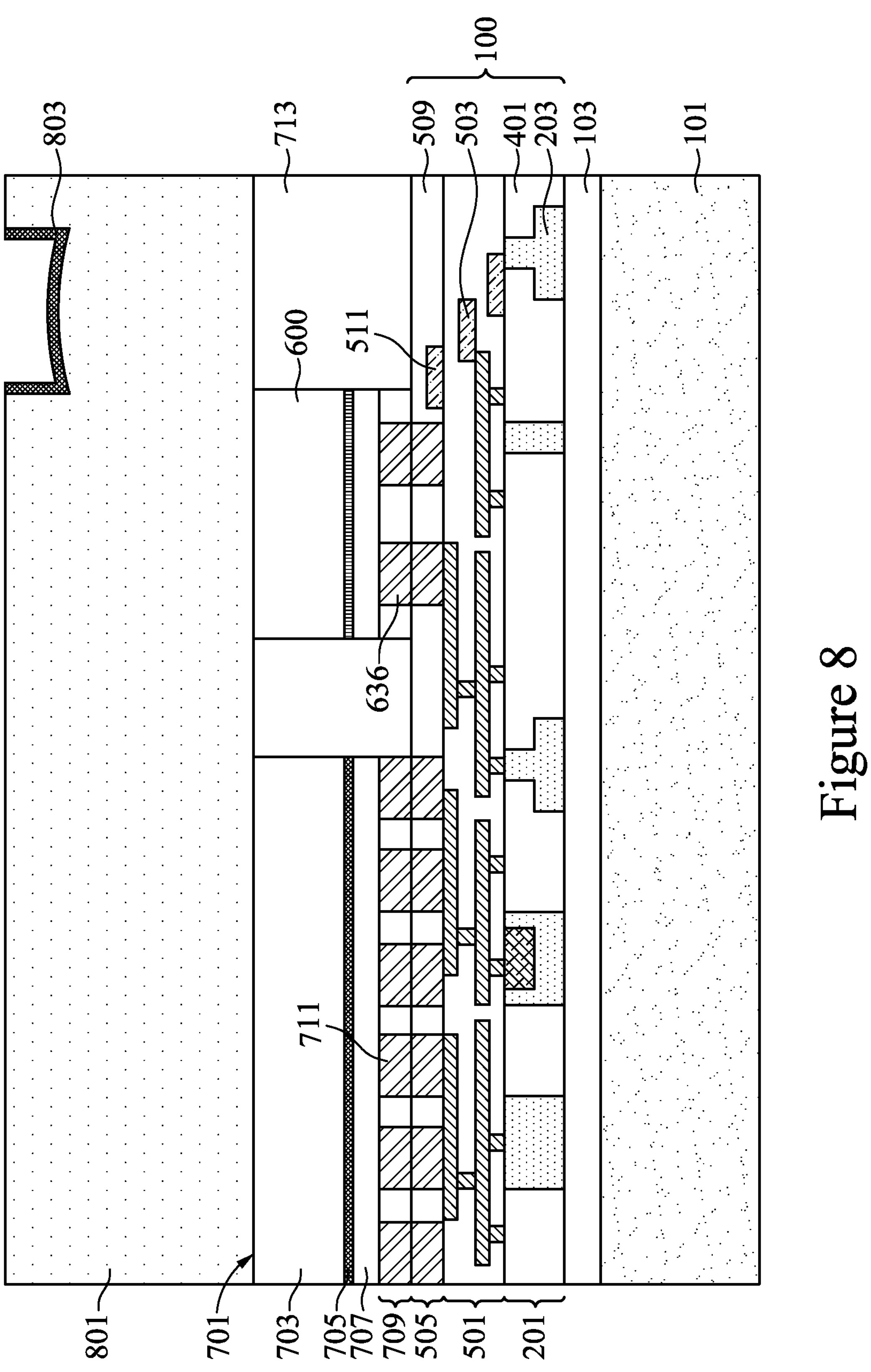

FIG. 8 illustrates an attachment of a support substrate 801 to the first semiconductor device 701, the laser die 600, and the second gap-fill material 713. In an embodiment the support substrate 801 may be a support material that is transparent to the wavelength of light that is desired to be used, such as silicon, and may be attached using, e.g., an adhesive (not separately illustrated in FIG. 8). However, in other embodiments the support substrate 801 may be bonded to the first semiconductor device 701, the laser die 600, and the second gap-fill material 713 using, e.g., a bonding process. Any suitable method of attaching the support substrate 801 may be used.

FIG. 8 additionally illustrates the support substrate 801 comprises a coupling lens 803 positioned to facilitate movement from an optical fiber 1005 (not illustrated in FIG. 8 but illustrated and described further below with respect to FIG. 10A) to a grating coupler within, e.g., the first optical components 203, the second optical components 503 of the first metallization layers 501, or the third optical components 511. In an embodiment the coupling lens 803 may be formed by shaping the material of the support substrate (e.g., silicon) using masking and etching processes. However, any suitable process may be utilized.

Figure 9:
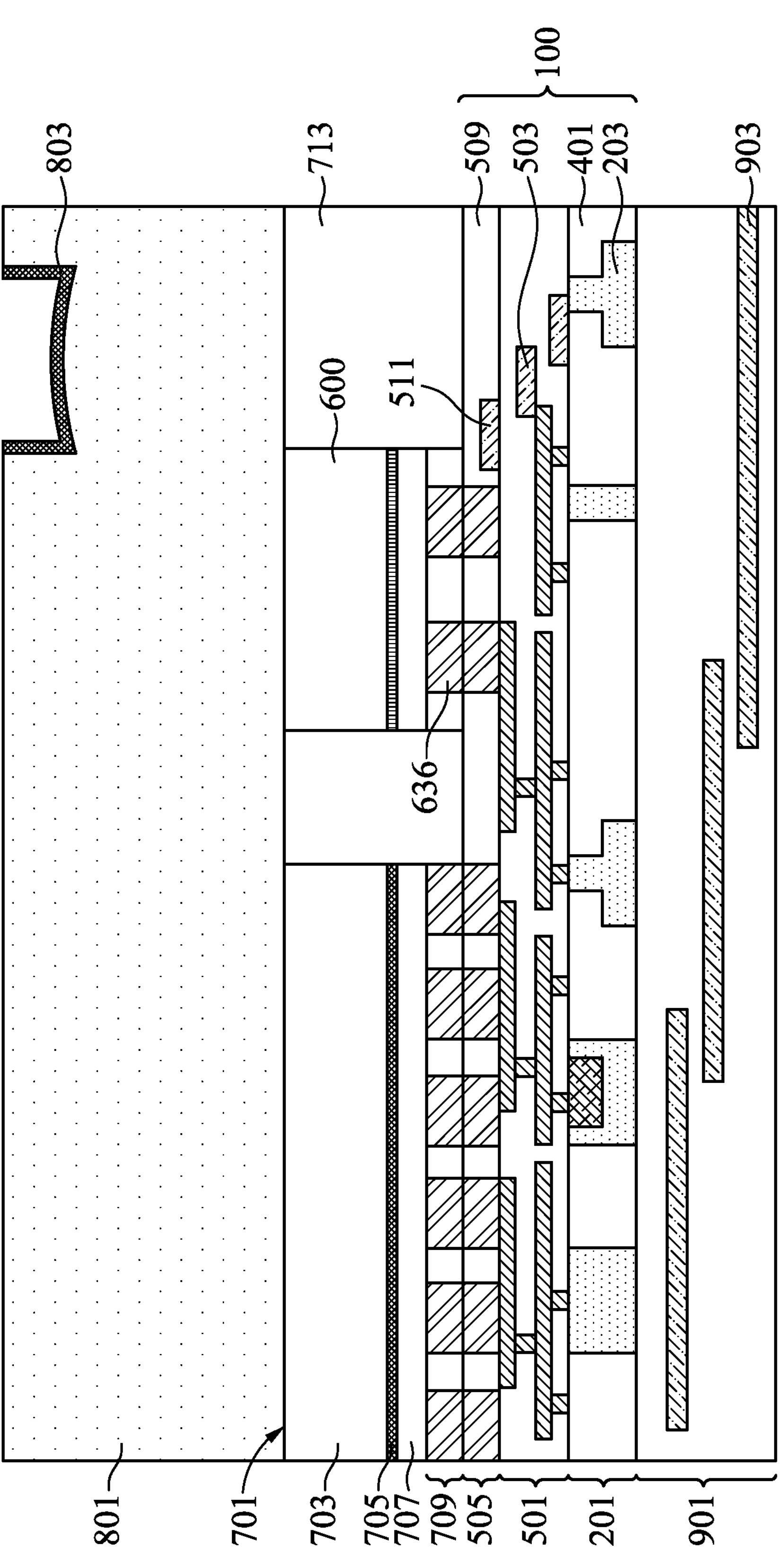

FIG. 9 illustrates a removal of the first substrate 101 and, optionally, the first insulating layer 103, thereby exposing the first active layer 201 of first optical components 203. In an embodiment the first substrate 101 and the first insulating layer 103 may be removed using a planarization process, such as a chemical mechanical polishing process, a grinding process, one or more etching processes, combinations of these, or the like. However, any suitable method may be used in order to remove the first substrate 101 and/or the first insulating layer 103.

Once the first substrate 101 and the first insulating layer 103 have been removed, a second active layer 901 of fourth optical components 903 may be formed on a back side of the first active layer 201. In an embodiment the second active layer 901 of fourth optical components 903 may be formed using similar materials and similar processes as the second optical components 503 of the first metallization layers 501 (described above with respect to FIG. 5). For example, the second active layer 901 of fourth optical components 903 may be formed of alternating layers of a cladding material such as silicon oxide and core material such as silicon nitride formed using deposition and patterning processes in order to form optical components such as waveguides and the like.

Figure 10A:
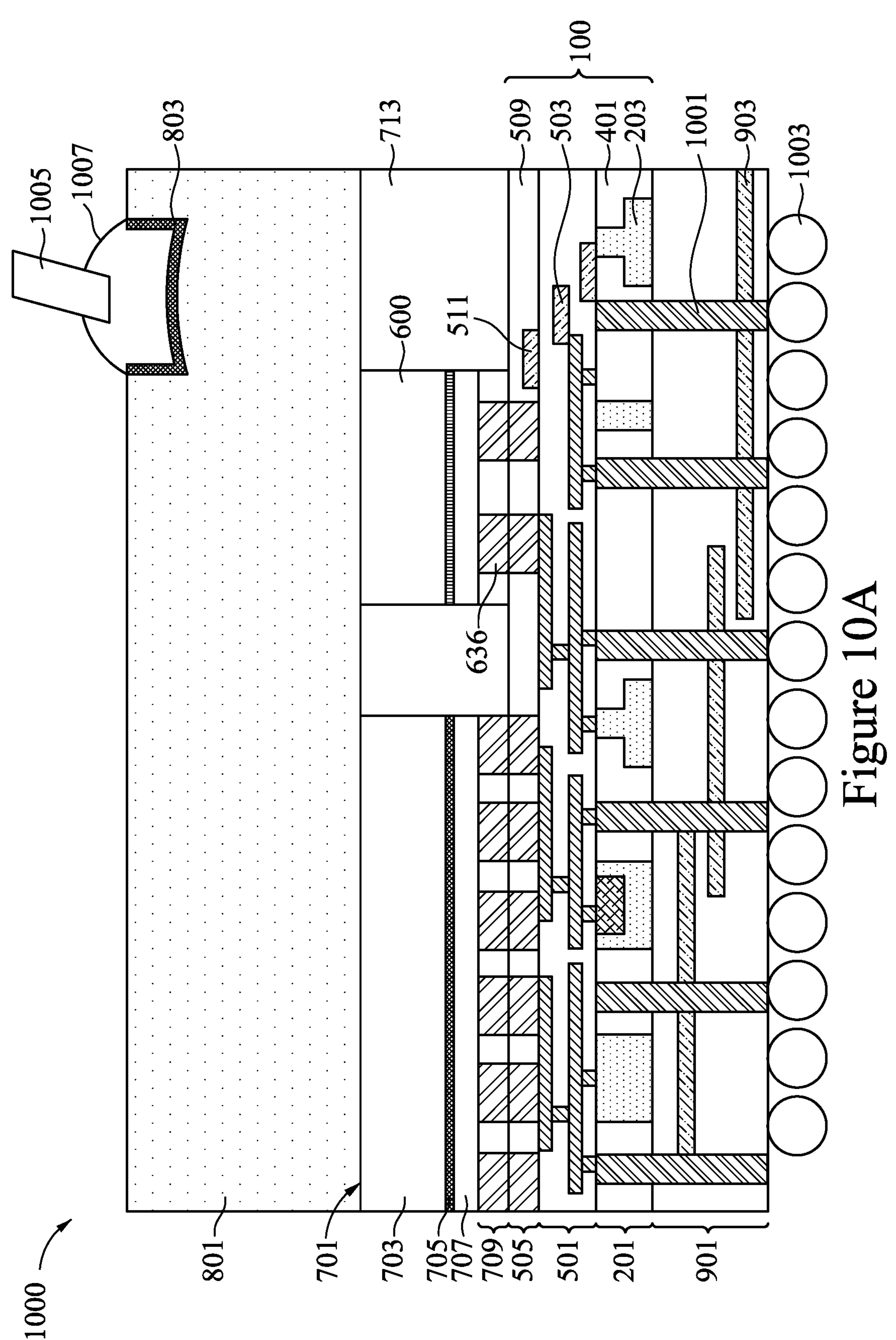

FIG. 10A illustrates formation of first through device vias (TDVs) 1001, formation of first external connectors 1003, and placement of an optical fiber 1005 to form a first optical package 1000. In an embodiment the first through device vias 1001 extend through the second active layer 901 and the first active layer 201 so as to provide a quick passage of power, data, and ground through the optical interposer 100. In an embodiment the first through device vias 1001 may be formed by initially forming through device via openings into the optical interposer 100. The through device via openings may be formed by applying and developing a suitable photoresist (not shown), and removing portions of the second active layer 901 and the optical interposer 100 that are exposed.

Once the through device via openings have been formed within the optical interposer 100, the through device via openings may be lined with a liner. The liner may be, e.g., an oxide formed from tetraethylorthosilicate (TEOS) or silicon nitride, although any suitable dielectric material may alternatively be used. The liner may be formed using a plasma enhanced chemical vapor deposition (PECVD) process, although other suitable processes, such as physical vapor deposition or a thermal process, may alternatively be used.

Once the liner has been formed along the sidewalls and bottom of the through device via openings, a barrier layer (also not independently illustrated) may be formed and the remainder of the through device via openings may be filled with first conductive material. The first conductive material may comprise copper, although other suitable materials such as aluminum, alloys, doped polysilicon, combinations thereof, and the like, may be utilized. The first conductive material may be formed by electroplating copper onto a seed layer (not shown), filling and overfilling the through device via openings. Once the through device via openings have been filled, excess liner, barrier layer, seed layer, and first conductive material outside of the through device via openings may be removed through a planarization process such as chemical mechanical polishing (CMP), although any suitable removal process may be used.

Optionally, in some embodiments once the first through device vias 1001 have been formed, second metallization layers (not separately illustrated in FIG. 10A) may be formed in electrical connection with the first through device vias 1001. In an embodiment the second metallization layers may be formed as described above with respect to the first metallization layers 501, such as being alternating layers of dielectric and conductive materials using damascene processes, dual damascene process, or the like. In other embodiments, the second metallization layers may be formed using a plating process to form and shape conductive material, and then cover the conductive material with a dielectric material. However, any suitable structures and methods of manufacture may be utilized.

The first external connectors 1003 may be formed to provide conductive regions for contact between either the first through device vias 1001 or the second metallization layers to other external devices. The first external connectors 1003 may be conductive bumps (e.g., C4 bumps, ball grid arrays, microbumps, etc.) or conductive pillars utilizing materials such as solder and copper. In an embodiment in which the first external connectors 1003 are contact bumps, the first external connectors 1003 may comprise a material such as tin, or other suitable materials, such as silver, lead-free tin, or copper. In an embodiment in which the first external connectors 1003 are tin solder bumps, the first external connectors 1003 may be formed by initially forming a layer of tin through such commonly used methods such as evaporation, electroplating, printing, solder transfer, ball placement, etc. Once a layer of tin has been formed on the structure, a reflow may be performed in order to shape the material into the desired bump shape.

Optionally at this point in the process, an optical fiber 1005 may be attached. In an embodiment the optical fiber 1005 is utilized as an optical input/output port to the optical interposer 100. In an embodiment the optical fiber 1005 is placed so as to optically couple the optical fiber 1005 and an optical input such as a grating coupler (not separately illustrated in FIG. 10A) that is part of the first optical components 203, the second optical components 503, or the third optical components 511. By positioning the optical fiber 1005 as such, optical signals leaving the optical fiber 1005 are directed towards, e.g., the first active layer 201 of first optical components 203. Similarly, the optical fiber 1005 is positioned so that optical signals leaving the first active layer 201 of first optical components 203 is directed into the optical fiber 1005 for transmission. However, any suitable location may be utilized.

The optical fiber 1005 may be held in place using, e.g., an optical glue 1007. In some embodiments, the optical glue 1007 comprises a polymer material such as epoxy-acrylate oligomers, and may have a refractive index between about 1 and about 3. However, any suitable material may be utilized.

Additionally, while the optical fiber 1005 is illustrated as being attached at this point in the manufacturing process, this is intended to be illustrative and is not intended to be limiting. Rather, the optical fiber 1005 may be attached at any suitable point in the process, such as after subsequent encapsulations (described further below). Any suitable point of attachment may be utilized, and all such attachments at any point in the process are fully intended to be included within the scope of the embodiments.

During operation, the optical components (e.g., the first optical components 203, the second optical components 503, and the third optical components 511) are powered by light from both the optical fiber 1005 as well as light from the laser die 600 (instead of being powered by light from the optical fiber 1005 only). This allows the optical fiber 1005 to be used an auxiliary optical I/O or an interdevice connection rather than the only light source. Looking first at the light originating from the optical fiber 1005, this light is directed from the optical fiber 1005 towards, e.g., a grating coupler located within the first optical components 203, the second optical components 503, or the third optical components 511. From there, waveguides within the first optical components 203, the second optical components 503, or the third optical components 511 route the received signals from the optical fiber 1005 as desired, and converters within the first optical components 203, the second optical components 503, or the third optical components 511 may convert the received signals into electrical signals before sending those electrical signals to other devices, such as the first semiconductor device 701. By the same token, the optical fiber 1005 can also serve as an output port for light generated by the first optical components 203, the second optical components 503, or the third optical components 511, thereby serving as an I/O port.

Figure 10B:
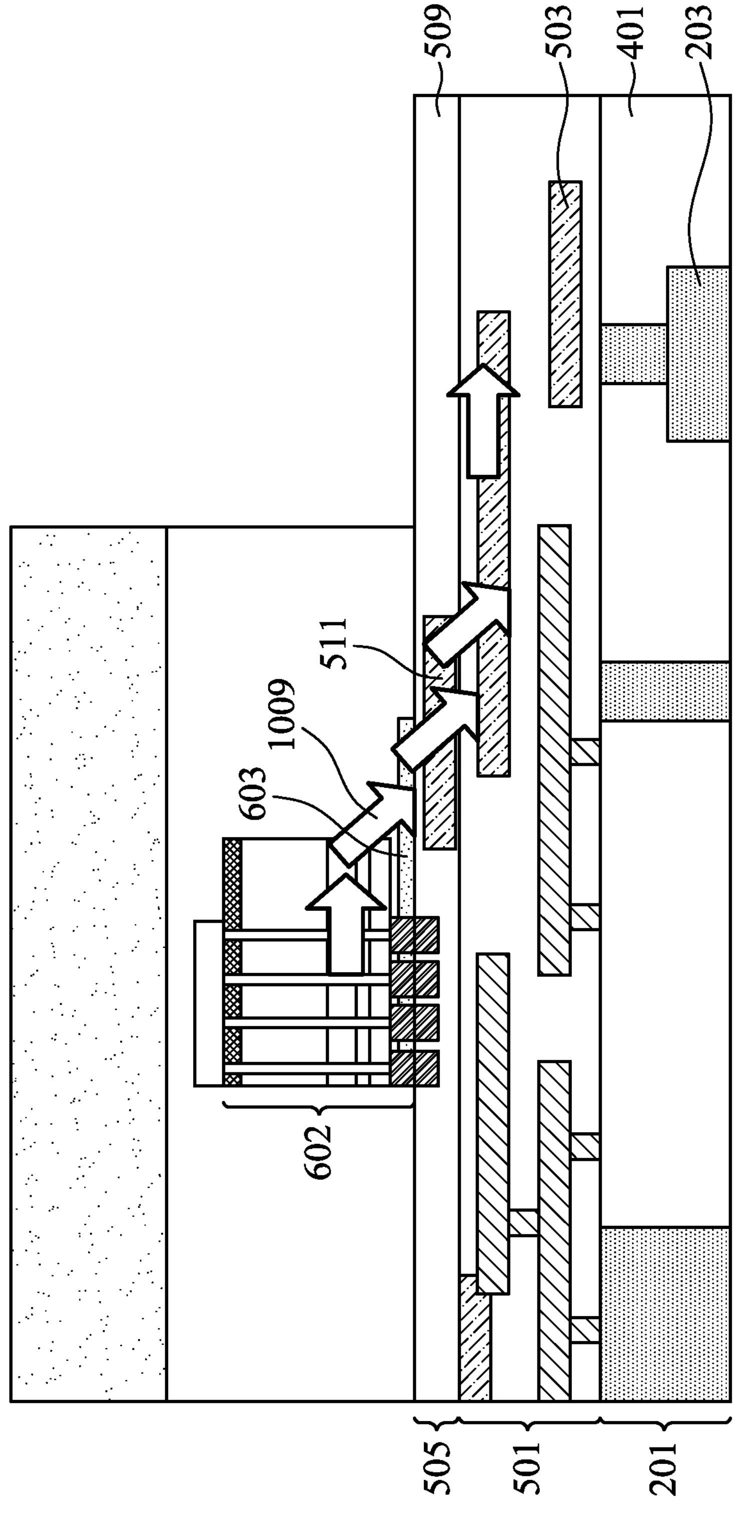

Looking next at the light generated by the laser die 600, FIG. 10B illustrates one possible path (represented by the arrows labeled 1009) for this light after it has been generated (with other structures such as the second gap-fill material 713 being omitted to help illustrate the path). In particular, the light generated by the laser die 600 (e.g., from the first active diode layer 607 through the first contact 603) is evanescently coupled into the third optical components 511 of the first bonding layer 505. From the third optical components 511, the light can then be coupled to the second optical components 503 within the first metallization layer 501. From there, the light may be routed around the device as desired, such as down to the first optical components 203.

Figure 10C:
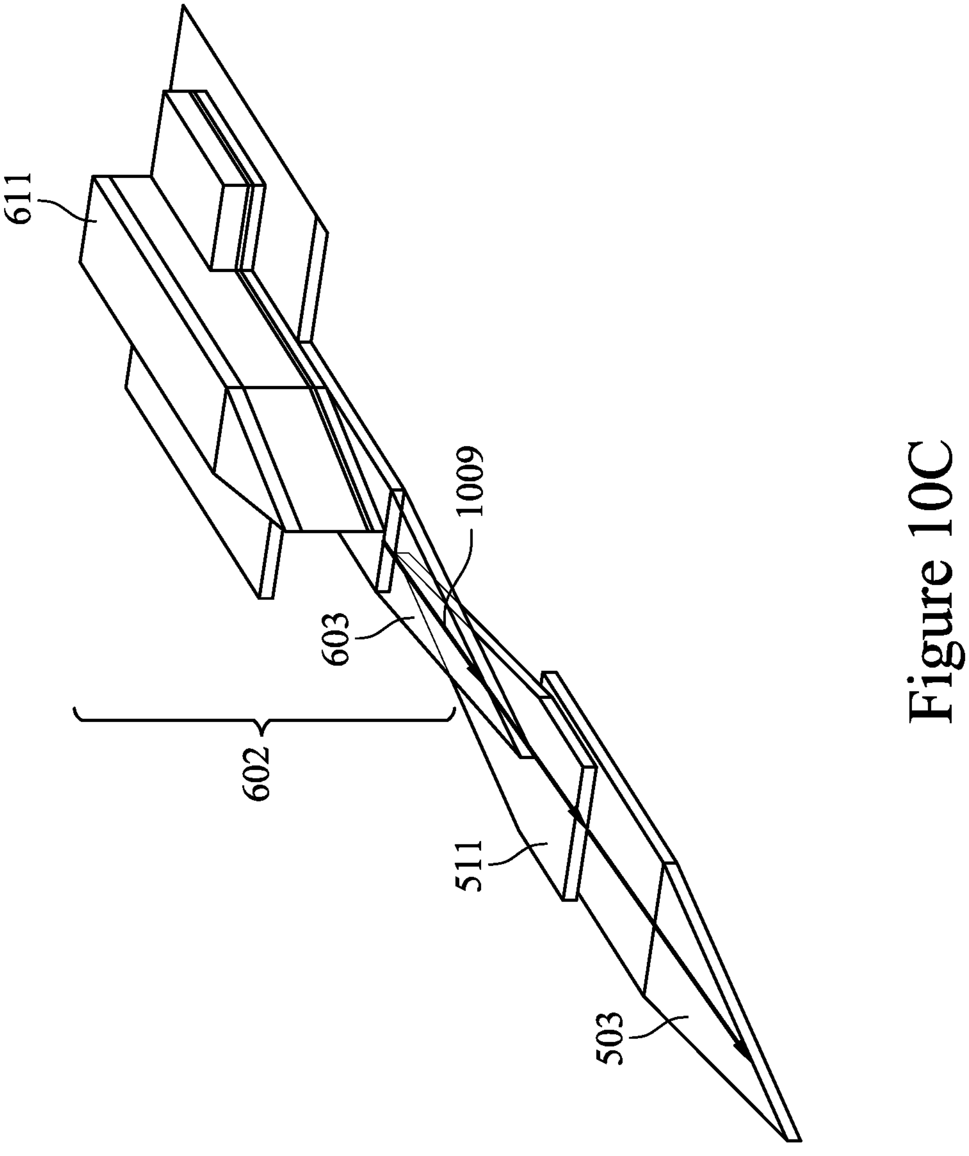

FIG. 10C illustrates a three-dimensional, perspective view of the laser diode 602 with the first contact 603 and the second contact 611 (along with intervening layers) along with two layers of waveguides that are located within the first bonding layer 505 and the first metallization layers 501. Additionally illustrated is the path (represented by the arrows labeled 1009) that the light generated by the laser die 600 travels from the first contact 603 and is coupled into the adjacent third optical components 511 of the first bonding layer 505. The adjacent waveguide routes the light as desired and then the light is coupled into the second optical components 503 (e.g., another waveguide) of the first metallization layers 501.

Figure 10D:
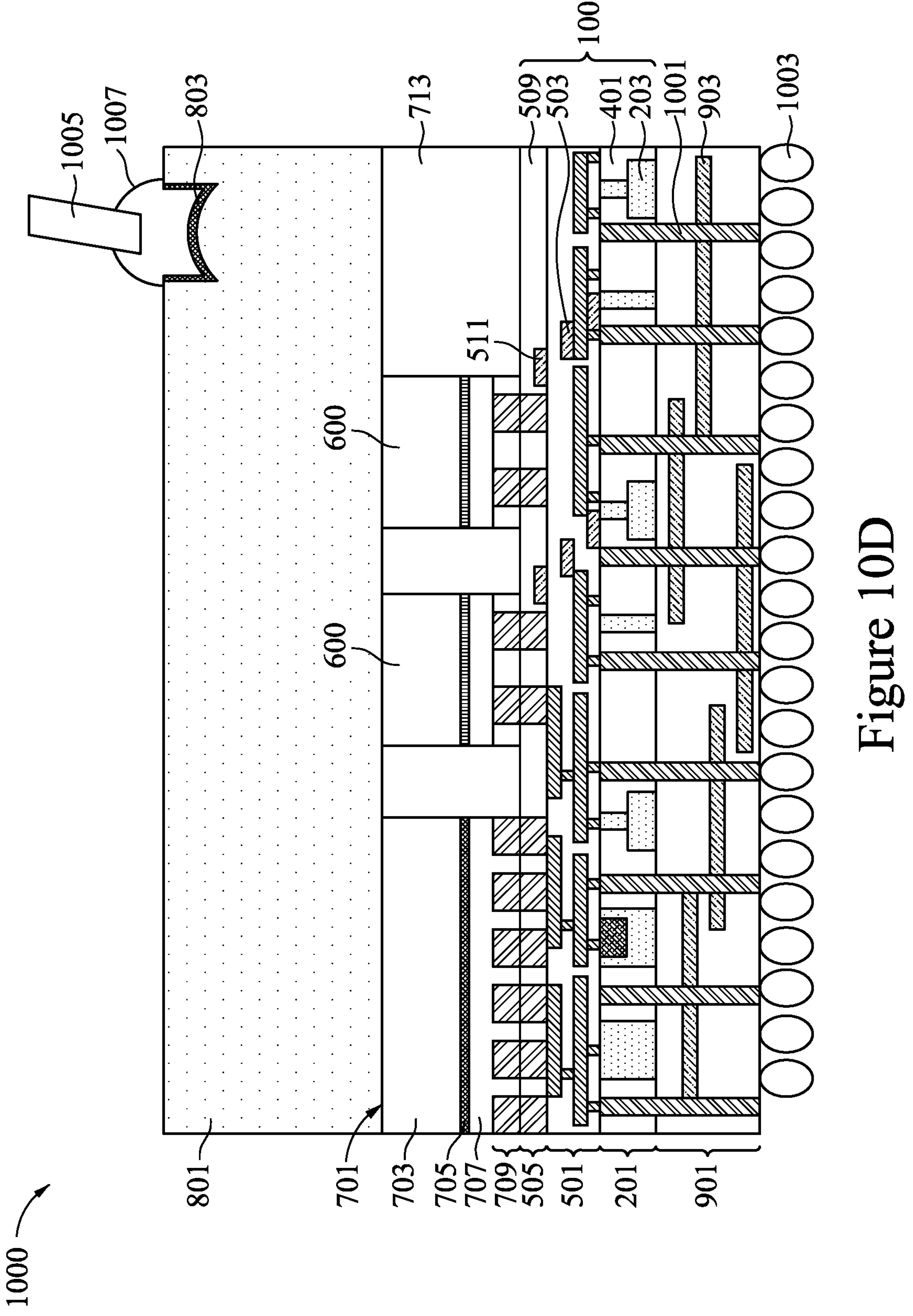

FIG. 10D illustrates another embodiment of coupling the laser die 600 with the third optical components 511 of the first bonding layer 505. In this embodiment, however, instead of using a single laser die 600 to supply all of the desired laser light, multiple laser dies 600 are utilized. For example, in the embodiment illustrated in FIG. 10D, a first one of the laser dies 600 and a second one of the laser dies 600 may be manufactured identically to each other, or else may be manufactured separately using different methods (e.g., for different light generation). Once prepared, both the first one of the laser dies 600 and the second one of the laser dies 600 may be bonded to the first bonding layer 505 as described above with respect to FIG. 7, thereby evanescently coupling both of the laser dies 600 with underlying portions of the third optical components 511.

Figure 10E:
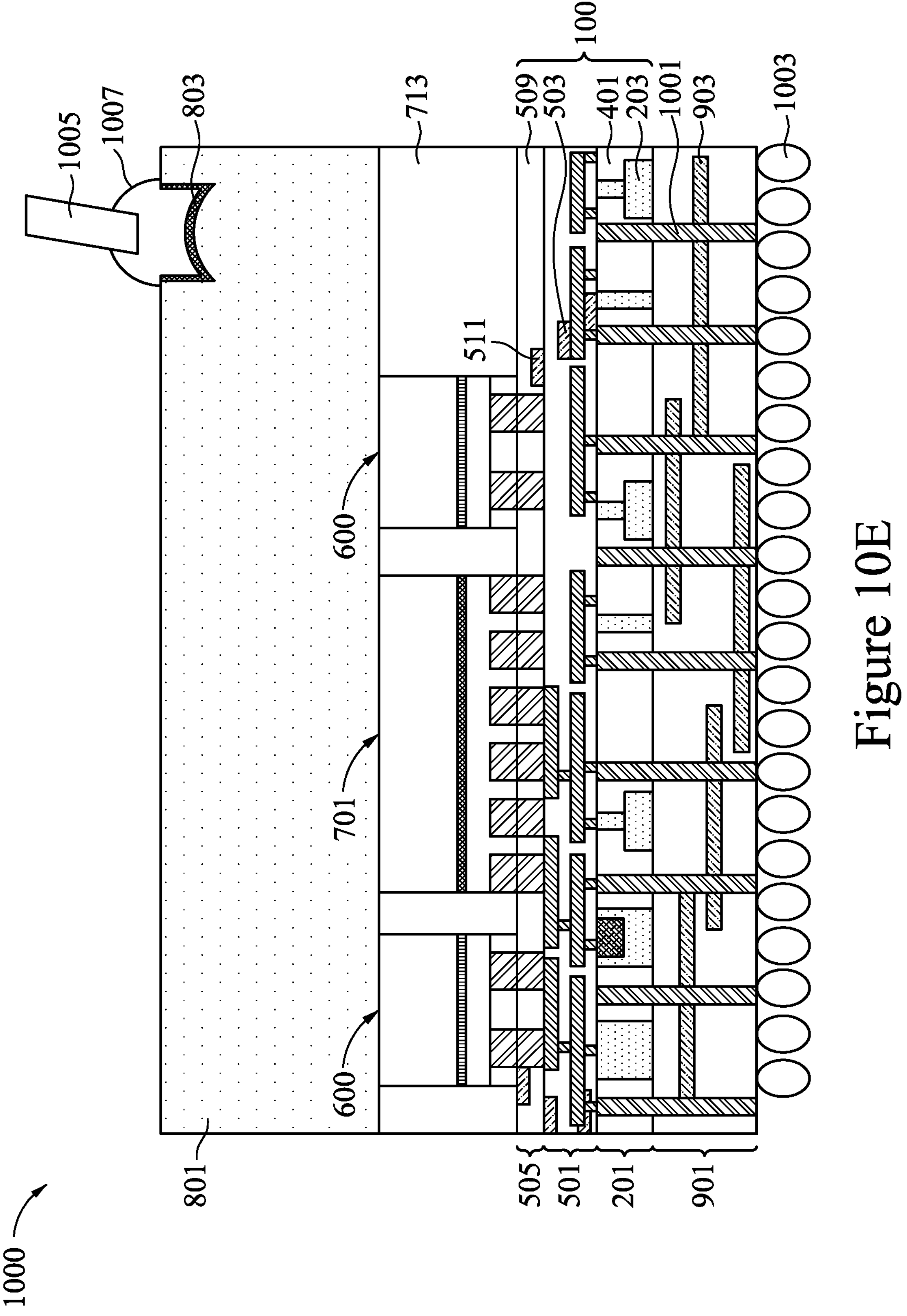

FIG. 10E illustrates another multi-laser die 600 embodiment with a different configuration. In this embodiment there are multiple laser dies 600 bonded to the first bonding layer 505 similar to the embodiment illustrated in FIG. 10D. In this embodiment, however, separate ones of the laser dies 600 are located on opposite sides of the first semiconductor device 701. Such placement allows for further opportunities and locations for routing the third optical components 511 as desired.

Figure 10F:
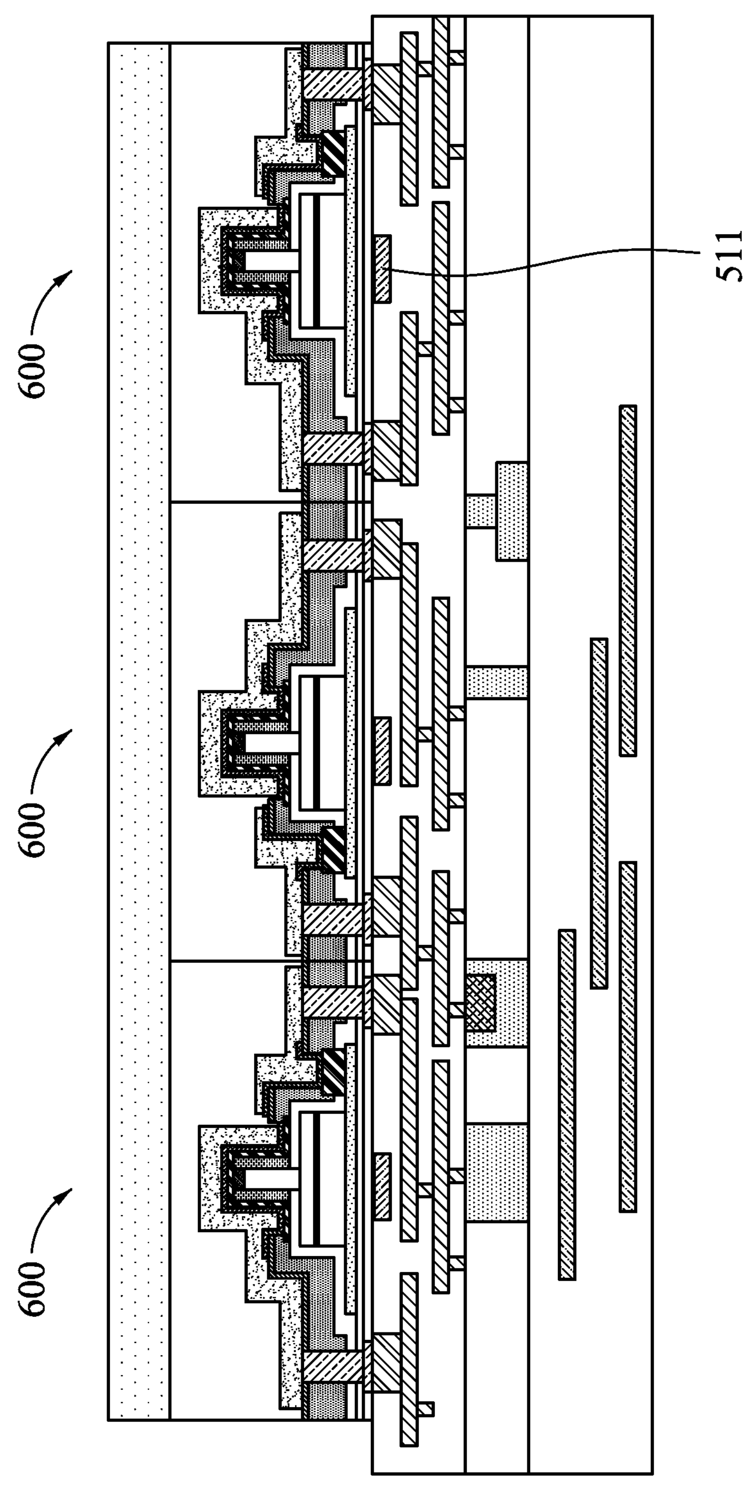
Figure 10G:
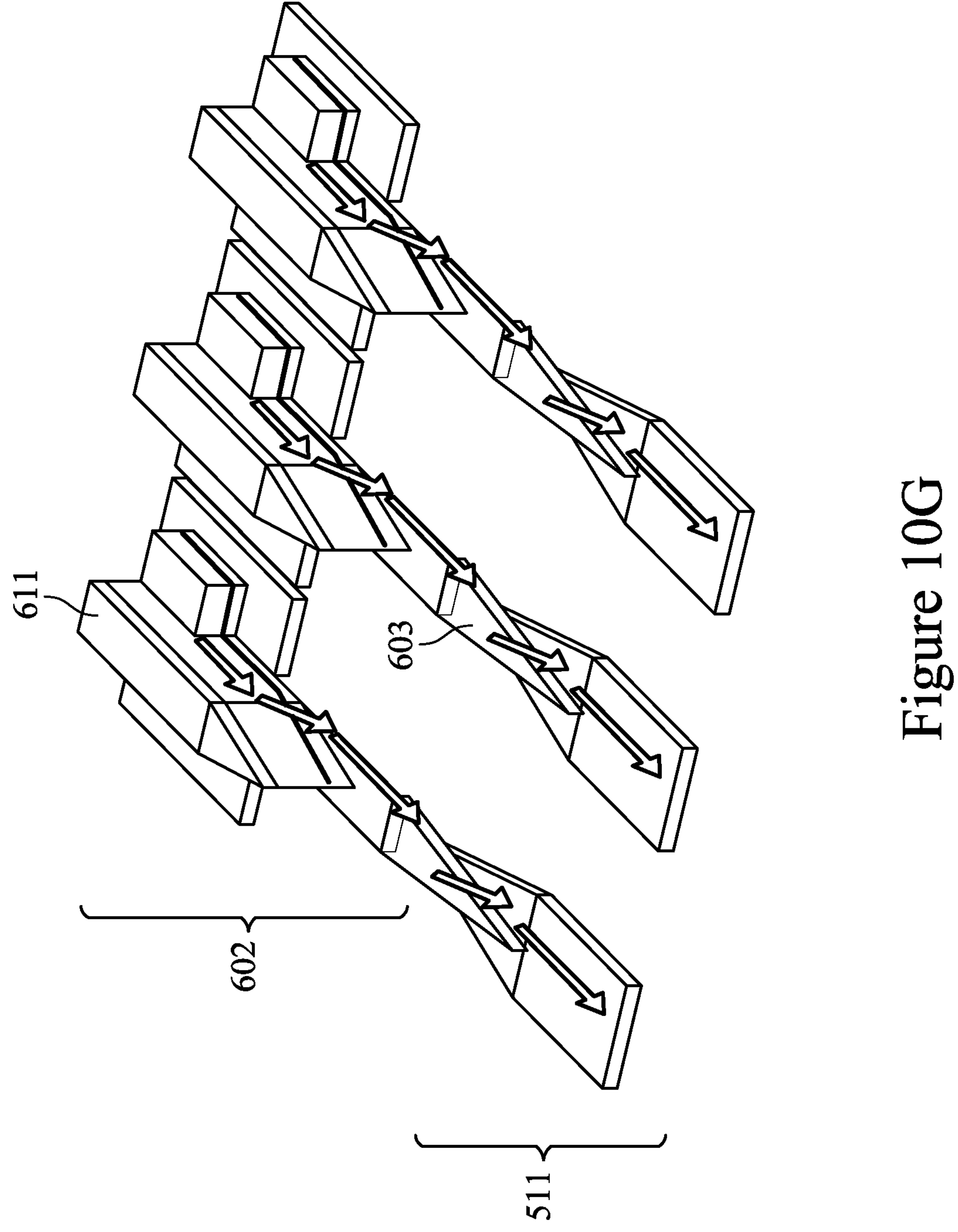

FIGS. 10F-10G illustrate a cross-sectional view and a three-dimensional, perspective view, respectively, of another embodiment of the laser die 600 in which multiple, parallel laser diodes 602 are manufactured adjacent to each other in order to supply any suitable and desired number of lasers. In this embodiment each of the laser diodes 602 is manufactured simultaneously as described above with respect to FIGS. 6A-6N, but in which multiple ones of the laser diodes 602 are formed from the initial stack of materials (see, e.g., FIG. 6A). Additionally, while three laser diodes 602 are illustrated in FIGS. 10F-10G, this is intended to be illustrative, as any suitable number of laser diodes 602 may be manufactured, and all such numbers are fully intended to be included within the scope of the embodiments.

Figure 11:
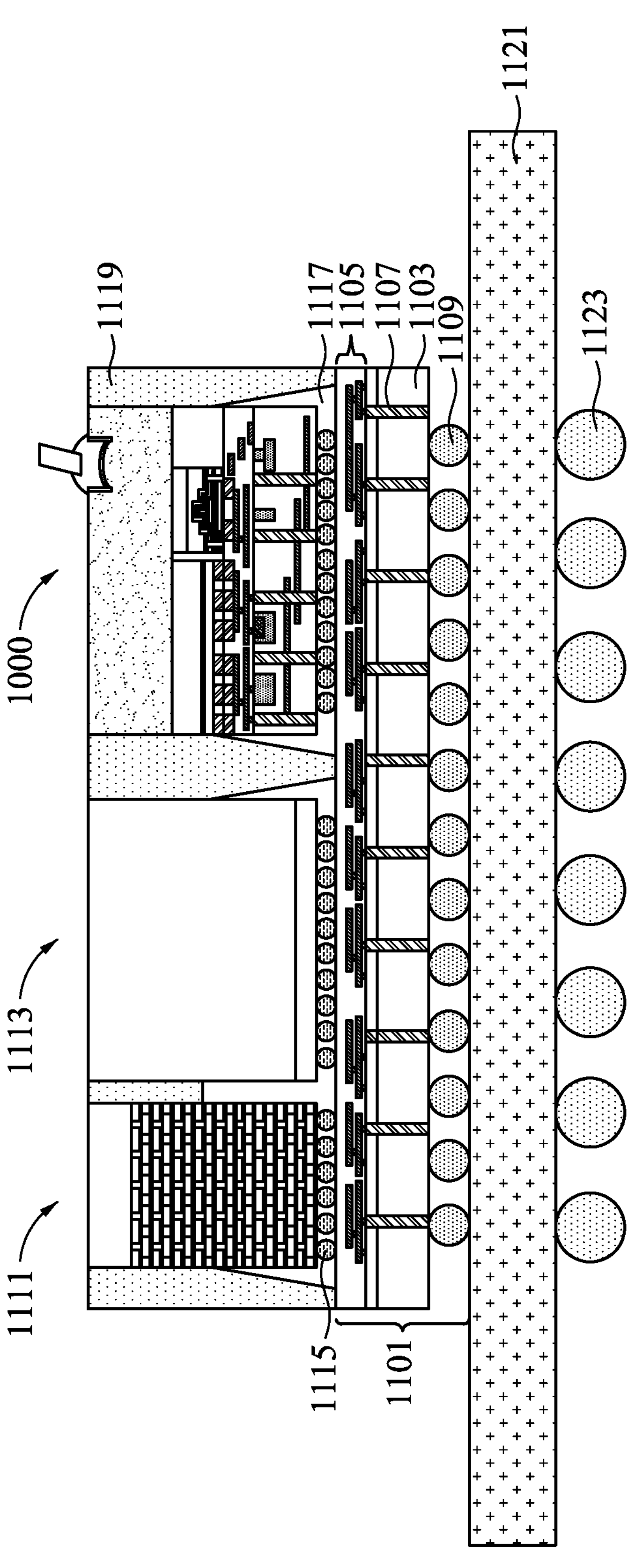
FIGS. 11-12 illustrate inclusion of the first optical package on substrates, in accordance with some embodiments.

FIG. 11 illustrates that, once the first optical package 1000 has been formed, the first optical package 1000 may be attached to an interposer substrate 1101 that is used to couple the first optical package 1000 with other devices to form, for example, a chip-on-wafer-on-substrate (CoWoS®). In an embodiment the interposer substrate 1101 comprises a semiconductor substrate 1103, third metallization layers 1105, second through device vias (TDVs) 1107, and second external connectors 1109. The semiconductor substrate 1103 may comprise bulk silicon, doped or undoped, or an active layer of a silicon-on-insulator (SOI) substrate. Generally, an SOI substrate comprises a layer of a semiconductor material such as silicon, germanium, silicon germanium, SOI, silicon germanium on insulator (SGOI), or combinations thereof. Other substrates that may be used include multi-layered substrates, gradient substrates, or hybrid orientation substrates.

Optionally, first active devices (not separately illustrated) may be added to the semiconductor substrate 1103. The first active devices comprise a wide variety of active devices and passive devices such as capacitors, resistors, inductors and the like that may be used to generate the desired structural and functional requirements of the design for the semiconductor substrate 1103. The first active devices may be formed using any suitable methods either within or else on the semiconductor substrate 1103.

The third metallization layers 1105 are formed over the semiconductor substrate 1103 and the first active devices and are designed to connect the various active devices to form functional circuitry. In an embodiment the third metallization layers 1105 are formed of alternating layers of dielectric (e.g., low-k dielectric materials, extremely low-k dielectric material, ultra low-k dielectric materials, combinations of these, or the like) and conductive material and may be formed through any suitable process (such as deposition, damascene, dual damascene, etc.). However, any suitable materials and processes may be utilized.

Additionally, at any desired point in the manufacturing process, the second TDVs 1107 may be formed within the semiconductor substrate 1103 and, if desired, one or more layers of the third metallization layers 1105, in order to provide electrical connectivity from a front side of the semiconductor substrate 1103 to a back side of the semiconductor substrate 1103. In an embodiment the second TDVs 1107 may be formed by initially forming through device via (TDV) openings into the semiconductor substrate 1103 and, if desired, any of the overlying third metallization layers 1105 (e.g., after the desired third metallization layer 1105 has been formed but prior to formation of the next overlying third metallization layer 1105). The TDV openings may be formed by applying and developing a suitable photoresist, and removing portions of the underlying materials that are exposed to a desired depth. The TDV openings may be formed so as to extend into the semiconductor substrate 1103 to a depth greater than the eventual desired height of the semiconductor substrate 1103.

Once the TDV openings have been formed within the semiconductor substrate 1103 and/or any third metallization layers 1105, the TDV openings may be lined with a liner. The liner may be, e.g., an oxide formed from tetraethylorthosilicate (TEOS) or silicon nitride, although any suitable dielectric material may be used. The liner may be formed using a plasma enhanced chemical vapor deposition (PECVD) process, although other suitable processes, such as physical vapor deposition or a thermal process, may be used.

Once the liner has been formed along the sidewalls and bottom of the TDV openings, a barrier layer may be formed and the remainder of the TDV openings may be filled with first conductive material. The first conductive material may comprise copper, although other suitable materials such as aluminum, alloys, doped polysilicon, combinations thereof, and the like, may be utilized. The first conductive material may be formed by electroplating copper onto a seed layer, filling and overfilling the TDV openings. Once the TDV openings have been filled, excess liner, barrier layer, seed layer, and first conductive material outside of the TDV openings may be removed through a planarization process such as chemical mechanical polishing (CMP), although any suitable removal process may be used.

Once the TDV openings have been filled, the semiconductor substrate 1103 may be thinned until the second TDVs 1107 have been exposed. In an embodiment the semiconductor substrate 1103 may be thinned using, e.g., a chemical mechanical polishing process, a grinding process, or the like. Further, once exposed, the second TDVs 1107 may be recessed using, e.g., one or more etching processes, such as a wet etch process in order to recess the semiconductor substrate 1103 so that the second TDVs 1107 extend out of the semiconductor substrate 1103.

In an embodiment the second external connectors 1109 may be placed on the semiconductor substrate 1103 in electrical connection with the second TDVs 1107 and may be, e.g., a ball grid array (BGA) which comprises a eutectic material such as solder, although any suitable materials may be used. Optionally, an underbump metallization or additional metallization layers (not separately illustrated in FIG. 11) may be utilized between the semiconductor substrate 1103 and the second external connectors 1109. In an embodiment in which the second external connectors 1109 are solder bumps, the second external connectors 1109 may be formed using a ball drop method, such as a direct ball drop process. In another embodiment, the solder bumps may be formed by initially forming a layer of tin through any suitable method such as evaporation, electroplating, printing, solder transfer, and then performing a reflow in order to shape the material into the desired bump shape. Once the second external connectors 1109 have been formed, a test may be performed to ensure that the structure is suitable for further processing.

Once the interposer substrate 1101 has been formed, the first optical package 1000 may be attached to the interposer substrate 1101. In an embodiment the first optical package 1000 may be attached to the interposer substrate 1101 by aligning the first external connectors 1003 with conductive portions of the interposer substrate 1101. Once aligned and in physical contact, the first external connectors 1003 are reflowed by raising the temperature of the first external connectors 1003 past a eutectic point of the first external connectors 1003, thereby shifting the material of the first external connectors 1003 to a liquid phase. Once reflowed, the temperature is reduced in order to shift the material of the first external connectors 1003 back to a solid phase, thereby bonding the first optical package 1000 to the interposer substrate 1101.

FIG. 11 additionally illustrates a bonding of a second semiconductor device 1111 and a third semiconductor device 1113 onto the semiconductor substrate 1103. In some embodiments, the second semiconductor device 1111 is an electronic integrated circuit (EIC) such as a stacked device that includes multiple, interconnected semiconductor substrates. For example, the second semiconductor device 1111 may be a memory device such as a high bandwidth memory (HBM) module, a hybrid memory cube (HMC) module, or the like that includes multiple stacked memory dies. In such embodiments, the second semiconductor device 1111 includes multiple semiconductor substrates interconnected by through device vias (TDVs). Each of the semiconductor substrates may (or may not) have a layer of active devices and an overlying interconnect structure, a bond layer, and associated bond pads in order to interconnect the multiple devices within the second semiconductor device 1111.

Of course, while the second semiconductor device 1111 is a HBM module in one embodiment, the embodiments are not restricted to the second semiconductor device 1111 being an HBM module. Rather, the second semiconductor device 1111 may be any suitable semiconductor device, such as a processor die or other type of functional die. In particular embodiments the second semiconductor device 1111 may be an xPU, a logic die, a 3DIC die, a CPU, a GPU, a SoC die, a MEMS die, combinations of these, or the like. Any suitable device with any suitable functionality, may be used, and all such devices are fully intended to be included within the scope of the embodiments.

The third semiconductor device 1113 may be another EIC that is intended to work with both the first optical package 1000 and the second semiconductor device 1111. In some embodiments the third semiconductor device 1113 may have a different functionality from the second semiconductor device 1111, such as by being an ASIC device, or may have a same functionality as the second semiconductor device 1111, such as by being another high bandwidth memory device.

In an embodiment both the second semiconductor device 1111 and the third semiconductor device 1113 may be bonded to the interposer substrate 1101 using, e.g., third external connections 1115. The third external connections 1115 may be conductive bumps (e.g., ball grid arrays, microbumps, etc.) or conductive pillars utilizing materials such as solder and copper. In an embodiment in which the third external connections 1115 are contact bumps, the third external connections 1115 may comprise a material such as tin, or other suitable materials, such as silver, lead-free tin, or copper. In an embodiment in which the third external connections 1115 are tin solder bumps, the third external connections 1115 may be formed by initially forming a layer of tin through such commonly used methods such as evaporation, electroplating, printing, solder transfer, ball placement, etc. Once a layer of tin has been formed on the structure, a reflow may be performed in order to shape the material into the desired bump shape.

Additionally, once the third external connections 1115 have been placed, the second semiconductor device 1111 and the third semiconductor device 1113 are aligned with the interposer substrate 1101. Once aligned and in physical contact, the third external connections 1115 are reflowed by raising the temperature of the third external connections 1115 past a eutectic point of the third external connections 1115, thereby shifting the material of the third external connections 1115 to a liquid phase. Once reflowed, the temperature is reduced in order to shift the material of the third external connections 1115 back to a solid phase, thereby bonding the second semiconductor device 1111 and the third semiconductor device 1113 to the interposer substrate 1101.

Once the second semiconductor device 1111 and the third semiconductor device 1113 have been bonded, an underfill material 1117 may be placed. The underfill material 1117 may reduce stress and protect the joints resulting from the reflowing of the third external connections 1115 and the first external connectors 1003. The underfill material 1117 may be formed by a capillary flow process after the first optical package 1000, the second semiconductor device 1111 and the third semiconductor device 1113 are attached.

After the underfill material 1117 has been placed, the second semiconductor device 1111, the third semiconductor device 1113, and the first optical package 1000 are encapsulated with an encapsulant 1119. In an embodiment, the encapsulant 1119 may be a molding compound, epoxy, or the like. The encapsulant 1119 may be applied by compression molding, transfer molding, or the like. The encapsulant 1119 is further placed in gap regions between the second semiconductor device 1111, the third semiconductor device 1113, and the first optical package 1000. The encapsulant 1119 may be applied in liquid or semi-liquid form and then subsequently cured.

A planarization process is performed on the encapsulant 1119 once the encapsulant 1119 has been placed. Once planarized, top surfaces of the encapsulant 1119, the second semiconductor device 1111, the third semiconductor device 1113, and the first optical package 1000 are substantially coplanar after the planarization process within process variations. The planarization process may be, for example, a chemical-mechanical polish (CMP), a grinding process, or the like. In some embodiments, the planarization may be omitted.

Once the second semiconductor device 1111, the third semiconductor device 1113 and the first optical package 1000 have been bonded to the interposer substrate 1101, the interposer substrate 1101 may be bonded to a second substrate 1121 with, e.g., the second external connectors 1109. In an embodiment the second substrate 1121 may be a package substrate, which may be a printed circuit board (PCB) or the like. The second substrate 1121 may include one or more dielectric layers and electrically conductive features, such as conductive lines and vias. In some embodiments, the second substrate 1121 may include through-vias, active devices, passive devices, and the like. The second substrate 1121 may further include conductive pads formed at the upper and lower surfaces of the second substrate 1121.

The second external connectors 1109 may be aligned with corresponding conductive connections on the second substrate 1121. Once aligned the second external connectors 1109 may then be reflowed in order to bond the second substrate 1121 to the interposer substrate 1101. However, any suitable bonding process may be used to connect the interposer substrate 1101 to the second substrate 1121.

Additionally, the second substrate 1121 may be prepared for further by placing by forming fourth external connections 1123 on an opposite side of the second substrate 1121 from the first optical package 1000. In an embodiment the fourth external connections 1123 may be formed using similar processes and materials as the second external connectors 1109. However, any suitable materials and processes may be utilized.

By embedding the laser die 600 into the first optical package 1000, space that is usually used for the integration of a bulky and over-packaged external laser can be saved. For example, the laser die 600 can be electrically driven by internal metal routing on the interposer substrate 1101 such as the third metallization layers 1105 and by internal metal routing within the first optical package 1000 such as the first metallization layer 501. Additionally, because there is no additional optical fiber coupling such an external laser, the driving power that would otherwise have been loss (e.g., insertion loss through a grating coupler or losses introduced through polarization sensitive passive components) is instead maintained by evanescently coupling the light into the desired optical components.

Figure 12:
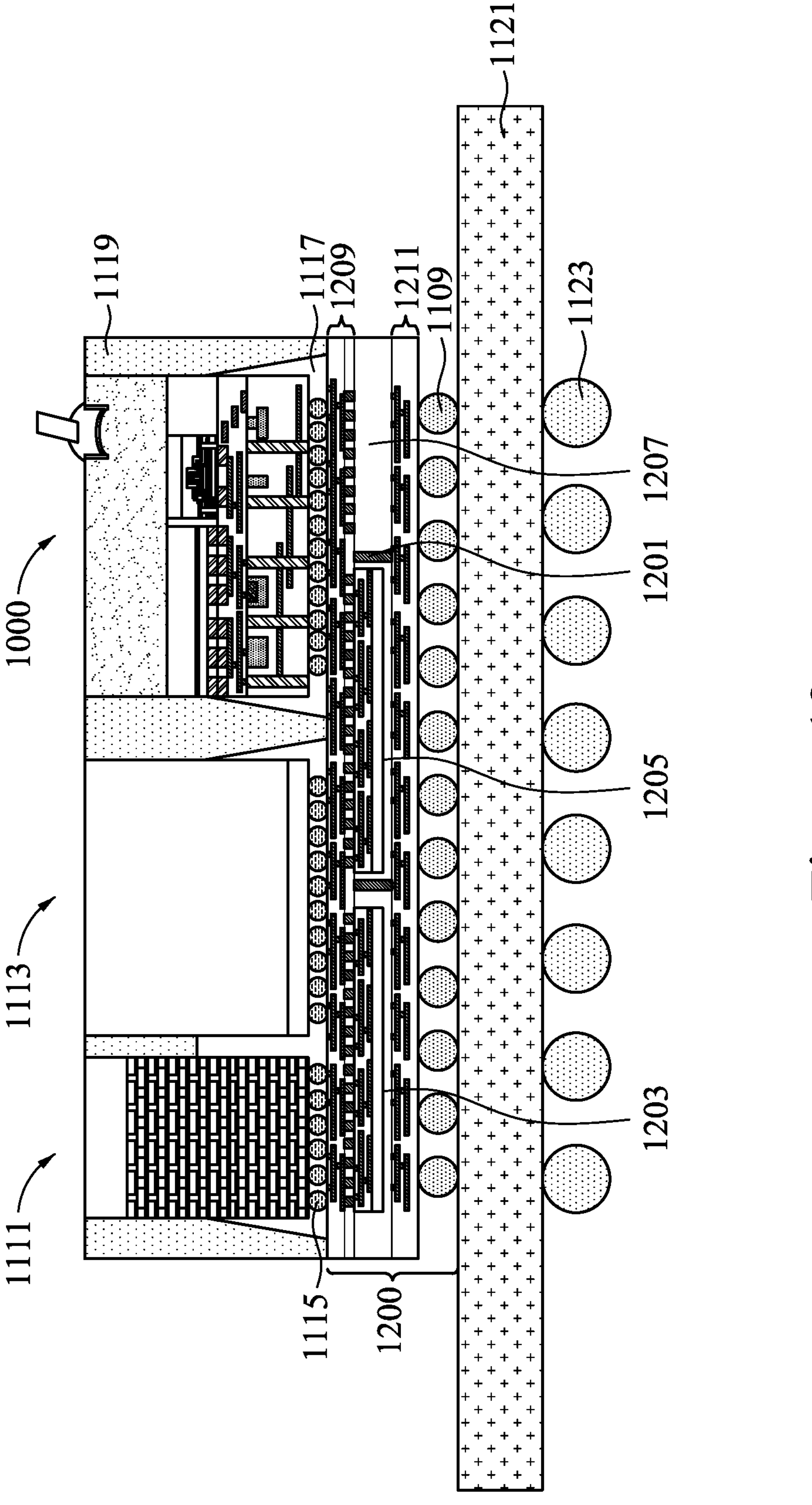

FIG. 12 illustrates a variation where the first optical package 1000, the second semiconductor device 1111, and the third semiconductor device 1113 are bonded to an integrated fan-out substrate 1200. In this embodiment InFO TDVs 1201 are initially formed (using, e.g., a photolithographic masking and plating process) on a substrate (not separately illustrated) adjacent to a fourth semiconductor device 1203 and a fifth semiconductor device 1205, which may be similar to the second semiconductor device 1111 and/or the third semiconductor device 1113. Once in place, the InFO TDVs 1201, the fourth semiconductor device 1203, and the fifth semiconductor device 1205 are encapsulated with a second encapsulant 1207 (similar to the encapsulant 1119), and fourth metallization layers 1209 (similar to the first metallization layers 501) may be formed. The substrate may then be removed, and fifth metallization layers 1211 may be formed on an opposite side of the InFO TDVs 1201.

Once the InFO package 1200 has been formed, the second semiconductor device 1111 and the third semiconductor device 1113 may be bonded to the InFO substrate 1200 using the third external connections 1115 and the first optical package 1000 is attached using the first external connectors 1003. Additionally, the InFO substrate 1200 may be bonded to the second substrate 1121 using, e.g., the second external connectors 1109, and the fourth external connections 1123 are formed on the second substrate 1121. However, any suitable processes and structures may be utilized.

Figures 13A, 13B:
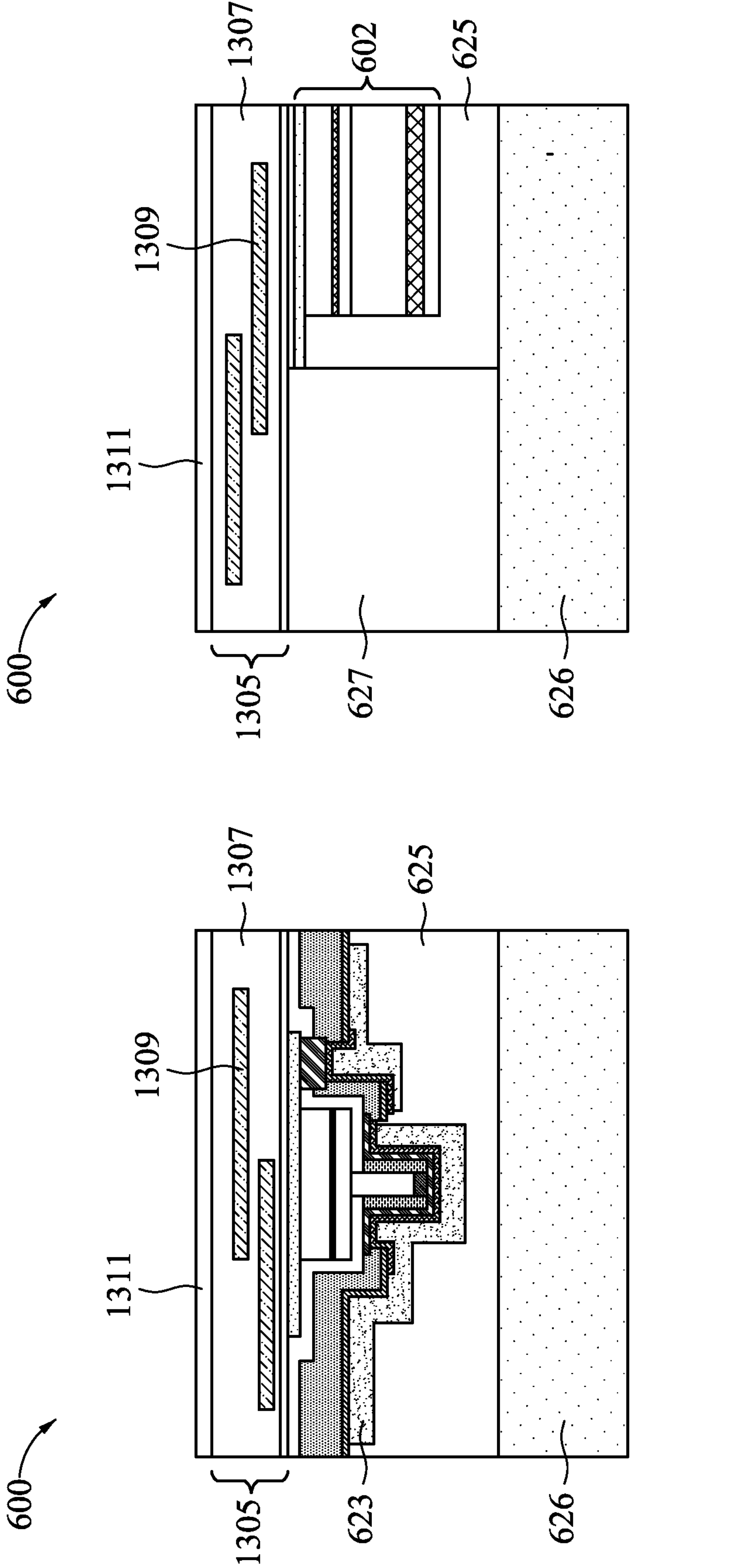
FIGS. 13A-13G illustration formation of the first optical package with a fusion bond, in accordance with some embodiments.

FIGS. 13A-13B illustrate the initial steps in another embodiment of bonding the laser die 600 to the first bonding layer 505, with FIG. 13B illustrating a lateral view of the structure illustrated in FIG. 13A. In this embodiment, however, instead of using both a dielectric-to-dielectric bond and also using a metal-to-metal bond (as described above with respect to FIGS. 1-12), a single fusion bond is formed between the laser die 600 and the first bonding layer 505 of the optical interposer 100. Looking first at FIG. 13A, in this embodiment the laser die 600 is formed as described above with respect to FIGS. 6A-6K, but without the formation of the conductive vias 635.

In this embodiment, however, a second active layer 1305 of fifth optical components 1309 are formed prior to singulation that will be used to couple lasers created by the laser diodes 602 to subsequently connected devices. In an embodiment the second active layer 1305 of the fifth optical components 1309 may be formed of alternating layers of cladding material 1307 (e.g., a dielectric such as silicon oxide) and the fifth optical components 1309. The fifth optical components 1309 may be formed using similar materials and methods as the second optical components 503 (described above with respect to FIG. 5) to form structures such as waveguides. Additionally, while two layers of optical components are illustrated in FIG. 13A, any suitable number of layers of waveguides and any other suitable devices may be utilized and any suitable materials and any suitable methods of manufacture may be utilized.

FIGS. 13A-13B additionally illustrate deposition of a sixth passivation layer 1311 over the second active layer 1305 of fifth optical components 1309. In an embodiment the sixth passivation layer 1311 may be an insulative cladding material such as silicon oxide deposited using chemical vapor deposition, atomic layer deposition, physical vapor deposition, combinations of these, or the like. However, any suitable materials or methods of operation may be utilized.

Figure 13C:
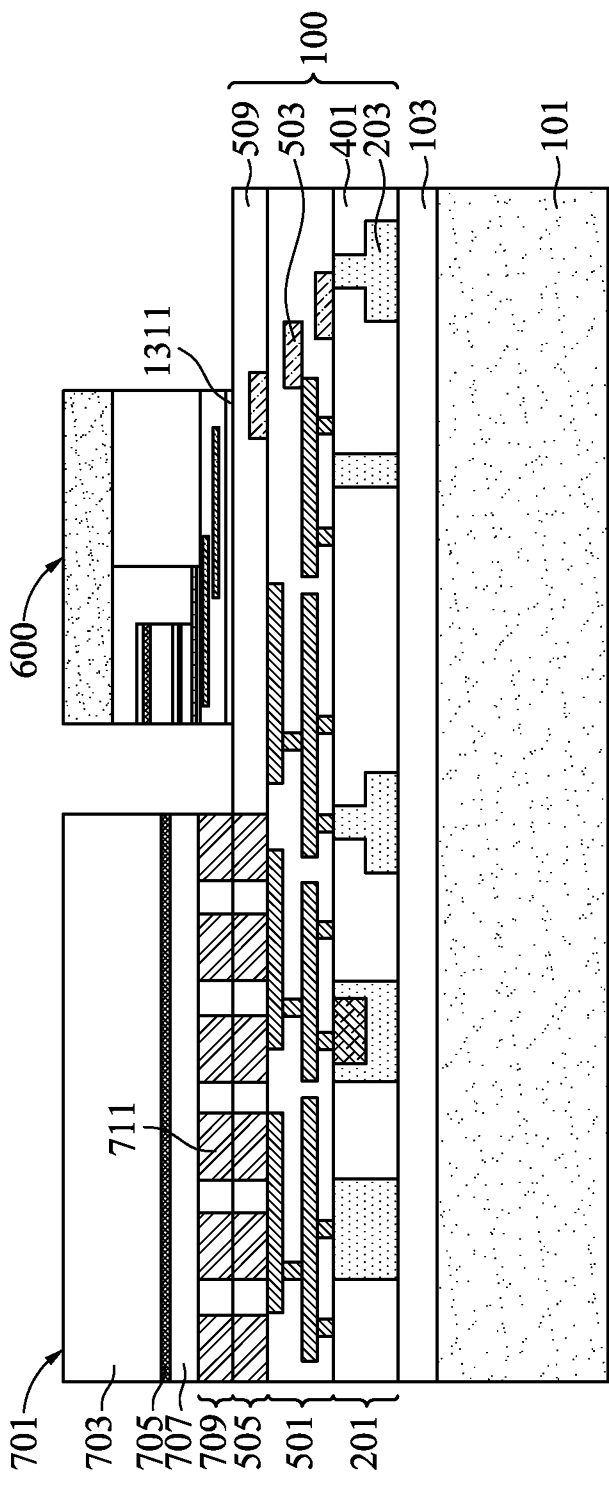

FIG. 13C illustrates a bonding of the laser die 600 to the optical interposer 100 using only the sixth passivation layer 1311 and the first dielectric material 509 of the first bonding layer 505. In this embodiment there are no conductive contacts formed within the optical interposer 100 where the laser die 600 will be attached, and the surface remains a portion of the first dielectric material 509 of the first bonding layer 505. To begin the process of bonding the laser die 600 to the first bonding layer 505, the surfaces of the laser die 600 and the surfaces of the first bonding layer 505 may initially be activated. Activating the top surfaces of the first bonding layer 505 and the laser die 600 may comprise a dry treatment, a wet treatment, a plasma treatment, exposure to an inert gas plasma, exposure to $H_2$, exposure to $N_2$, exposure to $O_2$, combinations thereof, or the like, as examples. In embodiments where a wet treatment is used, an RCA cleaning may be used, for example. In another embodiment, the activation process may comprise other types of treatments. The activation process assists in the bonding of the first bonding layer 505 and the laser die 600.

After the activation process, the first bonding layer 505 and the laser die 600 may be placed into physical contact. In an embodiment the laser die 600 is placed into physical contact with the first bonding layer 505 using, e.g., an alignment process in order to minimize overlay differences during the placement process. With the activation process chemically modifying the surfaces, the bonding process between the materials is begun upon the physical contact.

Once physical contact has begun the bonding process, the bonding may then be strengthened by subjecting the assembly to a thermal treatment. In an embodiment the first bonding layer 505 and the laser die 600 may be subjected to a temperature between about 200° C. and about 400° C. to strengthen the bond. In this manner, fusion of the first bonding layer 505 and the laser die 600 forms a bonded device.

Additionally, while specific processes have been described to initiate and strengthen the bonds between the first bonding layer 505 and the laser die 600, these descriptions are intended to be illustrative and are not intended to be limiting upon the embodiments. Rather, any suitable combination of baking, annealing, pressing, or combination of processes may be utilized. All such processes are fully intended to be included within the scope of the embodiments.

FIG. 13C further illustrates a continuation of the process after the laser die 600 has been bonded with the fusion bonding process and no electrical connections. In particular, once the laser die 600 has been bonded, the first semiconductor device 701 is bonded to the first bonding layer 505 using, e.g., a dielectric-to-dielectric and metal-to-metal bonding process as described above with respect to FIG. 7. However, any suitable process may be utilized.

Figure 13D:
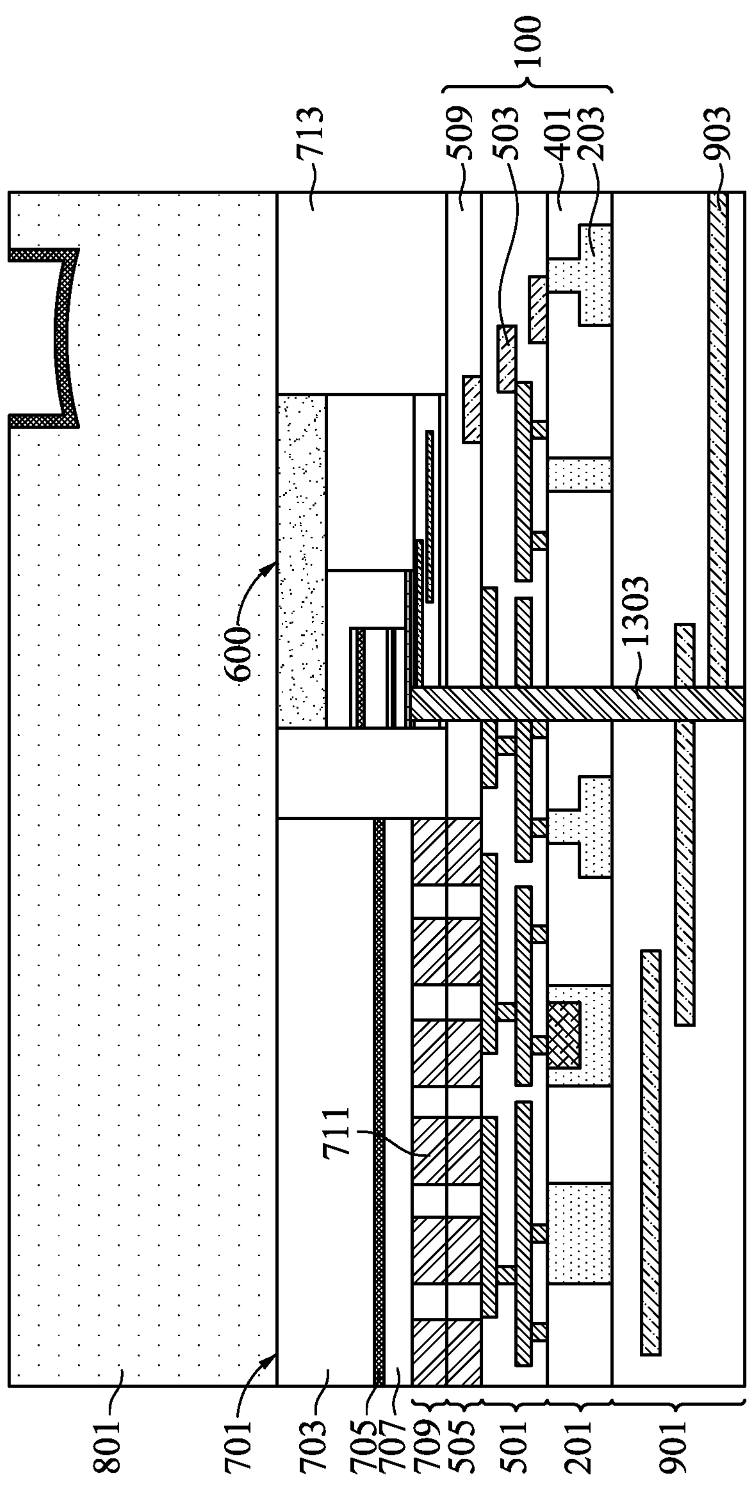

FIG. 13D illustrates a further continuation of the process, wherein the second gap-fill material 713 is deposited between and/or over the first semiconductor device 701 and the laser die 600 and planarized. Further, the support substrate 801 is attached, the first substrate 101 and the first insulative layer 103 are removed, and the second active layer 901 of the fourth optical components 903 is formed. These structures may be formed as described above with respect to FIGS. 7-9, although any suitable structures and processes may be utilized.

FIG. 13D additionally illustrates a formation of laser die vias 1303 (of which only one is illustrated in FIG. 13D) to the laser die 600 through the first active layer 201 of the first optical components 203. In an embodiment the laser die vias 1303 extend through the optical interposer 100 so as to provide a quick passage of power and ground through the optical interposer 100 to the laser die 600. In an embodiment the laser die vias 1303 may be formed by initially forming through device via openings. The through device via openings may be formed by applying and developing a suitable photoresist (not shown), and removing portions of the optical interposer 100 to expose the laser die 600.

Once the through device via openings have been formed within the optical interposer 100, the through device via openings may be lined with a liner. The liner may be, e.g., an oxide formed from tetraethylorthosilicate (TEOS) or silicon nitride, although any suitable dielectric material may alternatively be used. The liner may be formed using a plasma enhanced chemical vapor deposition (PECVD) process, although other suitable processes, such as physical vapor deposition or a thermal process, may alternatively be used.

Once the liner has been formed along the sidewalls and bottom of the through device via openings, a barrier layer (also not independently illustrated) may be formed and the remainder of the through device via openings may be filled with a conductive material. The conductive material may comprise copper, although other suitable materials such as aluminum, alloys, doped polysilicon, combinations thereof, and the like, may be utilized. The conductive material may be formed by electroplating copper onto a seed layer (not shown), filling and overfilling the through device via openings. Once the through device via openings have been filled, excess liner, barrier layer, seed layer, and conductive material outside of the through device via openings may be removed through a planarization process such as chemical mechanical polishing (CMP), although any suitable removal process may be used.

Figure 13E:
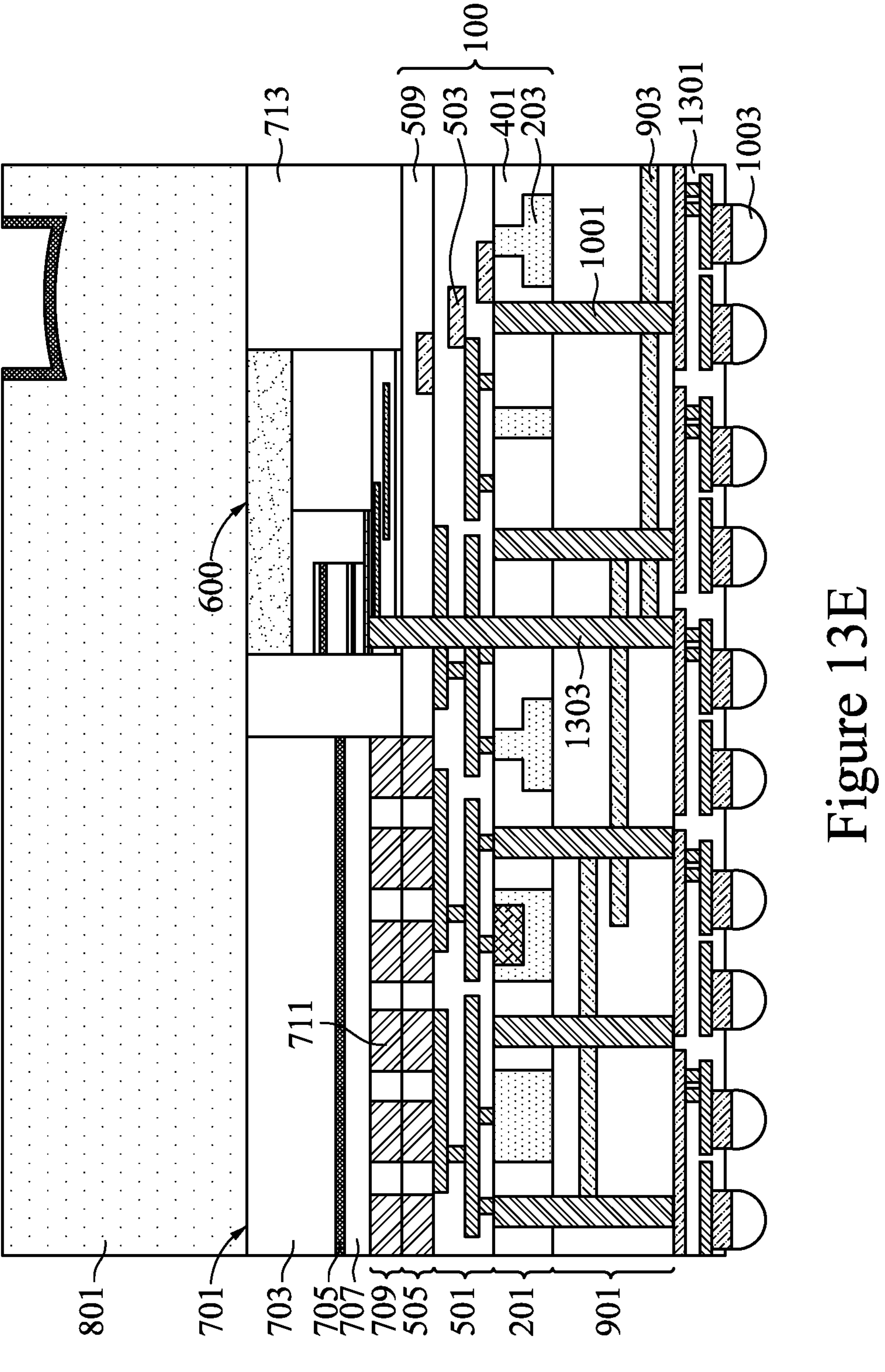

FIG. 13E illustrates a continuation of the process after formation of the laser die vias 1303. For example, the first through device vias 1001 may be formed, the first external connectors 1003 may be placed, and, if desired, the optical fiber 1005 can be connected (not separately illustrated in FIG. 13E). Additionally in this embodiment illustrated in FIG. 13E, the optional second metallization layers (labeled in FIG. 13E as 1301) discussed above with respect to FIG. 10A are formed in order to interconnect the first through device vias 1001 and the laser die vias 1303 and the first external connectors 1003. However, any suitable structures and methods may be utilized.

By using a fusion bond to connect the laser die 600, additional flexibility may be added to the design process of the first optical package 1000. Such flexibility allows the device to obtain all of the benefits of evanescently coupling the laser die 600 to the optical interposer 100 while still allowing designers to locate electrical connections as desired and in their best location for the design.

Figure 13F:
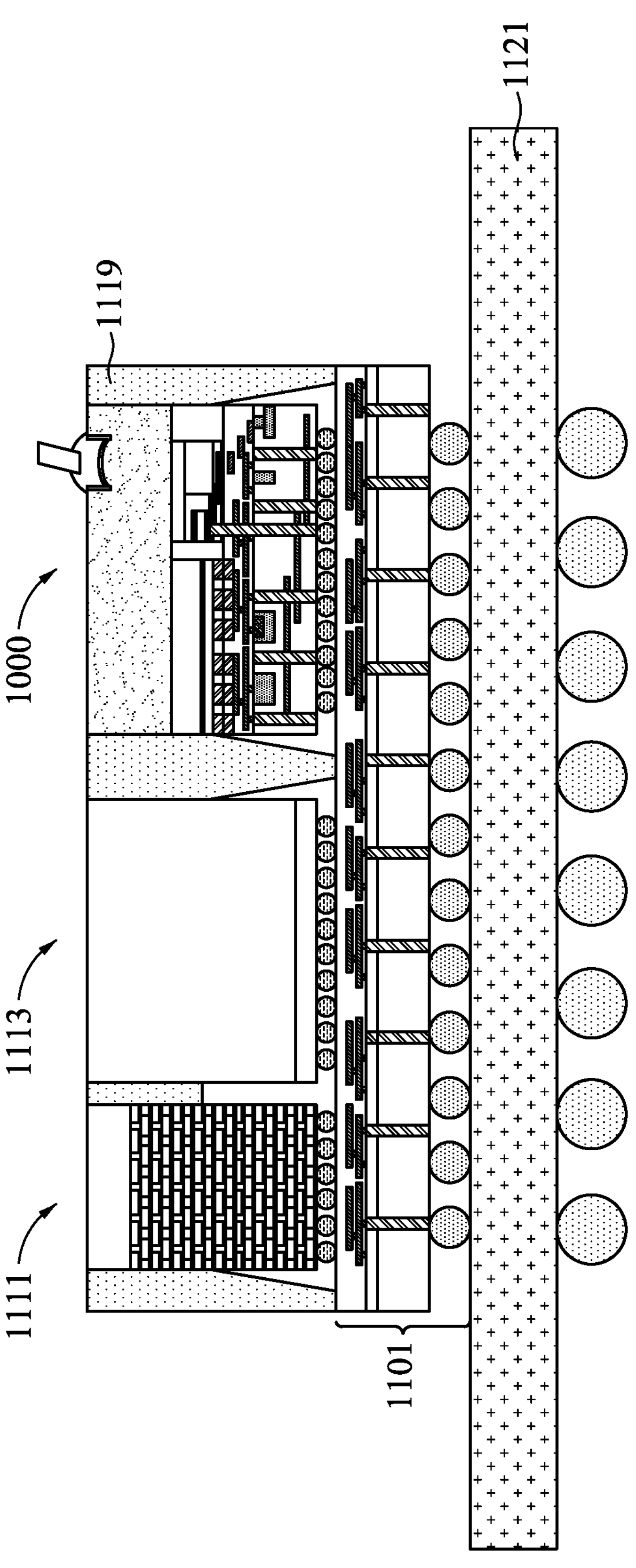
Figure 13G:
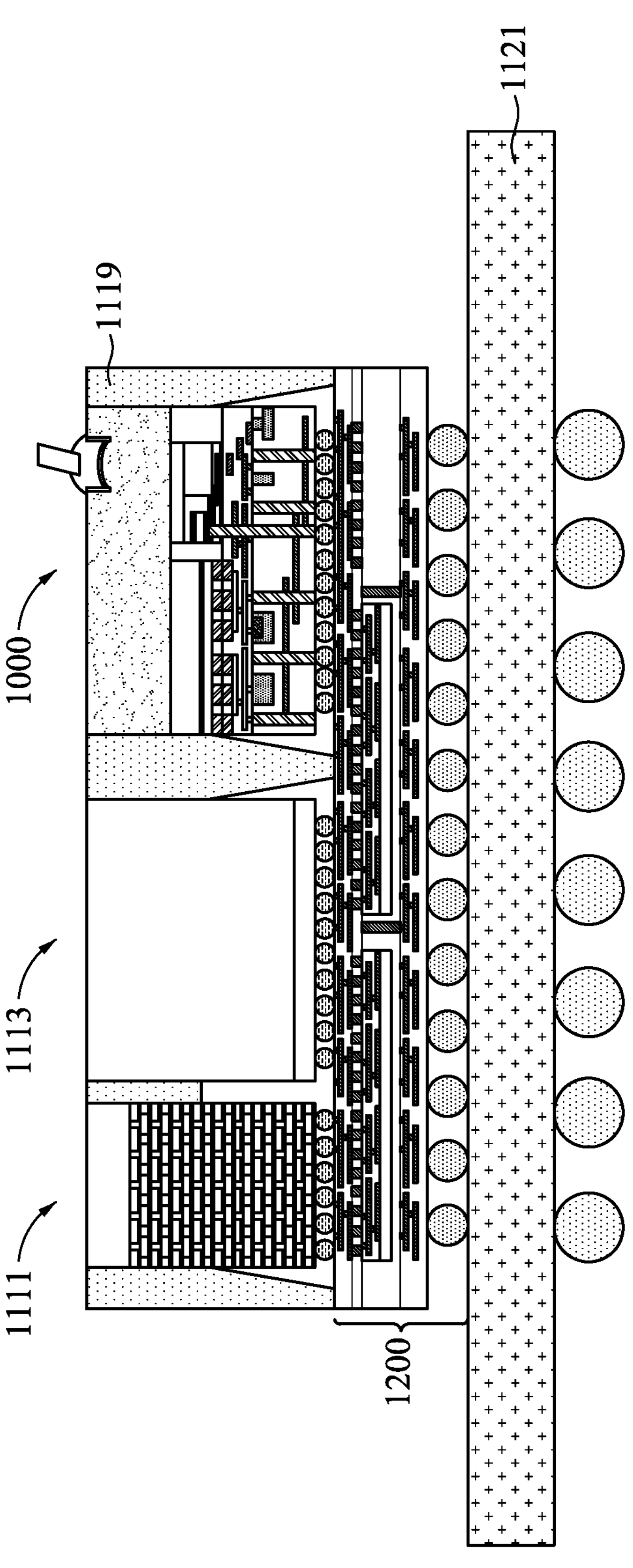

FIGS. 13F-13G illustrate that, once the first optical package 1000 has been formed with the fusion bond, the first optical package 1000 may be incorporated into the structures described above with respect to FIG. 11 and FIG. 12, respectively. In particular, the first optical package 1000 with the fusion bond may be bonded to either the interposer substrate 1101 (FIG. 13F) or the InFO substrate 1200 (FIG. 13G) and processing may be continued as described above with respect to FIGS. 11 and 12. However, any suitable processes and structures may be utilized.

Figures 14A, 14B, 14C, 14D, 14E:
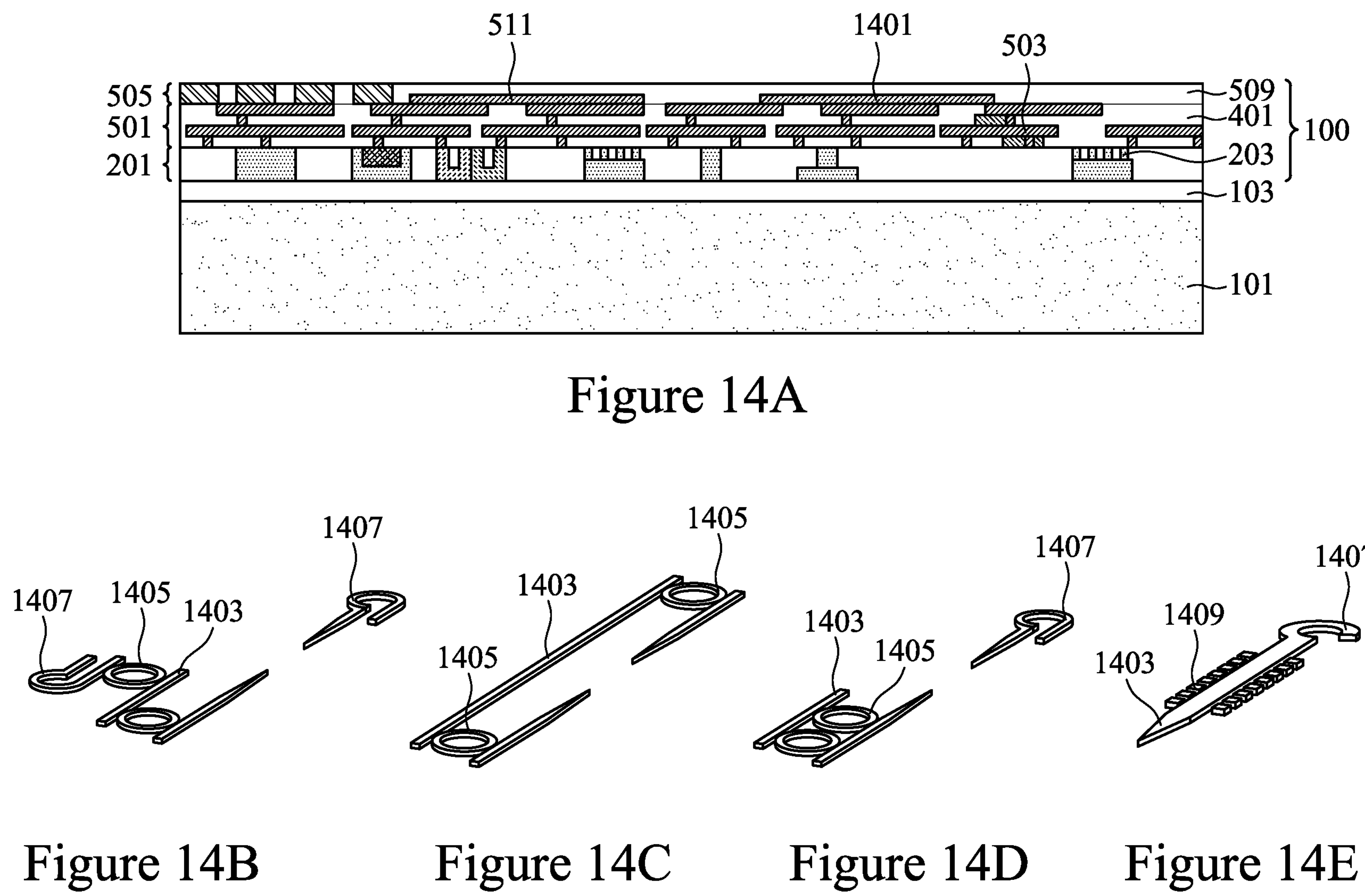

FIG. 14A illustrates other embodiments of coupling the laser die 600 with the optical interposer 100, but in which the laser die 600 is formed in conjunction with an external cavity 1401 that is formed separately from the laser die 600 and as one of the third optical components 511 within the first bonding layer 505, wherein the external cavity 1401 is formed of waveguides that are designed as the light resonant cavity or reflectors. In this embodiment, and looking first at the portion of the first bonding layer 505 illustrated in FIG. 14A, there is illustrated, in addition to other devices (e.g., waveguides, etc.) that are formed as part of the third optical components 511 of the first bonding layer 505, the external cavity 1401 is also formed as part of the first bonding layer 505. In an embodiment the external cavity 1401 may be formed in a similar fashion and using similar processes as the waveguides formed in the second optical components 503, such as by depositing a core material such as silicon nitride over a cladding material and then using, e.g., a photolithographic masking and etching process to shape the core material into the desired shapes before depositing additional cladding material such as the first dielectric material 509 of the first bonding layer 505. However, any suitable materials and any suitable processes may be utilized.

FIGS. 14B-14E illustrate perspective views of various embodiments of the external cavities 1401 that can be formed in the first bonding layer 505. Looking first at FIG. 14B, the external cavity 1401 may have a ring-bus-ring formation which comprises one or more waveguides 1403, one or more rings 1405 coupled with the waveguides 1403, and one or more reflectors 1407. In an embodiment the one or more waveguides 1403 may be used to receive and transmit the light generated by the laser die 600 once the laser die 600 has been attached. In a particular embodiment the one or more waveguides 1403 may include as least one bus waveguide and may be formed by initially depositing a core material such as silicon nitride and then patterning the core material in order to form the waveguide 1403. However, any suitable material and method of manufacture may be utilized.

The one or more rings 1405 may be formed to couple with the waveguide 1403 to form a ring resonator and be used to filter out undesired wavelengths from the light generated by the laser die 600 during operation. In an embodiment the one or more rings 1405 may be formed in a similar fashion and with similar methods as the waveguide 1403 (e.g., depositing and patterning a core material such as silicon nitride). However, any suitable materials and methods of manufacture may be utilized.

The one or more reflectors 1407 may be formed in order to help reflect the light generated by the laser die 600 in a desired direction. In an embodiment the one or more reflectors 1407 may be a Sagnac reflector, which couples light into a ring such that the light travels in both a clockwise and a counter-clockwise rotation, thereby reflecting a portion of the light. In this embodiment the Sagnac reflector may be formed in a similar fashion and with similar methods as the waveguide 1403 (e.g., depositing and patterning a core material such as silicon nitride). However, any suitable reflector, using any suitable materials and methods of manufacture, may be utilized.

FIG. 14C illustrates another embodiment of the external cavity 1401 which may be used, with the external cavity 1401 being manufactured with the one or more waveguides 1403 and the one or more rings 1405. In this embodiment, however, instead of using the one or more reflectors 1407, the one or more waveguides 1403 and the one or more rings 1405 are arranged in a race-track formation, whereby the wavelength filtering is performed by a double ring filter. In this embodiment each component of the external cavity 1401 may be formed in a similar fashion and with similar methods as the one or more waveguides 1403 (e.g., depositing and patterning a core material such as silicon nitride). However, any suitable devices, using any suitable materials and methods of manufacture, may be utilized.

FIG. 14D illustrates yet another embodiment of the external cavity 1401 which utilizes the one or more waveguides 1403, the one or more rings 1405, and the one or more reflectors 1407. In this embodiment the one or more rings 1405 are formed adjacent to each other and coupled to the one or more waveguides 1403 in order to assist in filtering the generated light, while the one or more reflectors 1407 (e.g., a Sagnac reflector) is utilized to reflect part of the light generated by the laser die 600 back in the desired direction. In this embodiment the components of the external cavity 1401 may be formed in a similar fashion and with similar methods as the one or more waveguides 1403 (e.g., depositing and patterning a core material such as silicon nitride). However, any suitable devices, using any suitable materials and methods of manufacture, may be utilized.

FIG. 14E illustrates yet another embodiment of the external cavity 1401 which utilizes the one or more waveguides 1403, the one or more reflectors 1407, and one or more Bragg gratings 1409 in order to help assist a high power single wavelength laser. In this embodiment the one or more reflectors 1407 (e.g., a Sagnac reflector), is manufactured with the one or more waveguides 1403, and the Bragg grating 1409 is manufactured on either side of the one or more waveguides 1403. In this embodiment the Bragg gratings 1409 may be formed in a similar fashion and with similar methods as the one or more waveguides 1403 (e.g., depositing and patterning a core material such as silicon nitride). However, any suitable devices, using any suitable materials and methods of manufacture, may be utilized.

Figures 15A, 15B:
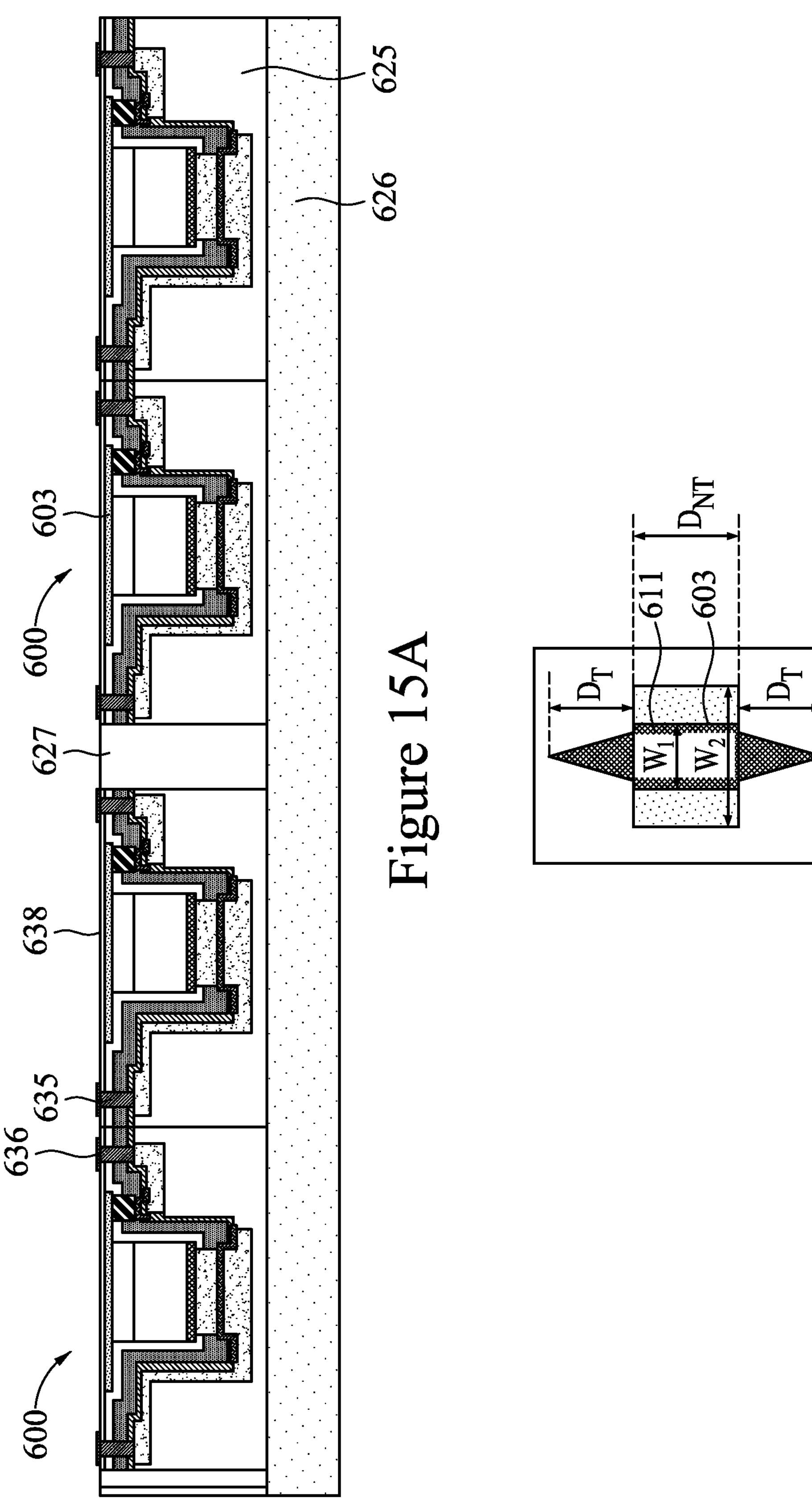

FIG. 15A illustrates the laser die 600 that may be utilized in embodiments in which the external cavity 1401 is formed separately from the laser die 600 and in the optical interposer 100. In this embodiment the laser die 600 may be initially formed as described above with respect to FIGS. 6A-6M. However, in this embodiment, in order to couple to different portions of the external cavities 1401, the laser diode 602 is shaped as illustrated in the top-down view of FIG. 15B, such as having multiple adiabatic taper portions located on opposite sides of the laser diode 602. In an embodiment the shaping can be performed during the etching processes as discussed above with respect to FIG. 6B, such as being a photolithographic masking and etching process prior to deposition of the first passivation layer 613. However, any suitable shape may be utilized.

The laser diode 602, in this top down view, may have the second contact 611 (and unseen underlying layers) having a first width $W_1$ of between about 1 μm and about 4 μm, while the first contact 603 may have a second width $W_2$ of between about 30 μm and about 100 μm. Additionally, the second contact 611 may have adiabatic tapered portions that extend out a tapered distance D T of between about 50 μm and about 300 μm, which leaves a remainder of the second contact 611 having a non-tapered distance $D_{NT}$ of between about 1 mm and about 3 mm. However, any suitable dimensions may be utilized.

FIG. 15A additionally illustrates formation of the second bond pads 636 over the conductive vias 635. In an embodiment the second bond pads 636 may be formed as described above with respect to FIG. 6M. However, any suitable materials and any suitable process of formation may be utilized.

Figures 16, 17A:
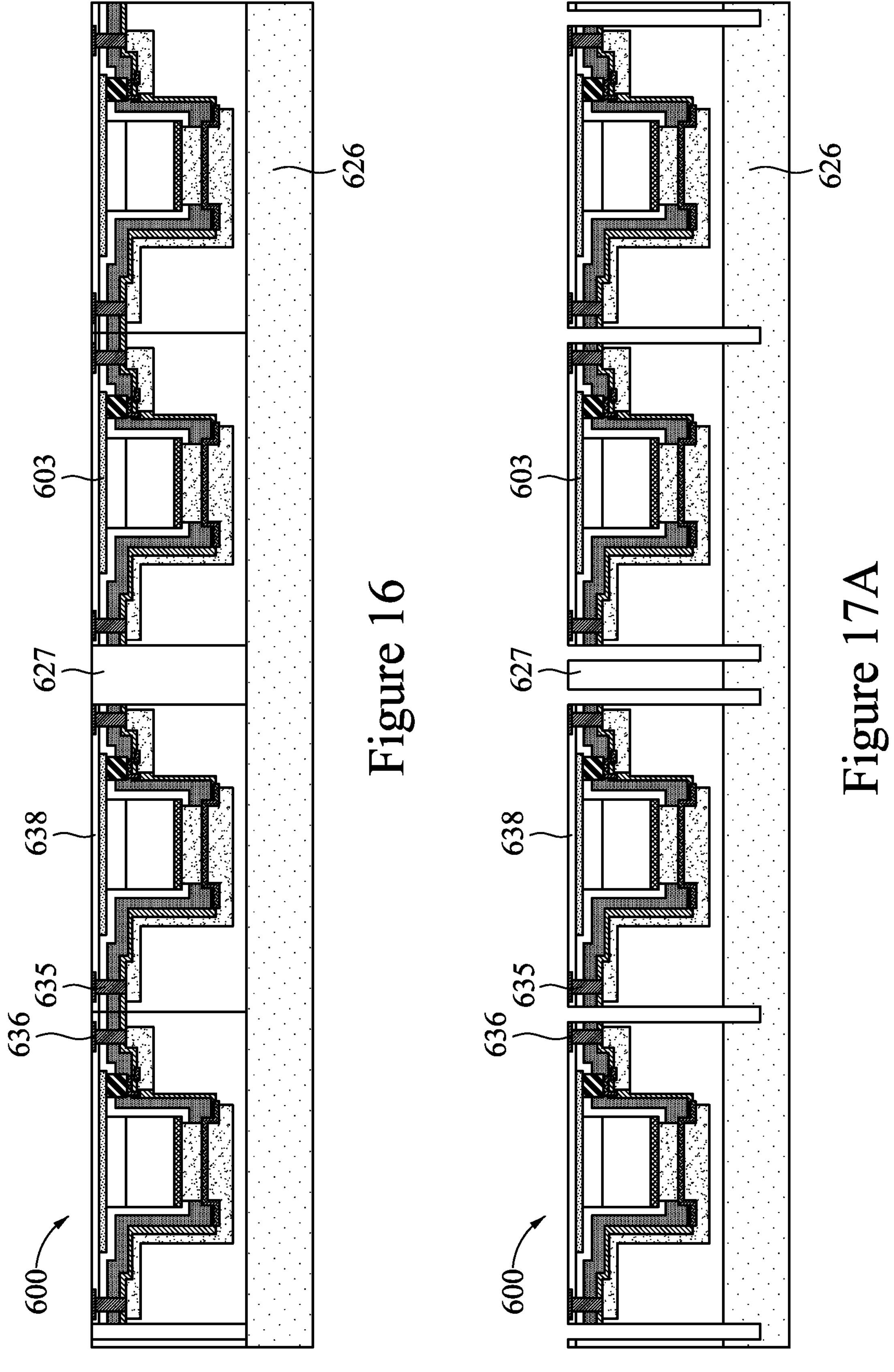

FIG. 16 illustrates deposition and planarization of a fifth passivation layer 638 over the second bond pads 636. In an embodiment the fifth passivation layer 638 may be formed using similar materials and processes as the gap fill material 627 described above with respect to FIG. 6H, such as by being silicon oxide formed using a chemical vapor deposition process. However, any suitable material and process may be utilized.

Once the material of the fifth passivation layer 638 has been deposited, the fifth passivation layer 638 is planarized in order to re-expose the second bond pads 636 and also to thin the second bond pads 636 and the fifth passivation layer 638 in preparation for subsequent coupling with the external cavity 1401. In a particular embodiment the planarization process may be a chemical mechanical polishing process, a grinding process, combinations of these, or the like, and may be used to thin the fifth passivation layer 638 to a thickness suitable for coupling, such as a thickness of between about 50 nm and about 400 nm. However, any suitable process and any suitable thickness may be utilized.

Figure 17B:
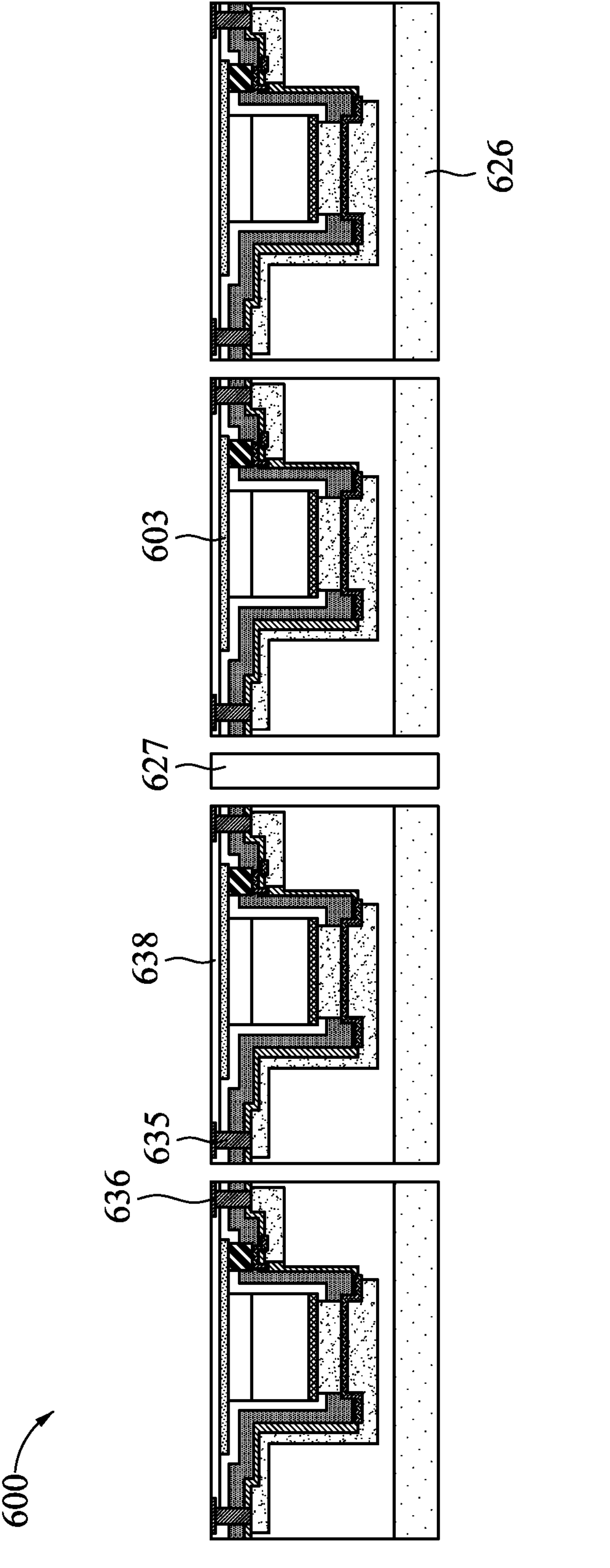

FIGS. 17A-17B illustrate a singulation process that may be used in order to singulate the individual laser dies 600 in preparation for bonding. In an embodiment, and as illustrated in FIG. 17A, the singulation process is initiated by etching openings between the individual laser dies 600 and at least partially, but not fully, into the semiconductor substrate 626. However, any suitable method of partially dicing the laser dies 600, such as by a laser dicing process, may also be used.

FIG. 17B illustrates that, once the laser dies 600 have been partially diced, the semiconductor substrate 626 may be thinned in order to expose the openings and finish the singulation. In an embodiment the thinning may be performed using, e.g., a planarization process such as a grinding process, a chemical mechanical polishing process, combinations of these, or the like. However, any suitable thinning process may be utilized.

Figure 18A:
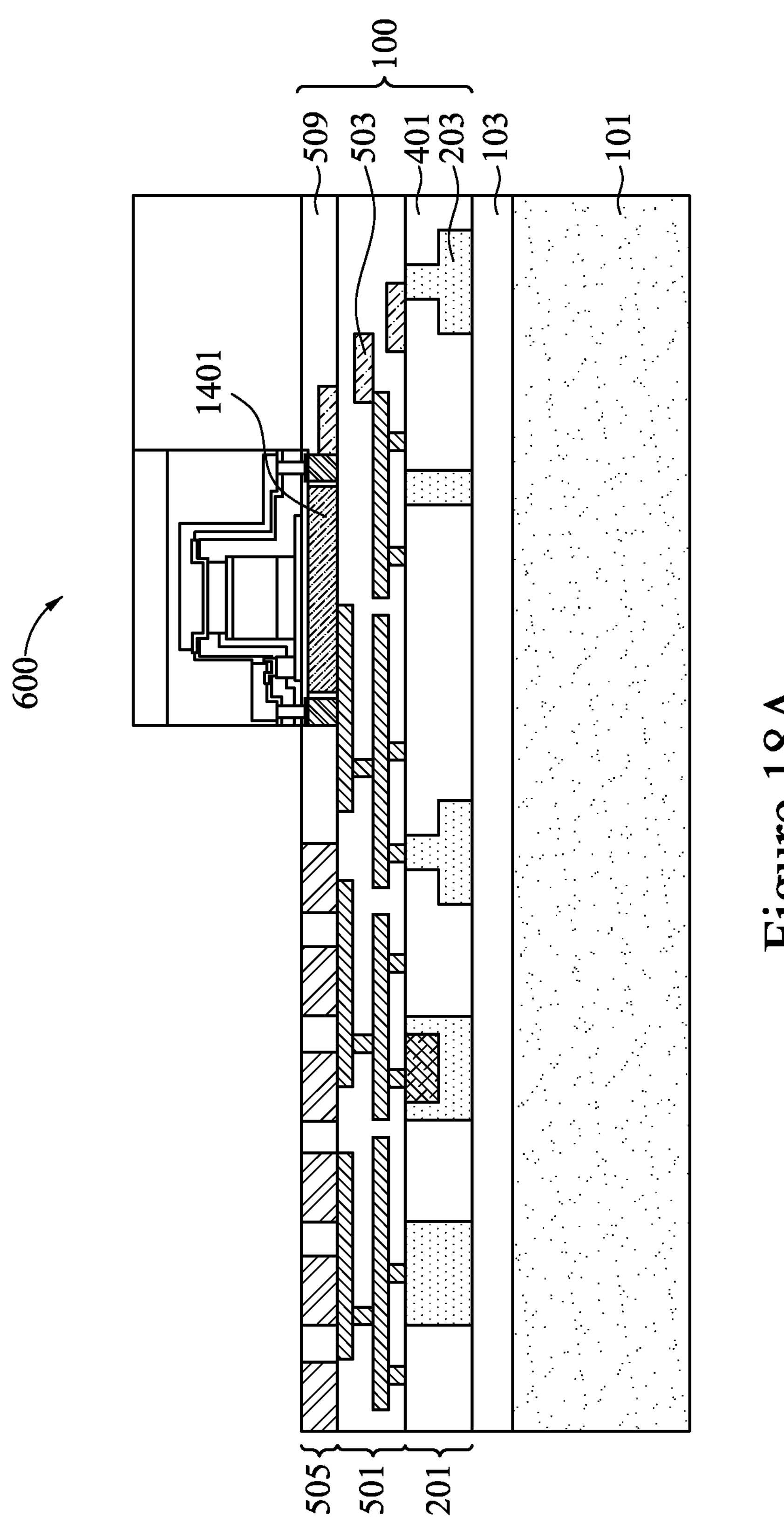
Figures 18B, 18C, 18D, 18E:
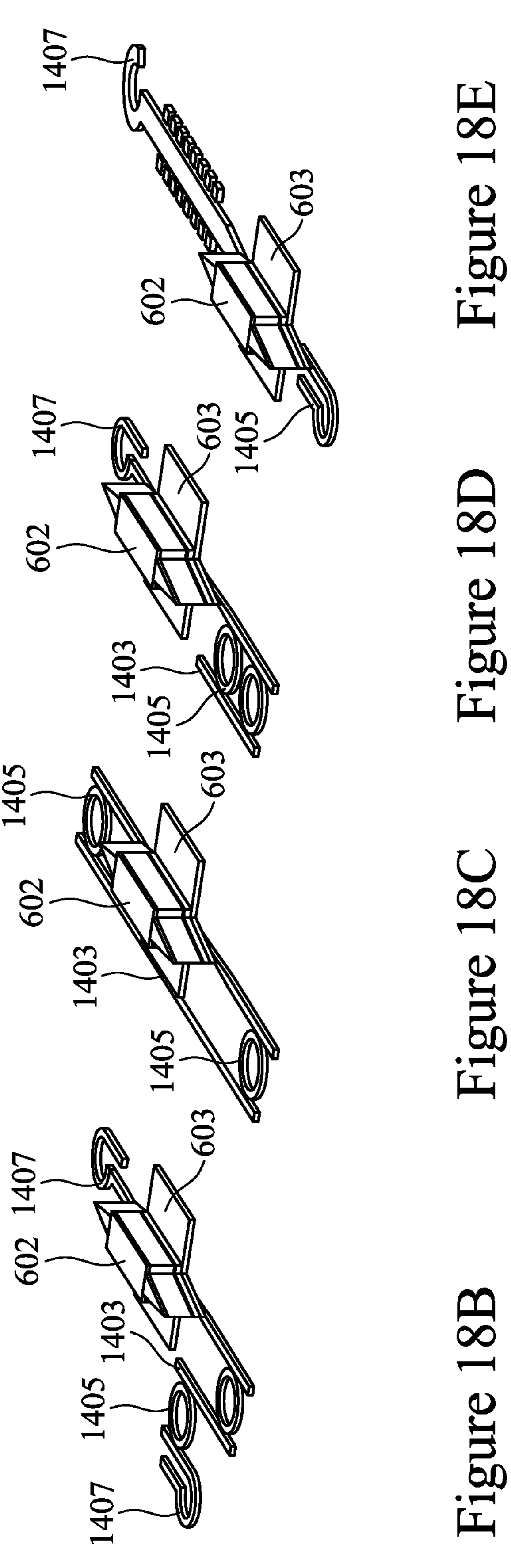

FIG. 18A illustrates bonding the laser die 600 to the first bonding layer 505. In an embodiment the laser die 600 is positioned such that the laser diode 602 within the laser die 600 is coupled with the underlying external cavity 1401 within the first bonding layer 505. The alignment may be performed using, e.g., a pick and place process, although any suitable process may be utilized.

Once the laser die 600 has been aligned with the external cavity 1401, the laser die 600 is physically and electrically bonded to the first bonding layer 505. In an embodiment the bonding may be performed as described above with respect to FIG. 7, such as by using a dielectric-to-dielectric and metal-to-metal bonding process. However, any suitable bonding process may be utilized.

Of course, while the bonding of the laser die 600 coupled with the external cavity 1401 has been described above using, e.g., a dielectric-to-dielectric and metal-to-metal bond, this is intended to be illustrative and is not intended to be limiting to the embodiments. Rather, any suitable bonding may be utilized, such as the fusion bonding process described above with respect to FIGS. 13A-13E. For example, the laser die 600 may be coupled with the external cavity 1401 using only dielectric bonding, and a laser die via 1303 may be subsequently formed in order to provide power and ground connections once the bonding has been completed. Any suitable method of bonding and connecting the laser die 600 with the first bonding layer 505 may be utilized.

FIG. 18B-18E illustrate three dimensional views similar to the three-dimensional views illustrated in FIGS. 14B-14E, but with the addition of the laser diodes 602. As can be seen, the laser diodes 602 will generate the light, which will be coupled into the underlying external cavities 1401, where the light will be filtered, reflected, or the like, separately from the generation of the light before being routed to other devices.

Figure 19A:
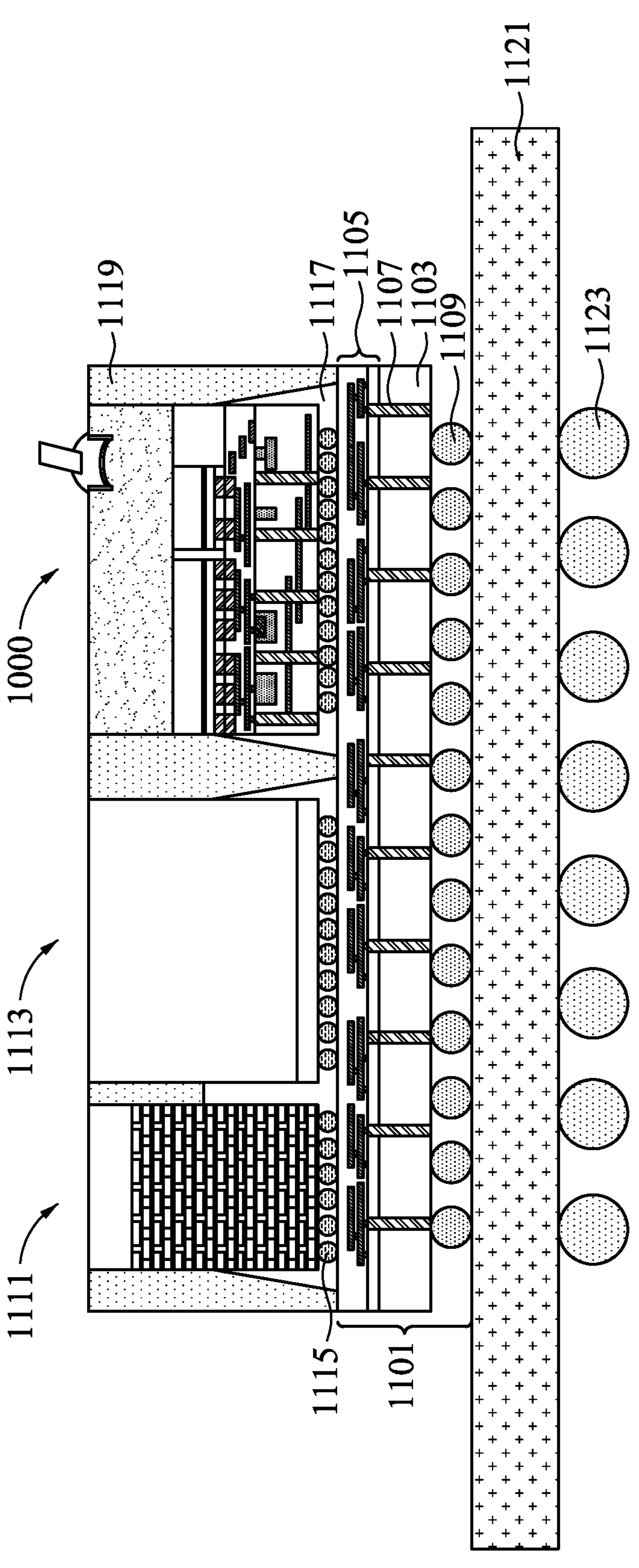

FIG. 19A illustrates that, once the laser die 600 has been bonded such that the laser die 600 is coupled with the external cavity 1401, the process may be continued as described above with respect to FIGS. 8-12. For example, the first semiconductor device 701 is bonded to the optical interposer 100, the first optical package 1000 is completed and bonded to the interposer substrate 1101 along with the second semiconductor device 1111 and the third semiconductor device 1113, and the interposer substrate 1101 may be bonded to the second substrate 1121. However, any suitable attachments and any suitable manufacturing processes may be utilized.

Figure 19B:
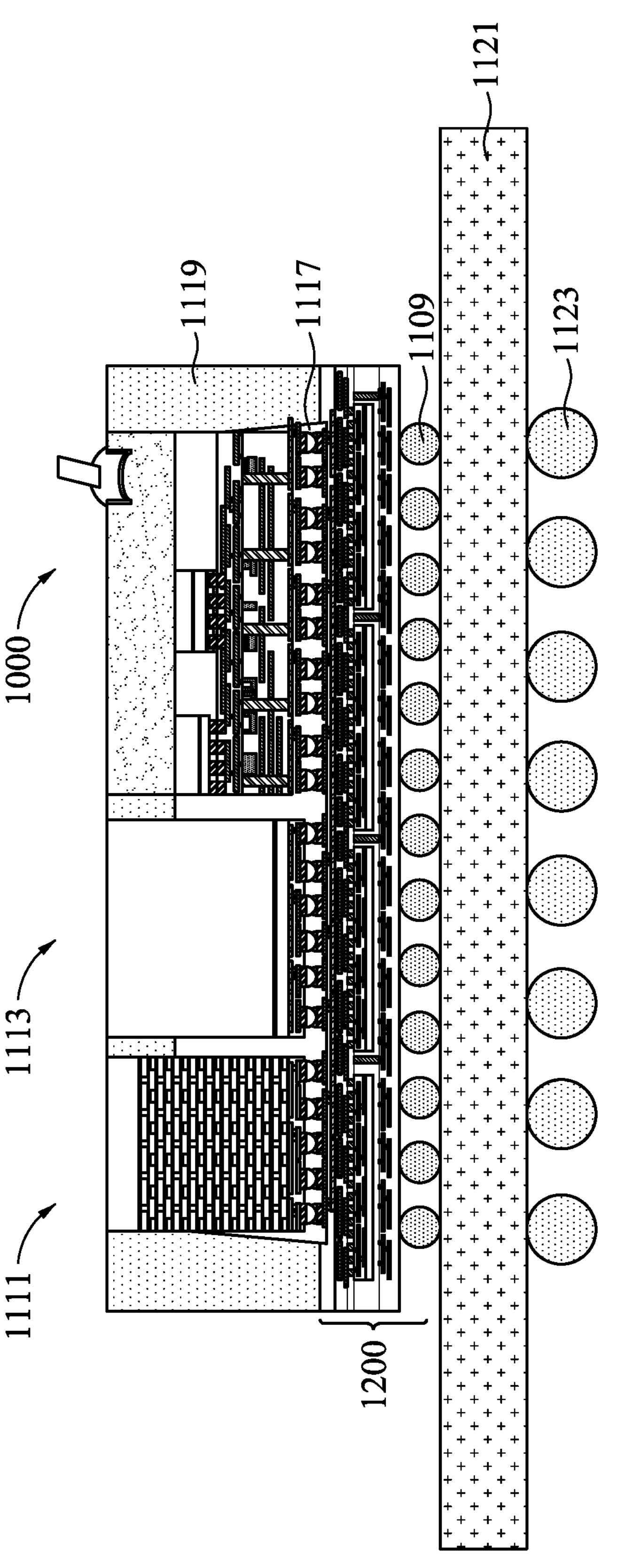

FIG. 19B illustrates another embodiment which utilizes the InFO substrate 1200. In this embodiment the first semiconductor device 701 is bonded to the optical interposer 100, the first optical package 1000 is completed and bonded to the InFO substrate 1200 along with the second semiconductor device 1111 and the third semiconductor device 1113, and the InFO substrate 1200 may be bonded to the second substrate 1121. However, any suitable attachments and any suitable manufacturing processes may be utilized.

By using the external cavity 1401 as described above, multiple benefits are obtained. For example, using the external cavity 1401 means that the filtering of the wavelengths generated by the laser diode 602 is performed separately from the laser diode 602 and by the waveguides (e.g., the ring resonators, the distributed Bragg reflectors, etc.) that are located in the first bonding layer 505. As such, the materials in the laser diode 602 (e.g., the III-V materials) don't take charge in the wavelength selection. Accordingly, the amplification process can be free from damage caused by grating etchings and modal confinement definitions, thereby simplifying the manufacturing of the materials. Additionally, the ease in such a manufacturing process means the design can be versatile and can be based on the desired function of the laser, such as including ring resonators for a narrow bandwidth and tunable laser design, or by including distributed Bragg reflectors for a high power single wavelength laser, or by realizing multiple laser designs at once on the same chip.

Additionally, by forming the external cavity 1401 in the first bonding layer 505, the external cavity 1401 can be formed of silicon nitride or silicon, which are robust and resistive to a high power of light interaction without forming sidewall voids or defects, thereby prolonging the lifespan of the laser die 600. Further, when silicon nitride is utilized, the advantages of silicon nitride, such as being more resistive to thermal fluctuations (hence maintenance of optical properties while experiencing slight temperature fluctuations) is obtained, as well as having a waveguide which is less lossy, which decreases the required electrical driven power that is utilized. Finally, the laser linewidth is enhanced compared to, e.g., silicon-based cavity materials, giving the laser die 600 better performance in terms of more intricate modulation requirements.

Figure 20A:
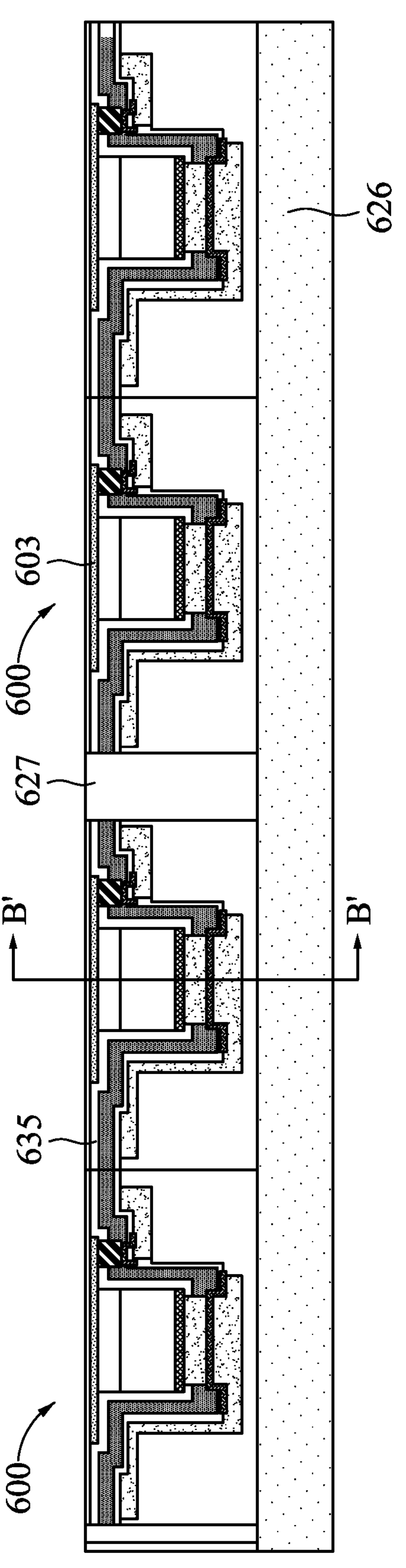
Figure 20B:
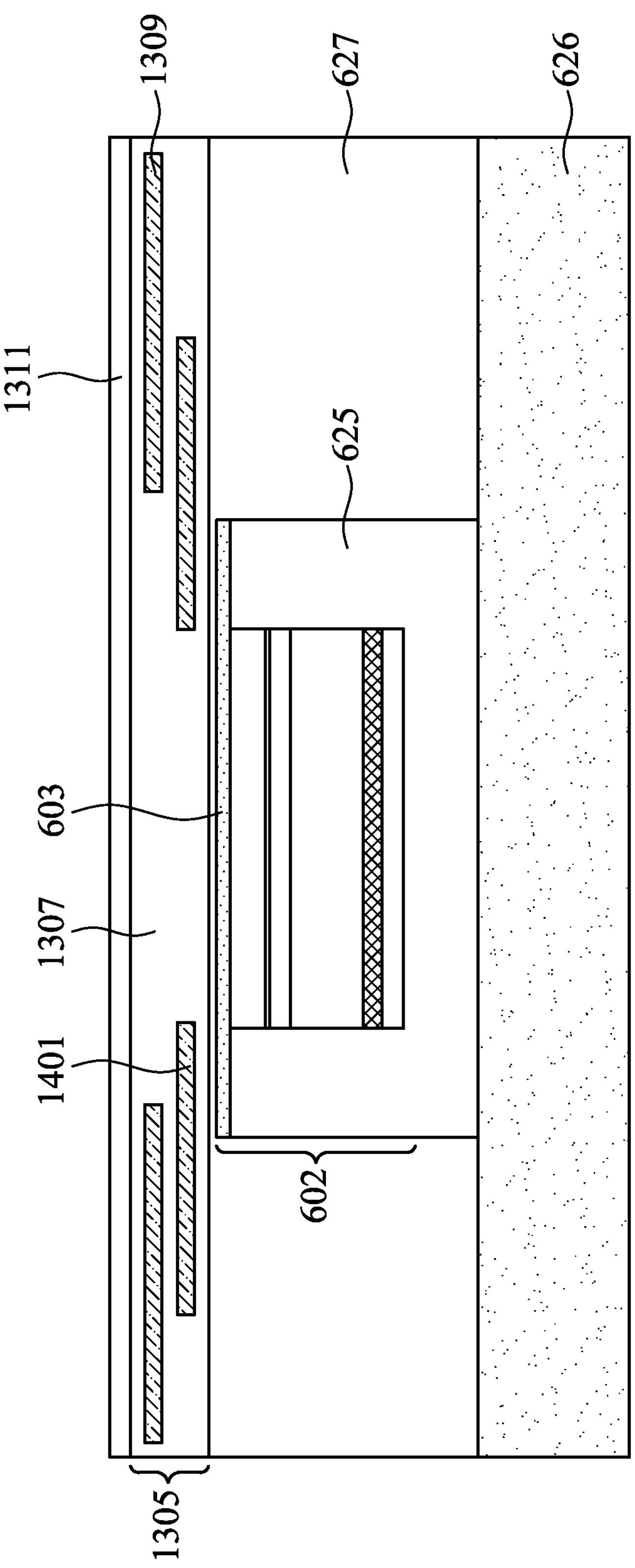

FIG. 20A illustrates another embodiment of separately manufacturing the external cavity 1401, with FIG. 20B illustrating a lateral view of FIG. 20A through line B-B'. In these embodiments, the laser die 600 is bonded to the optical interposer 100 using the fusion bond instead of a dielectric-to-dielectric and metal-to-metal bond. Looking first at FIG. 20A, in this embodiment the laser die 600 is formed in a similar fashion as described above with respect to FIGS. 15A-15B, but without the formation of the second bond pads 636 and the conductive vias 635. However, any suitable structures and methods of manufacture may be utilized.

FIG. 20B illustrates a formation of the second active layers 1305 of the fifth optical components 1309 over the gap fill material 627 and formation of the sixth passivation layer 1311. In this embodiment the second active layers 1305 of the fifth optical components 1309 may be formed as described above with respect to FIG. 13A, such as by depositing a core material such as silicon nitride, patterning the core material, and depositing a cladding material over the core material, and then depositing the sixth passivation layer 1311. However, any suitable structures and materials may be utilized.

In this embodiment, however, in addition to any of the other desired structures that may be manufactured as part of the fifth optical components 1309, the external cavities 1401 may be manufactured as part of the fifth optical components 1309. For example, any of the external cavities 1401 described above with respect to FIGS. 14B-14E (e.g., a ring-bus-ring formation with a Sagnac reflector, a race-track formation, etc.) may be manufactured as part of the fifth optical components 1309, such that light generated by the laser diode 602 enters the external cavity 1401. However, any suitable design may be utilized.

Figure 20C:
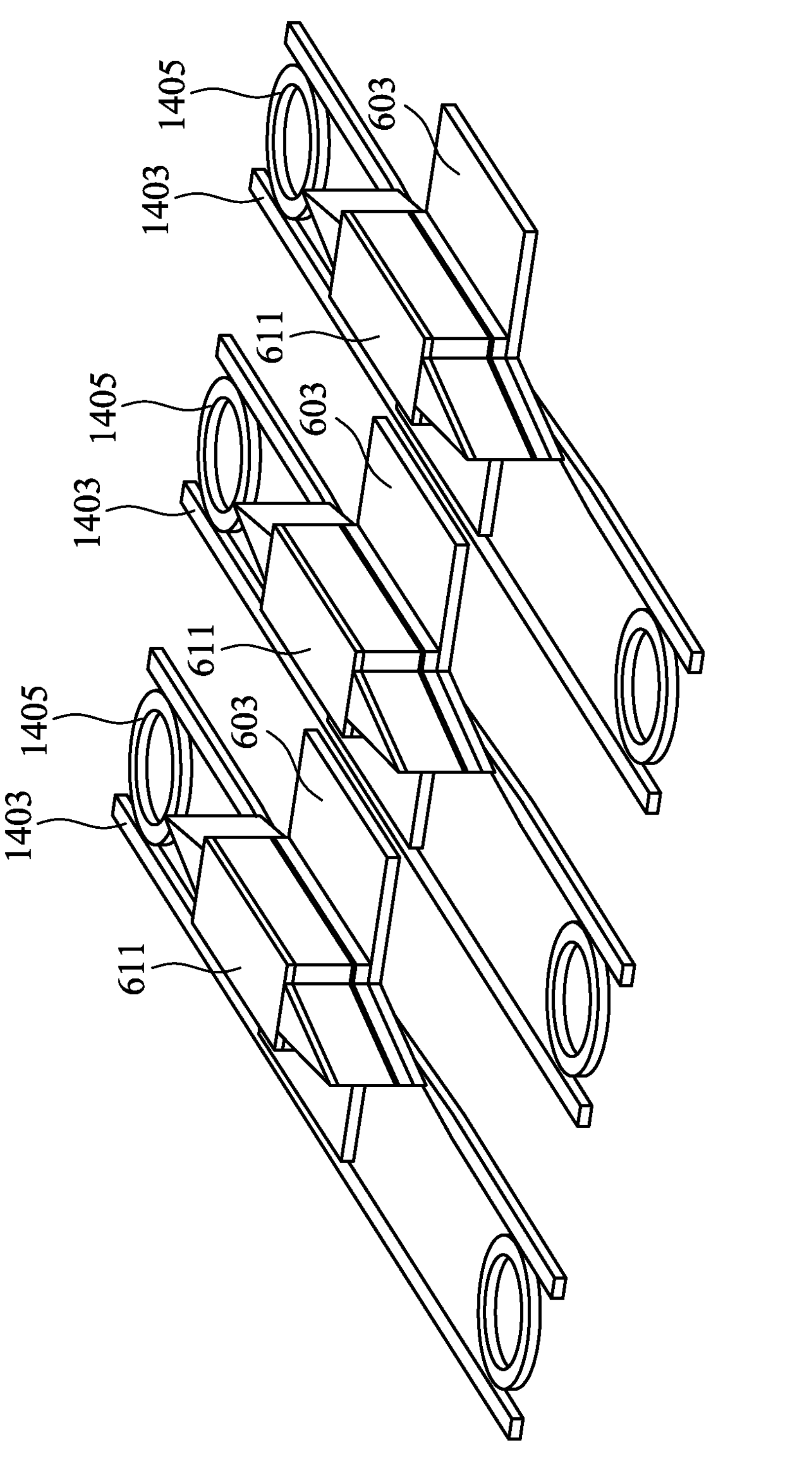

FIG. 20C illustrates a three-dimensional, perspective view of the external cavities 1401 being manufactured as part of the fifth optical components 1309 with the laser diodes 602, with three laser diodes 602 being illustrated in this illustrated embodiment. In the embodiment illustrated the external cavities 1401 are manufactured in the racetrack configuration and are located such that light generated by the laser diodes 602 are captured by the external cavities 1401, where the light may be filtered before being routed to other devices.

Figure 20D:
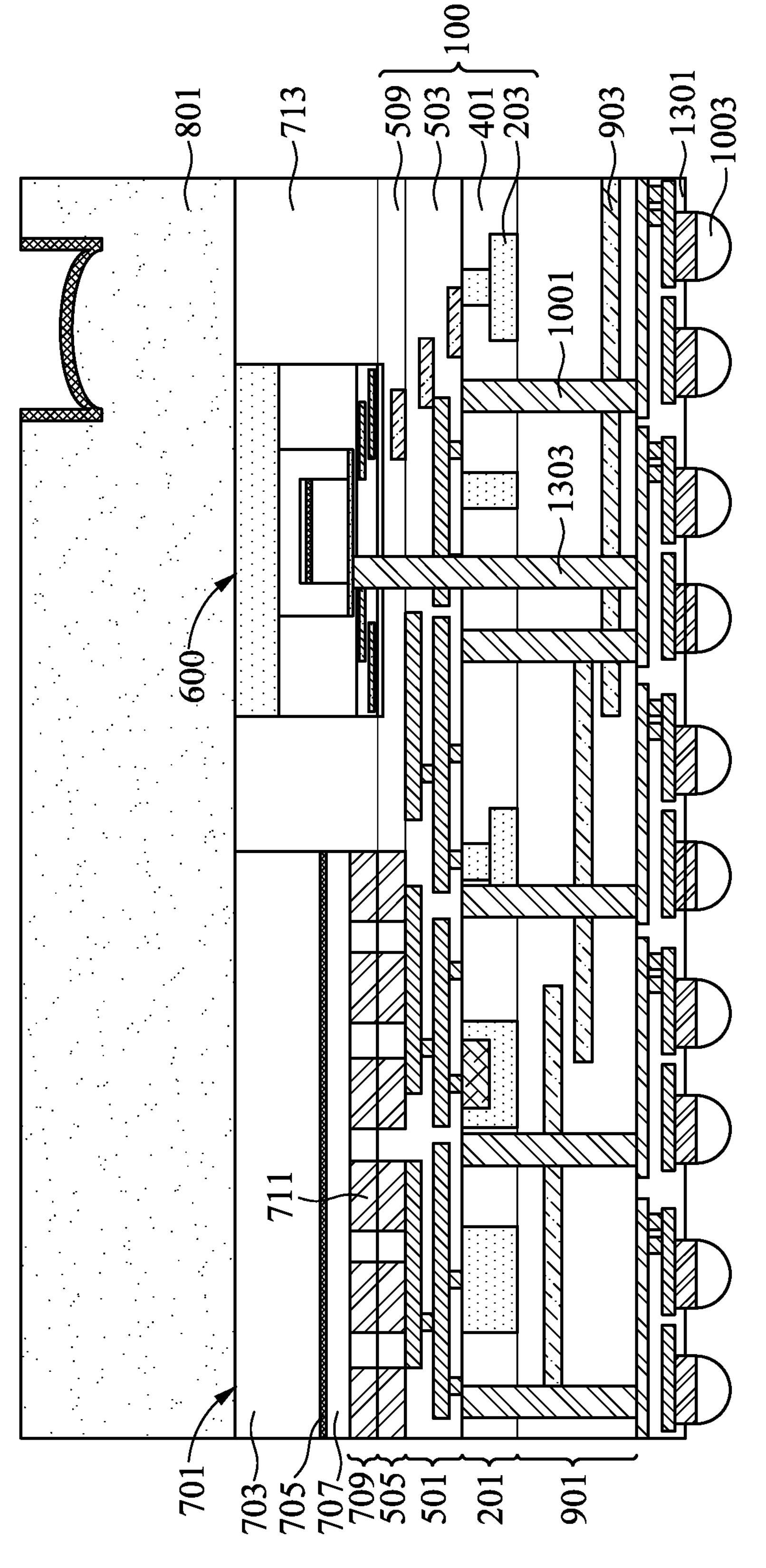

FIG. 20D illustrates a bonding of the laser die 600 to the optical interposer 100 using only the sixth passivation layer 1311 and the first dielectric material 509 of the first bonding layer 505. In this embodiment there are no conductive contacts within the optical interposer 100 where the laser die 600 will be attached, and the surface remains a portion of the first dielectric material 509 of the first bonding layer 505. In an embodiment the bonding process may be performed as described above with respect to FIG. 13C, although any suitable process may be utilized, such that the fifth optical components 1309 are coupled with the third optical components 511 of the first bonding layer 505.

FIG. 20D further illustrates a continuation of the process after the laser die 600 has been bonded with no electrical connections. In particular, once the laser die 600 has been bonded, the first semiconductor device 701 is bonded to the first bonding layer 505 using, e.g., a dielectric-to-dielectric and metal-to-metal bonding process as described above with respect to FIG. 7. However, any suitable process may be utilized.

Additionally, once the first semiconductor device 701 has been bonded, the second gap-fill material 713 is deposited between and/or over the first semiconductor device 701 and the laser die 600 and planarized. Further, the support substrate 801 is attached, the first substrate 101 and the first insulative layer 103 are removed, and the second active layer 901 of the fourth optical components 903 is formed. These structures may be formed as described above with respect to FIGS. 7-9, although any suitable structures and processes may be utilized.

The process continues with a formation of the laser die vias 1303 (of which only one is illustrated in FIG. 20D) to the laser die 600 through the first active layer 201 of the first optical components 203. In an embodiment the laser die vias 1303 may be manufactured as described above with respect to FIG. 13D, although any suitable methods may be utilized. Once the laser die vias 1303 have been formed, the first through device vias 1001 may be formed, the first external connectors 1003 may be placed, and, if desired, the optical fiber 1005 can be connected (not separately illustrated in FIG. 20D). Additionally in this embodiment illustrated in FIG. 20D, the optional second metallization layers 1301 discussed above with respect to FIG. 10A are formed in order to interconnect the first through device vias 1001 and the laser die vias 1303 and the first external connectors 1003. However, any suitable structures and methods may be utilized.

Figure 20E:
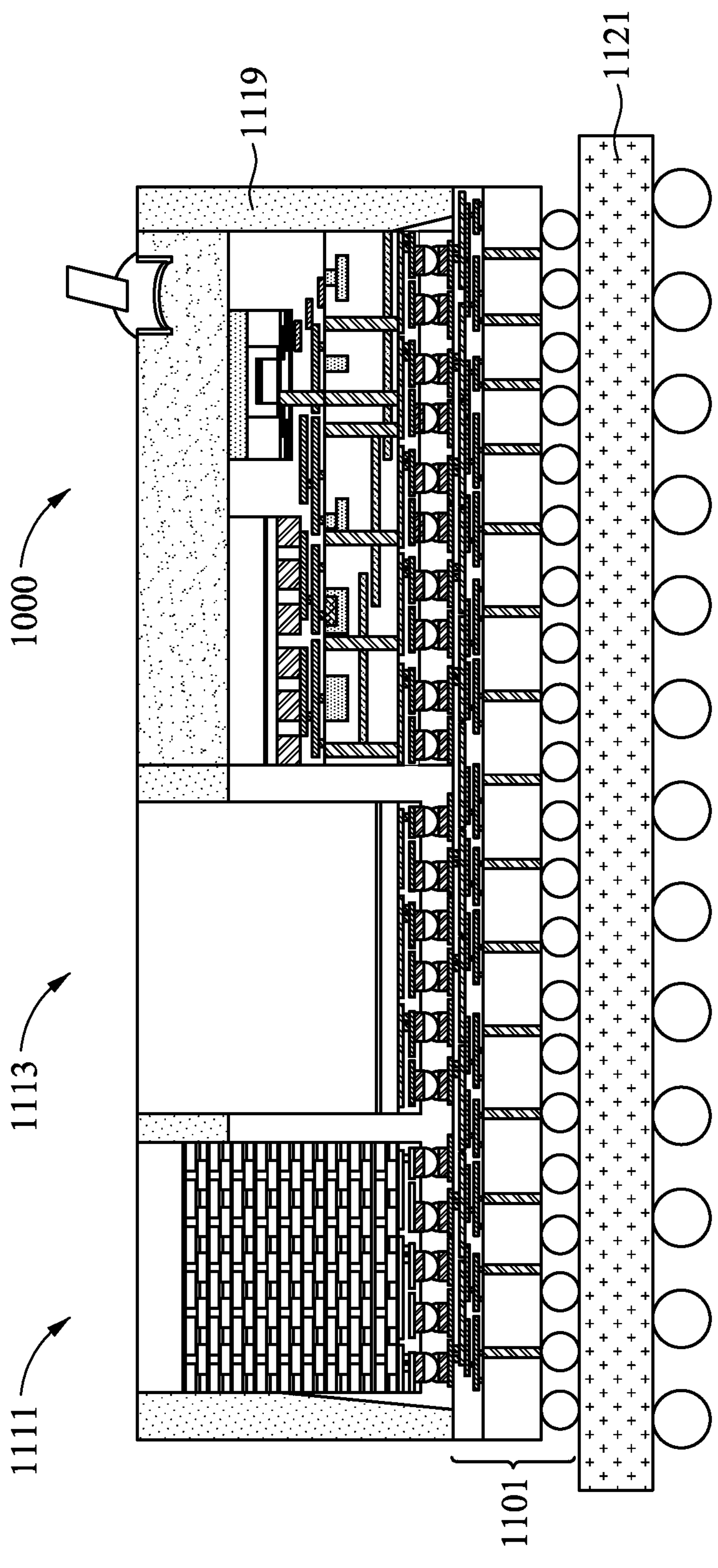
Figure 20F:
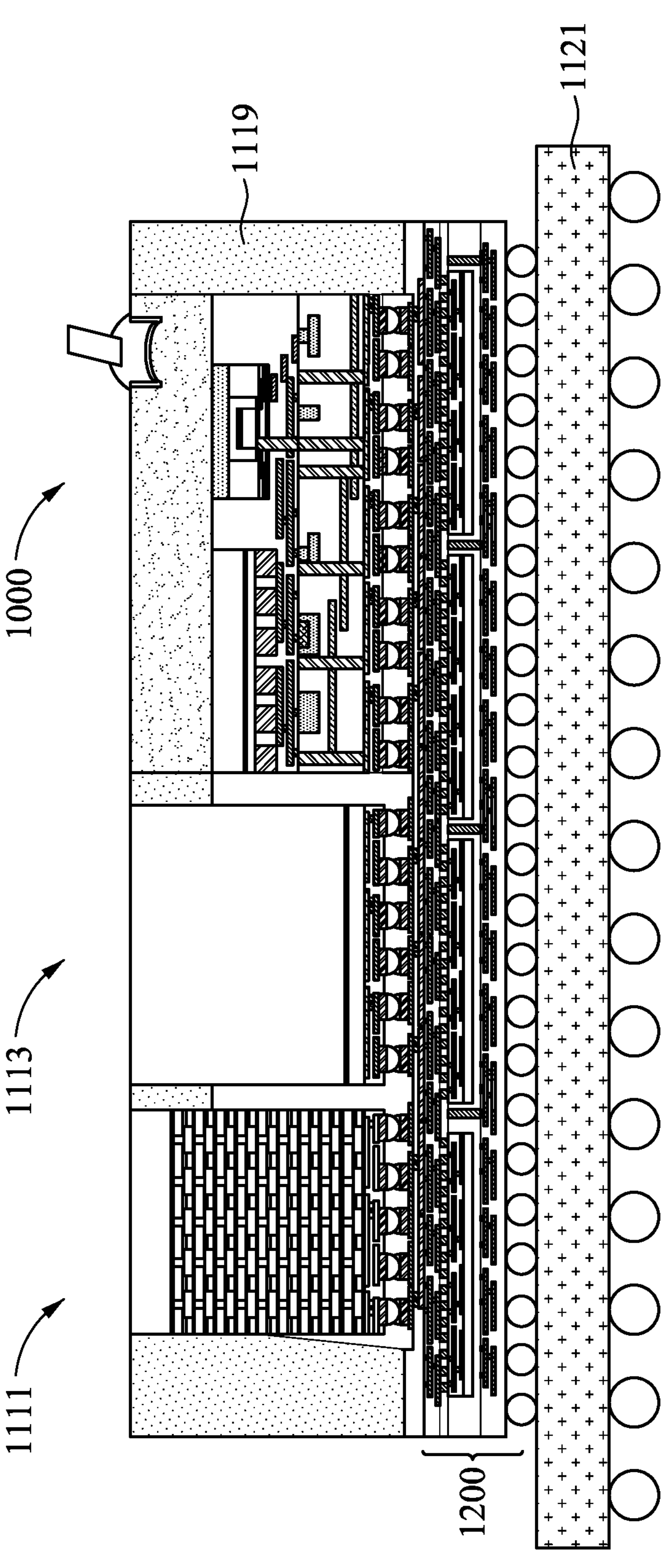

FIGS. 20E-20F illustrate that, once the first optical package 1000 has been formed with the external cavities 1401, the first optical package 1000 may be incorporated into the structures described above with respect to FIG. 11 and FIG. 12, respectively. In particular, the first optical package 1000 with the external cavities 1401 may be bonded to either the interposer substrate 1101 (FIG. 20E) or the InFO substrate 1200 (FIG. 20F) and processing may be continued as described above with respect to FIGS. 11 and 12. However, any suitable processes and structures may be utilized.

Figures 21A, 21B:
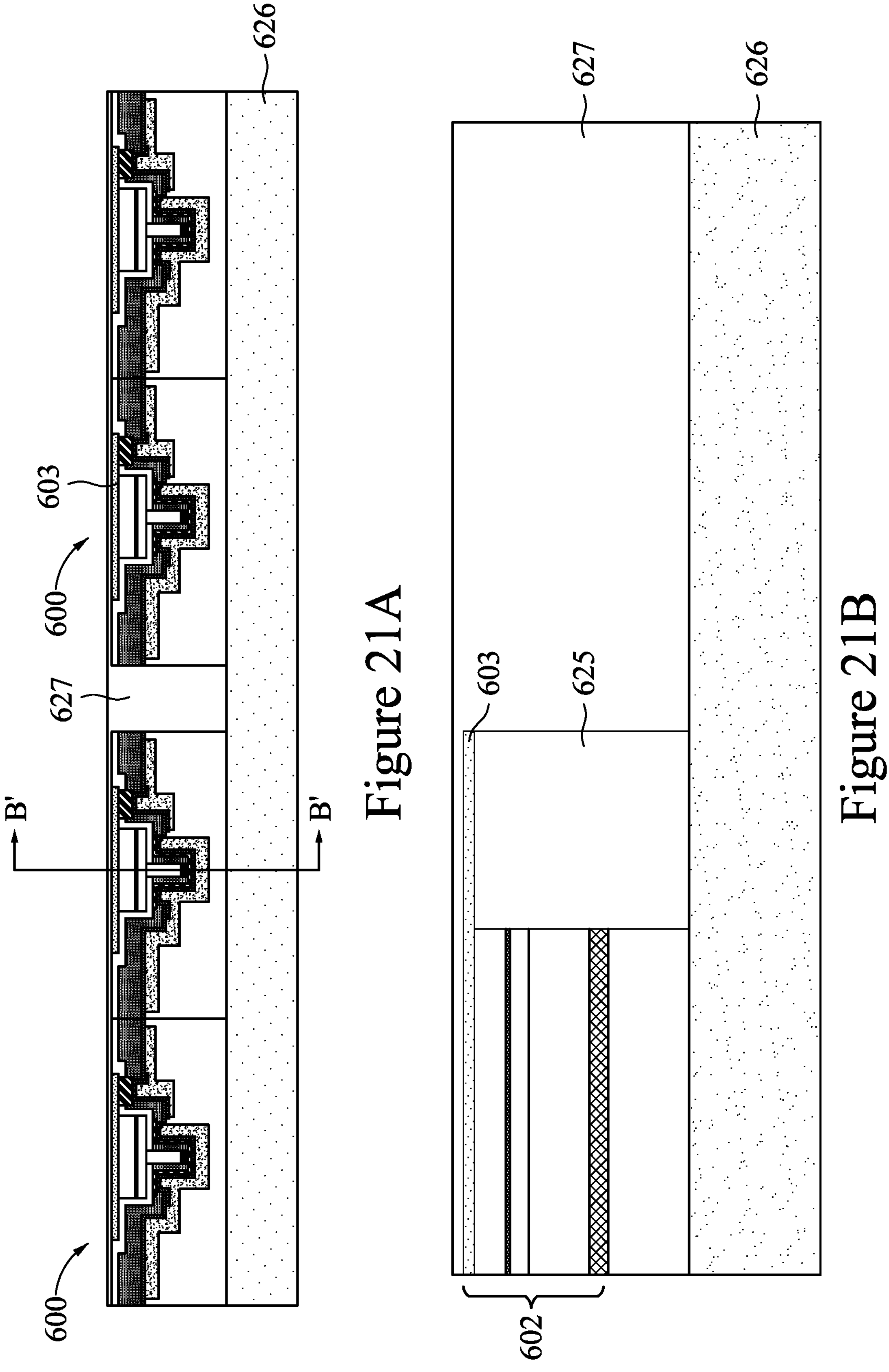

FIGS. 21A-25B illustrate yet another embodiment to transmit light from the laser die 600. In this embodiment, however, the laser die 600 is embedded within a transmission device 2300 (not illustrated as completed in FIG. 21A) and light is transmitted from the transmission device 2300 to a receiving device 2400 (not illustrated in FIG. 21A but illustrated and described further below with respect to FIG. 24) through, e.g., external couplers such as a first external coupler 2201 and a second external coupler 2401 (also not illustrated in FIG. 21A but illustrated and described further below with respect to FIGS. 22A-22G and 24). FIG. 21A illustrates a cross-sectional view of the structure described above with respect to FIG. 6K and FIG. 21B illustrates a lateral view of the structure of FIG. 21A through line B-B'. In this embodiment the structure of FIGS. 21A-21B may be manufactured as described above with respect to FIGS. 6A-6K. However, any suitable structures and any suitable methods of manufacture may be utilized.

Figure 22A:
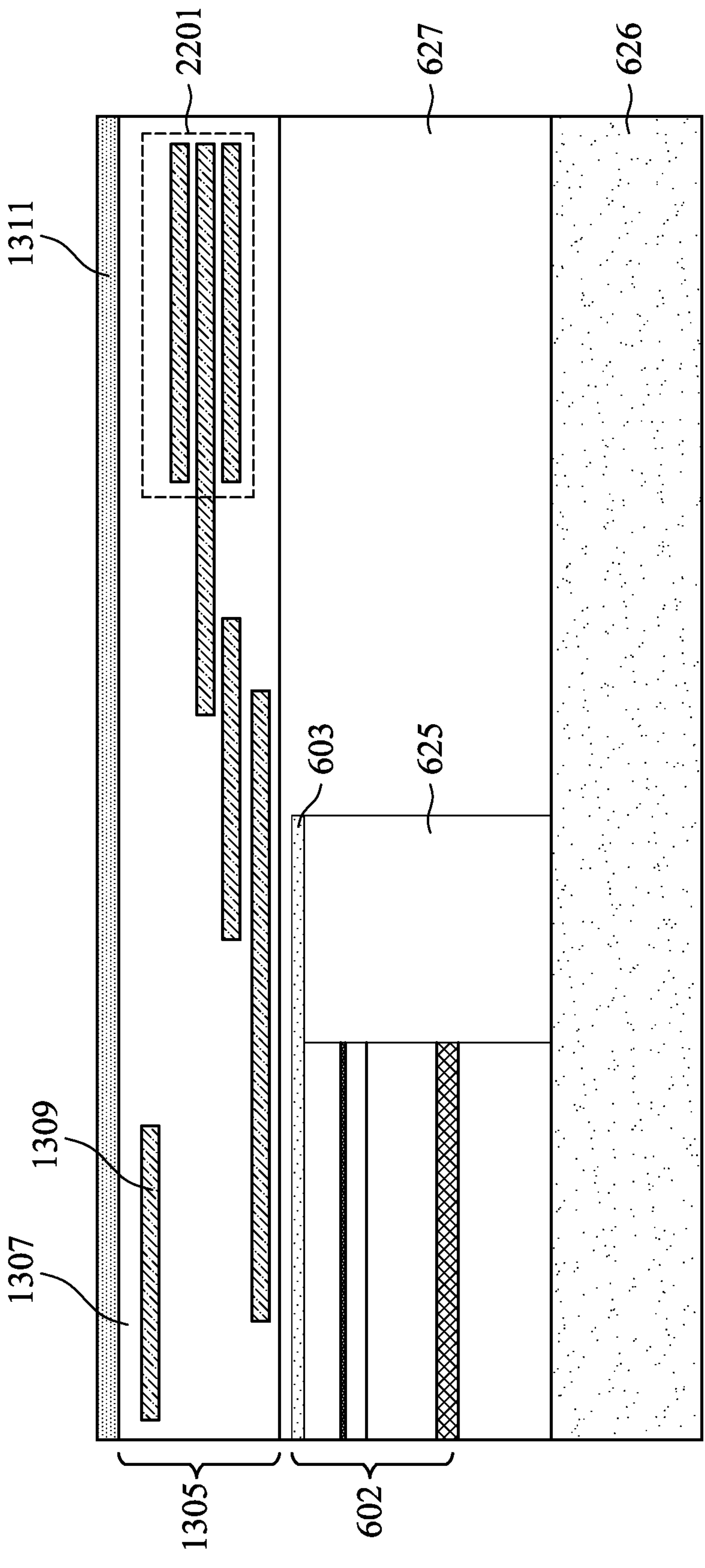

FIG. 22A illustrates formation of the second active layers 1305 of fifth optical components 1309 that will be used to couple the transmission device 2300 to the receiving device 2400. In an embodiment, the second active layer 1305 of the fifth optical components 1309 may be formed of alternating layers of cladding material 1307 (e.g., a dielectric such as silicon oxide) and the fifth optical components 1309, as described above with respect to FIG. 13A. However, any suitable structures and methods of manufacture may be utilized.

However, in this embodiment, in addition to the otherwise formed fifth optical components 1309 (e.g., waveguides that are used to route light), the second active layer 1305 of fifth optical components 1309 in this embodiment further includes a first external coupler (represented in FIG. 22A by the structures located within the dashed box labeled 2201). In an embodiment the first external coupler 2201 is utilized to receive the light generated by the laser diode 602 and transmit the light out of the transmission device 2300. In a particular embodiment the first external coupler 2201 may be an edge coupler, such as a multi-core edge coupler, a single core tapered edge coupler, combinations of these, or the like. However, any suitable external coupler may be utilized.

Figure 22B:
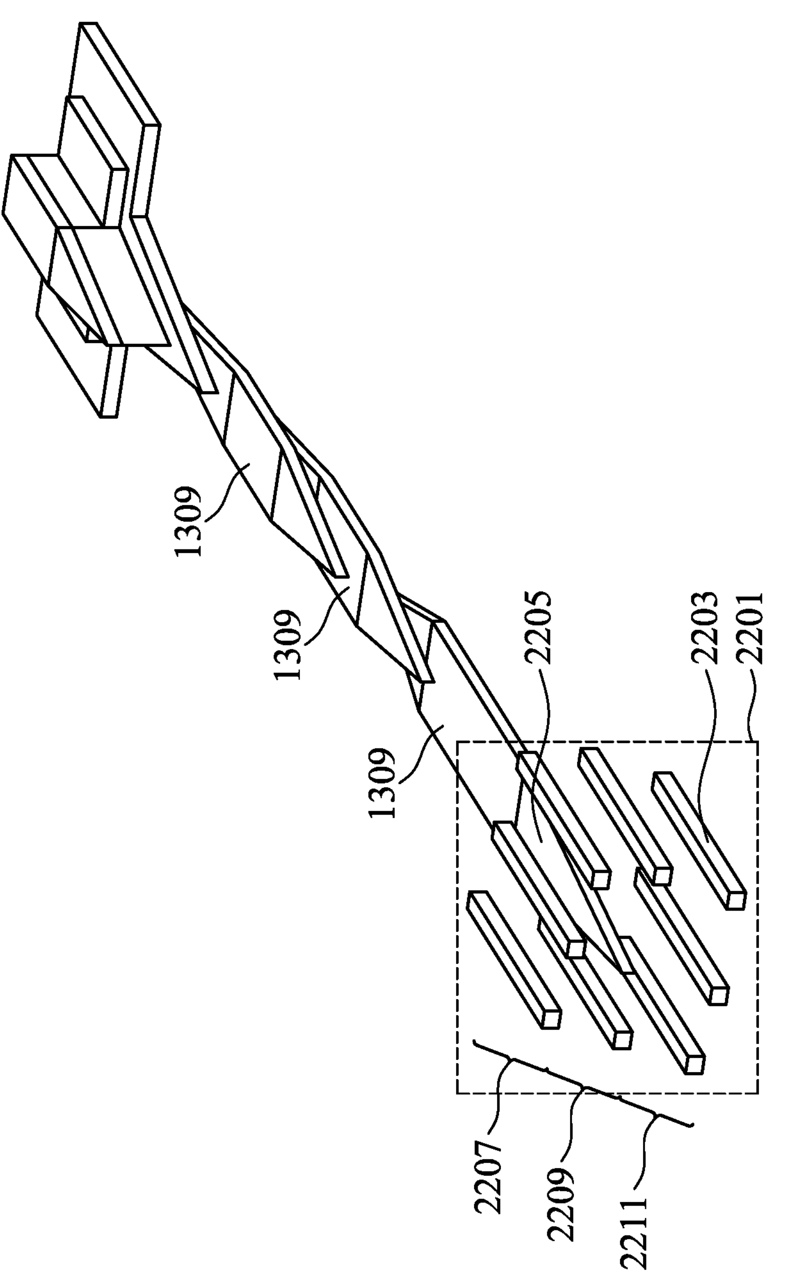
Figure 22B:

FIG. 22B illustrates a three-dimensional, perspective view of the first external coupler 2201 in an embodiment in which the first external coupler 2201 is a multi-core edge coupler. In the embodiment in which the first external coupler 2201 is a multi-core edge coupler, the first external coupler 2201 may comprise a plurality of cores 2203 located around a tapered portion 2205, wherein the tapered portion 2205 is formed continuously with a waveguide portion of the fifth optical components 1309. In this figure the surrounding structures, such as cladding material and the like which are also utilized for support, have been removed in order to more easily illustrate the structure of this embodiment of the first external coupler 2201.

In an embodiment the plurality of cores 2203 is formed in a similar fashion and using similar materials as the other components of the fifth optical components 1309, such as the optical waveguides (e.g., depositing a core material such as silicon nitride, patterning the core material, and depositing a cladding material over the core material). Further, in this embodiment there are eight cores 2203 array in three levels, such as a first level 2207, a second level 2209, and a third level 2211. The first level 2207 may have three cores 2203 aligned with each other, the second level 2209 may have two cores 2203 aligned with each other, and the third level 2211 may have three cores 2203 aligned with each other, in a 3-2-3 configuration. Additionally, each of the cores 2203 are aligned with other cores located in a same column. However, any suitable numbers of cores 2203 and any suitable number of levels may be utilized.

Figure 22C:
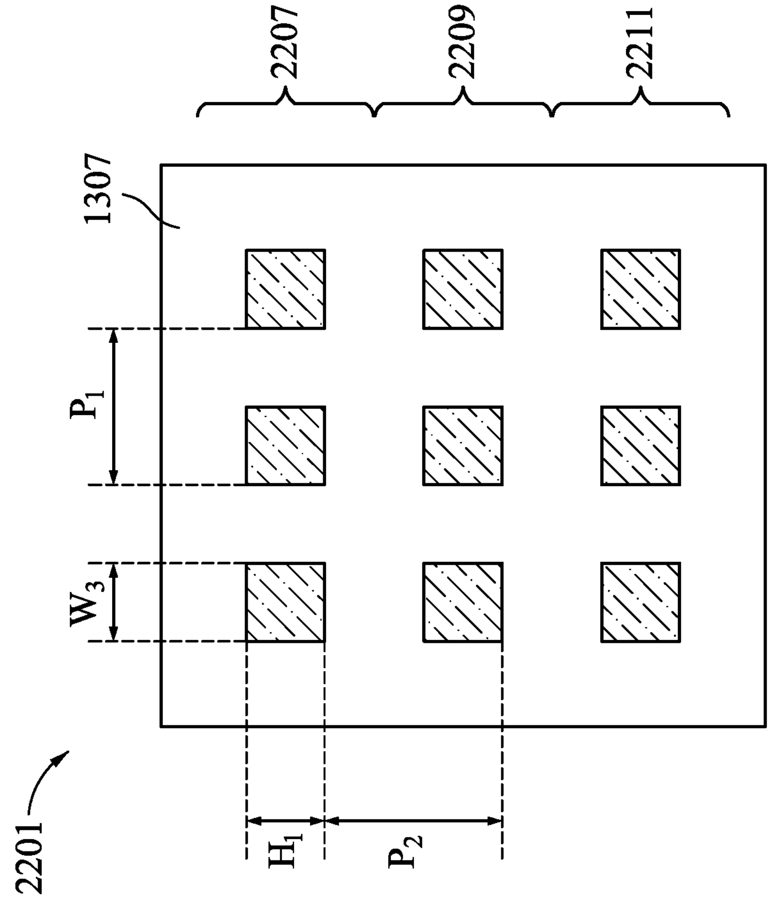

FIG. 22C illustrates a cross-sectional view of the embodiment illustrated in FIG. 22B, wherein the cores 2203 are arranged in a 3-2-3 configuration, with three cores in the first level 2207, two cores 2203 in the second level 2209, and three cores 2203 in the third level 2211. In this figure the surrounding cladding material (e.g., the cladding material 1307) is illustrated around the first external coupler 2201, but no other structures are illustrated in this figure. Further, in this embodiment the individual cores 2203 may each have the same dimensions, although in other embodiments the individual cores 2203 may be formed to have different dimensions. In a particular embodiment the cores 2203 may have a third width $W_3$ of between about 0.2 μm to about 0.6 μm, and may have a first height $H_1$ of between about 0.1 μm and about 0.3 μm, such as about 0.15 μm. Additionally, the cores 2203 may be spaced apart from each other in a first direction with a first pitch $P_1$ of between about 2 μm and about 0.6 μm and may be spaced apart from each other in a second direction with a second pitch $P_2$ of between about 1 μm and about 4 μm, such as about 2.1 μm. However, any suitable dimensions may be utilized.

Figures 22D, 22E, 22F:
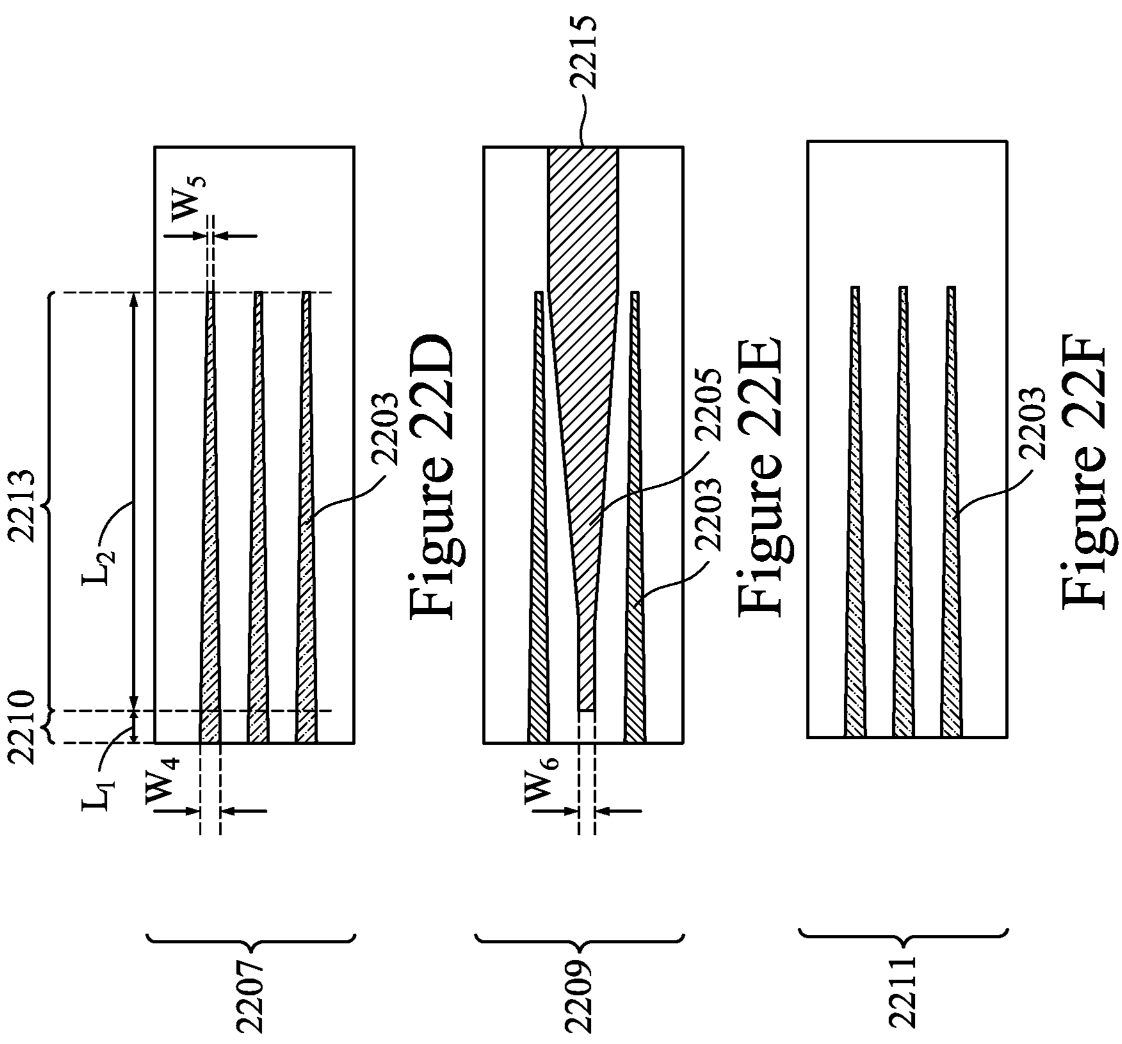

FIGS. 22D-22F illustrates top-down views of the first level 2207, the second level 2209, and the third level 2211 of the first external coupler 2201, respectively. In the illustrated embodiment in FIG. 22D, the individual cores 2203 each have a non-tapered portion 2210 and a tapered portion 2213. In an embodiment the non-tapered portion 2210 may be formed to have a first length $L_1$ of between about 10 μm and about 40 μm and may have a fourth width $W_4$ of between about 100 nm and about 400 nm. Additionally, the tapered portion 2213 may have a second length $L_2$ of between about 400 μm and about 2000 μm, and may taper down from the fourth width $W_4$ to a fifth width $W_5$ of between about 100 nm and about 300 nm. However, any suitable dimensions may be utilized.

FIG. 22E illustrates a top down view of the second level 2209, which includes two cores 2203 with similar dimensions as the cores 2203 in the first level 2207 (discussed above with respect to FIG. 22D). The second level 2209 additionally includes a waveguide 2215 with the tapered portion 2205, wherein the tapered portion 2205 tapers in an opposite direction from the tapered portion 2213 of the cores 2203. In this embodiment the tapered portion 2205 may have the second length $L_2$ and taper down to a tip that has a sixth width $W_6$ of between about 100 nm and about 300 nm. However, any suitable dimensions may be utilized.

FIG. 22F illustrates a top down view of the third level 2211, which includes three cores 2203 with similar dimensions as the cores 2203 in the first level 2207 (discussed above with respect to FIG. 22D). However, in other embodiments each of the cores 2203 in the third level 2211 may have different dimensions.

Figure 22G:
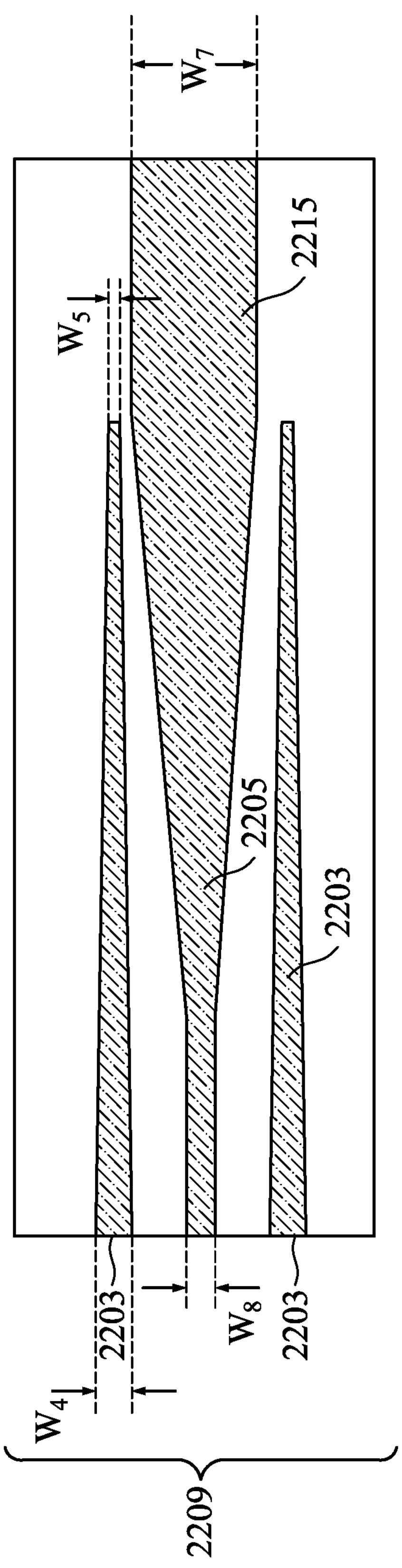

FIG. 22G illustrates another embodiment of the waveguide 2215, the tapered portion 2205, and the cores 2203, in which the tapered portion 2205 extends to be aligned with edges of the cores 2203. In this embodiment the tapered portion 2205 may taper from a first end with a seventh width $W_7$ of between about 0.8 μm and about 2.1 μm (which end is connected to the waveguide 2215) and tapers down to an eighth width $W_8$ of between about 50 nm and about 200 nm. Similarly, the individual cores 2203 may either have a constant width (not separately illustrated in FIG. 22D) or else may taper from the fourth width $W_4$ (e.g., 200 nm) down to the fifth width $W_5$ (e.g., 100 nm). However, any suitable dimensions may be used.

By utilizing multiple cores 2203 as described, the light coming into the first external coupler 2201 through the tapered portion 2205 is coupled to each of the individual cores 2203 that surround the tapered portion 2205. This coupling into the multiple cores 2203 reshapes the wavefront of the light transmitted out of the first external coupler 2201. This reshaping provides a different output wavefront than would have been achieved with a single core edge coupler, and provides a solution to longer distance transmission by increasing the numerical aperture and converging the light during transmission. Such convergence yields similar transmission and receiving modes, yielding higher modal overlapping ratios.

Figure 23:
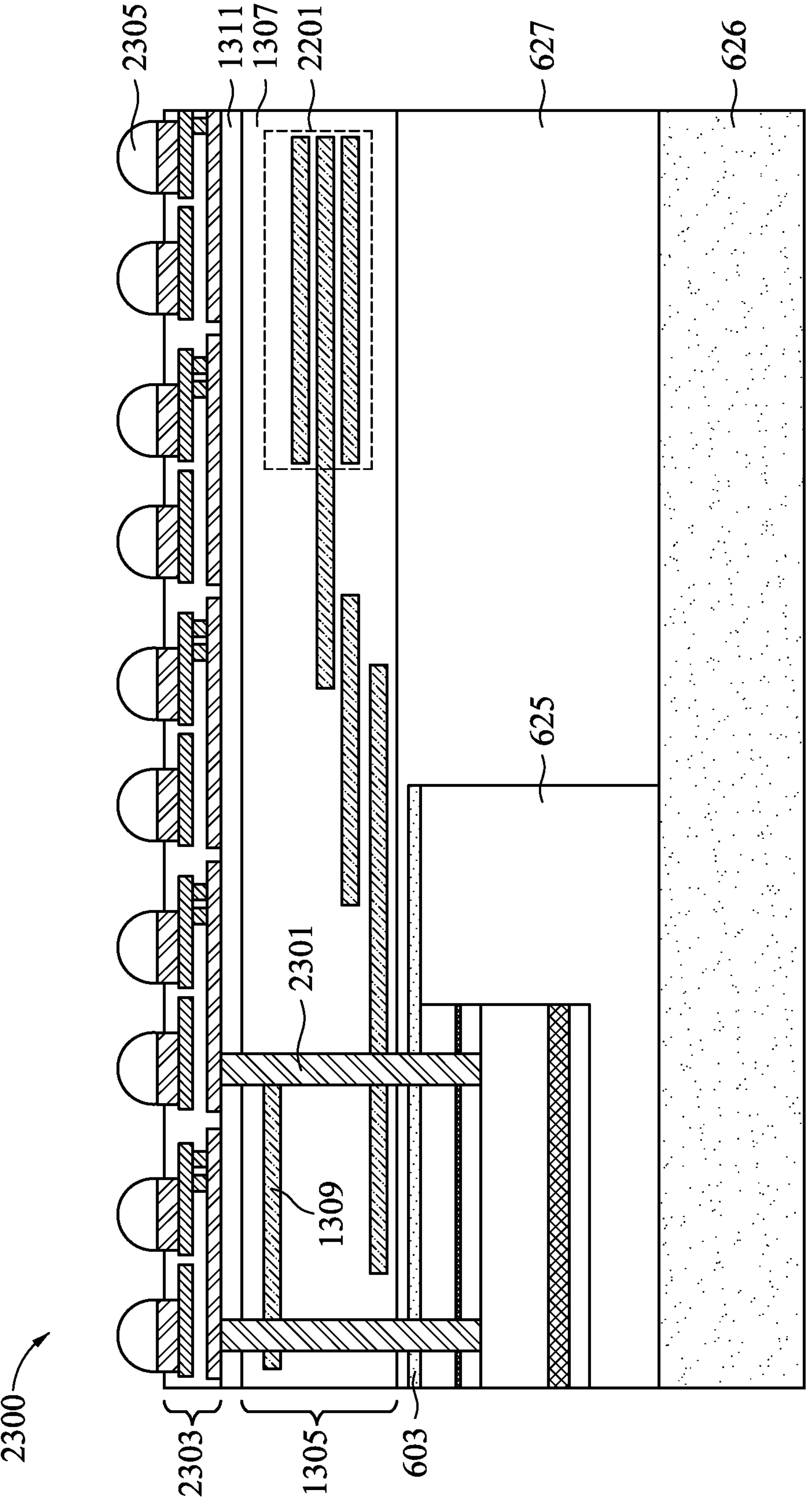

FIG. 23 illustrates a continuation of the process after formation of the multiple cores 2203. In an embodiment, once the second active layers 1305 with the first external coupler 2201 have been formed, second through vias 2301 (similar to the first through device vias 1001), optional sixth metallization layers 2303 (similar to the second metallization layers 1301), and fifth external connectors 2305 (similar to the first external connectors 1003) are formed. In a particular embodiment the second through vias 2301, the optional sixth metallization layers 2303, and the fifth external connectors 2305 (with associated underbump metallizations) may be formed as described above with respect to FIG. 10A. However, any suitable methods and any suitable structures may be utilized.

Figure 24:
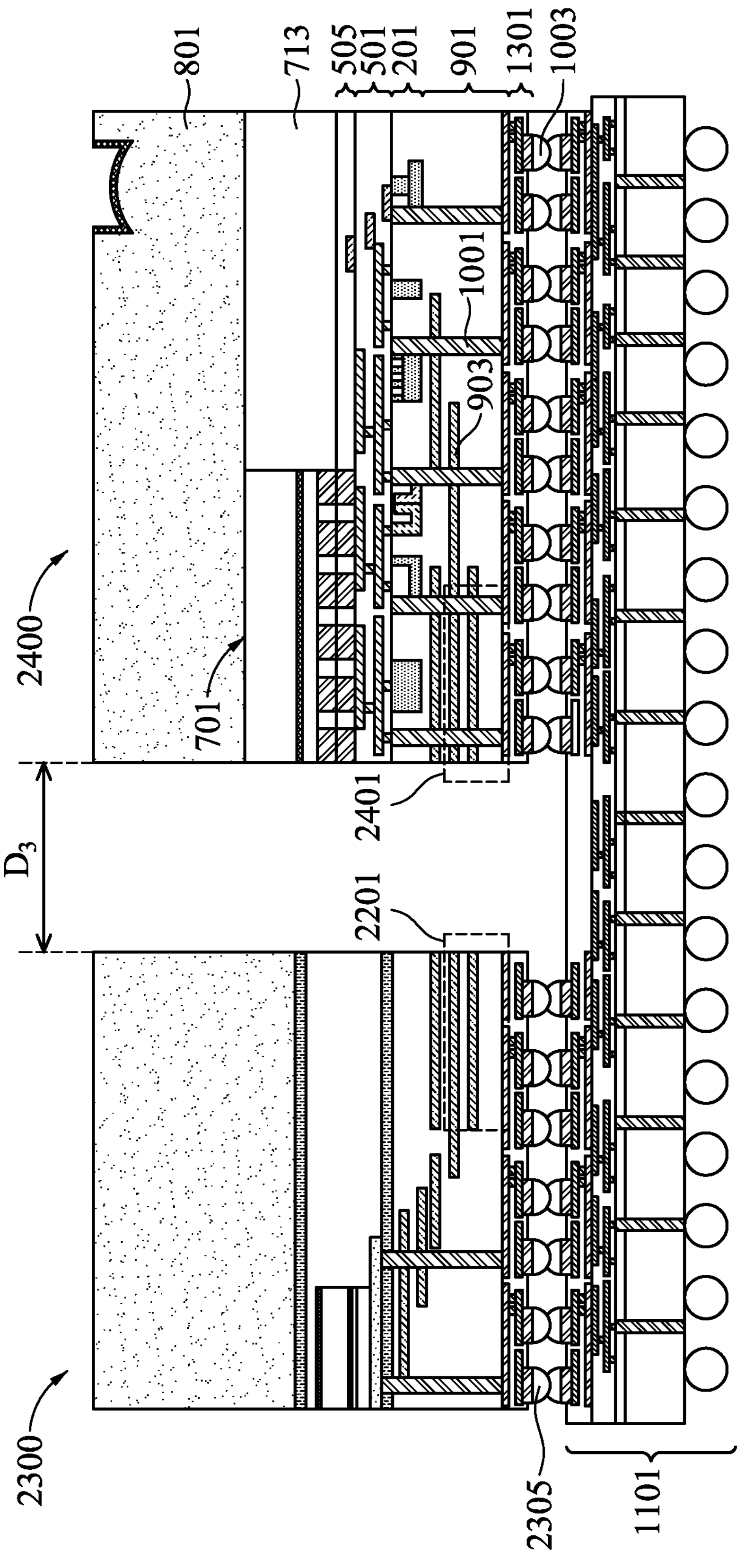

FIG. 24 illustrates that, once the transmission device 2300 has been manufactured, the transmission device 2300 may be bonded to the interposer substrate 1101. In an embodiment the transmission device 2300 may be bonded to the interposer substrate 1101 by aligning and reflow the fifth external connectors 2305. However, any suitable method of bonding may be utilized.

FIG. 24 additionally illustrates bonding of a receiving device 2400 to the interposer substrate 1101. In an embodiment the receiving device 2400 may be formed using similar structures and processes as the formation of the optical interposer 100 as described above with respect to FIG. 10A, but without the formation and placement of the laser die 600 within the receiving device 2400. In particular, the first active layer 201, the first metallization layers 501, the first bonding layers 505 are formed, the first semiconductor device 701 is bonded, the second gap-fill material 713 is deposited without bonding the laser die 600, the support substrate 801 is bonded, and the second active layer 901, the first through device vias 1001, the second metallization layers 1301, and the first external connectors 1003 are formed.

Additionally in this embodiment, the second active layer 901, in addition to being manufactured to include the fourth optical components 903 as described above with respect to FIG. 9, is also manufactured to include a second external coupler (represented in FIG. 24 within the dashed box labeled 2401). In an embodiment the second external coupler 2401 may be similar to the first external coupler 2201, such as by having a plurality of cores 2203 optically coupled to a waveguide portion of the second active layer 901. However, any other suitable external coupler may be utilized.

Once the receiving device 2400 has been formed, the receiving device 2400 may be bonded to the interposer substrate 1101. In an embodiment the receiving device 2400 may be bonded to the interposer substrate 1101 as described above with respect to FIG. 11, such as by using the first external connectors 1003. However, any suitable method of bonding may be utilized.

Additionally in this embodiment, however, during the placement of both the receiving device 2400 and the transmission device 2300, the receiving device 2400 and the transmission device 2300 are placed such that the first external coupler 2201 is aligned with the second external coupler 2401. In a particular embodiment the receiving device 2400 and the transmission device 2300 may be placed a third distance $D_3$ apart from each other, such as a third distance $D_3$ of between about 30 μm and about 80 μm, such as about 40 μm. However, any suitable distance may be utilized.

Figure 25A:
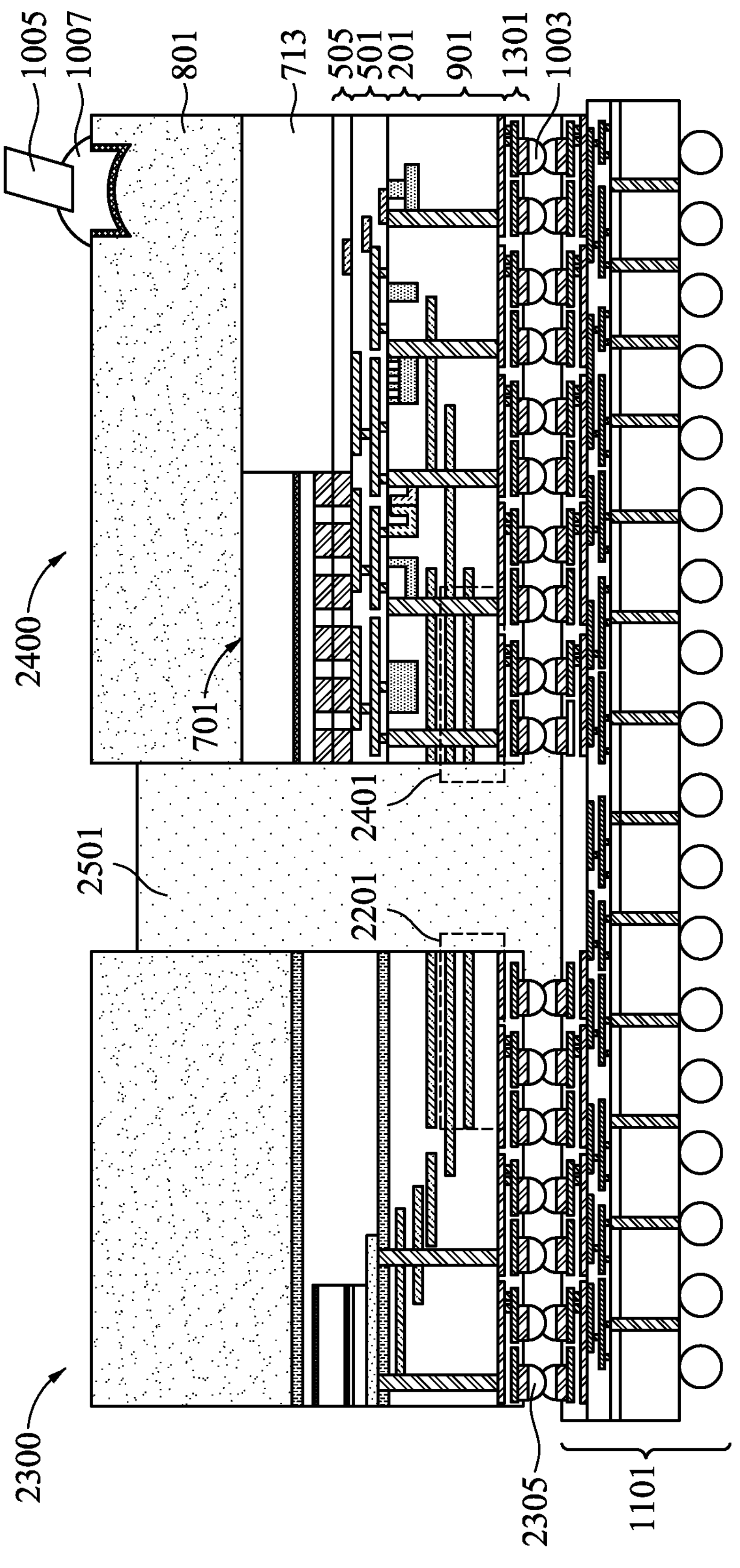

FIG. 25A illustrates that, once the receiving device 2400 and the transmission device 2300 have been bonded to the interposer substrate 1101, the space between the transmission device 2300 and the receiving device 2400 may be at least partially filled with an optical gel 2501. In an embodiment the optical gel 2501 may be similar to the optical glue 1007, such as comprising a polymer material such as epoxy-acrylate oligomers, and may have a refractive index between about 1 and about 3. However, any suitable material may be utilized.

Additionally, once the receiving device 2400 and the transmission device 2300 have been bonded to the interposer substrate 1101, the optical fiber 1005 may be attached to the receiving device 2400. In an embodiment the optical fiber 1005 may be attached as described above with respect to FIG. 10A, such as by using the optical glue 1007. However, any suitable method or means of attachment may be utilized.

During operation, light generated by the laser die 600 is evanescently coupled from the laser to the fifth optical components 1309, which routes the light to the first external coupler 2201. The first external coupler 2201 then evanescently couples the light from the fifth optical components 1309 (e.g., the waveguide) into each of the cores 2203 before the cores 2203 transmit the light out of the transmission device 2300. The cores 2203 support the broadened mode to be guided and allows for long distance propagation through the optical gel 2501 to the receiving device 2400. The second external coupler 2401 within the receiving device 2400 receives the light from the first external coupler 2201 and, through evanescent modal transmission, reshapes the light back into a single waveguide, which then routes the light into the fourth optical components 903, wherein the light can be routed as desired throughout the receiving device 2400.

Figure 25B:
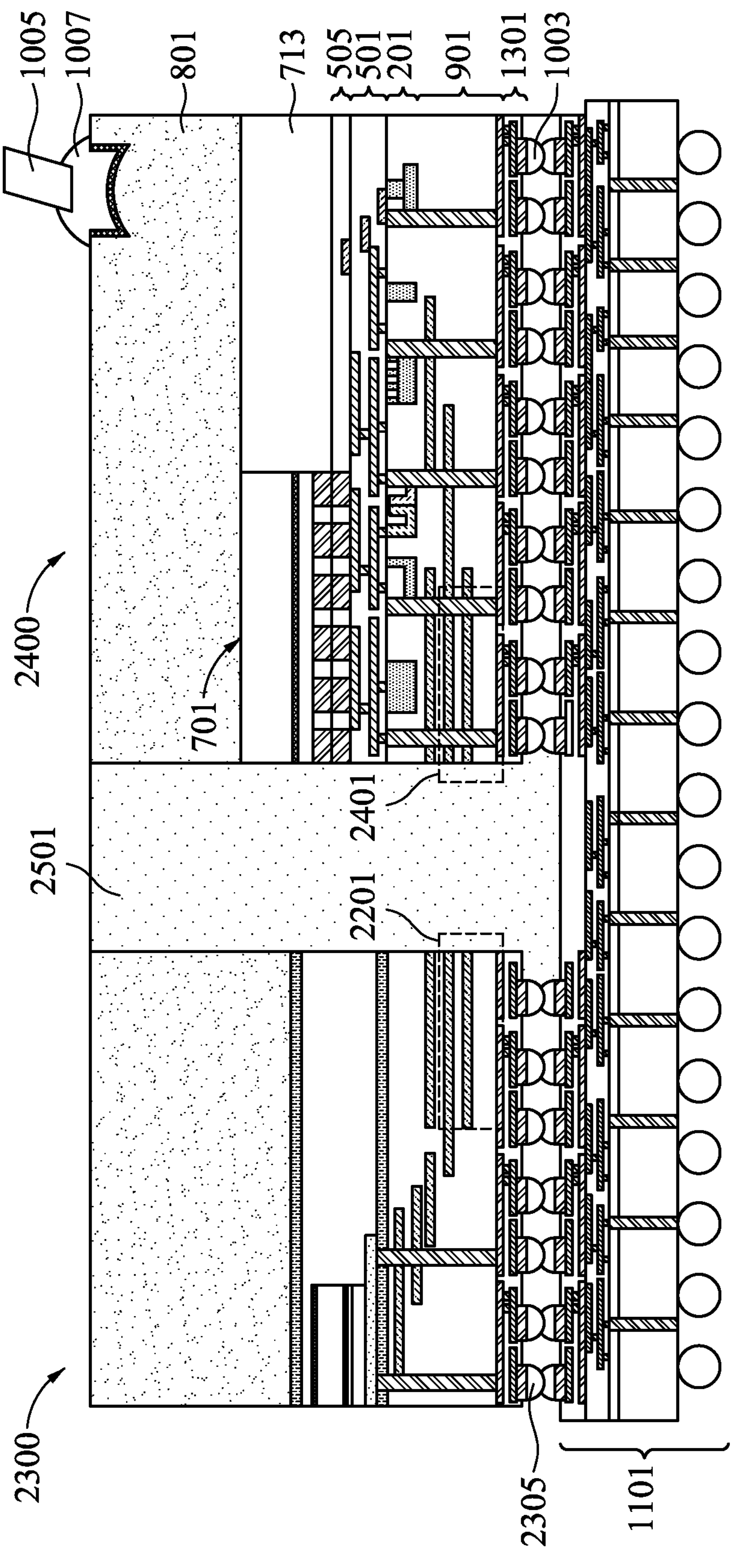

FIG. 25B illustrates another embodiment in which the optical gel 2501, instead of being placed into only a portion of the space between the transmission device 2300 and the receiving device 2400, is instead applied in such a fashion as to completely fill or overfill the space between the transmission device 2300 and the receiving device 2400. As such, the optical gel 2501 may be coplanar or higher than the support substrate 801.

Figure 26:
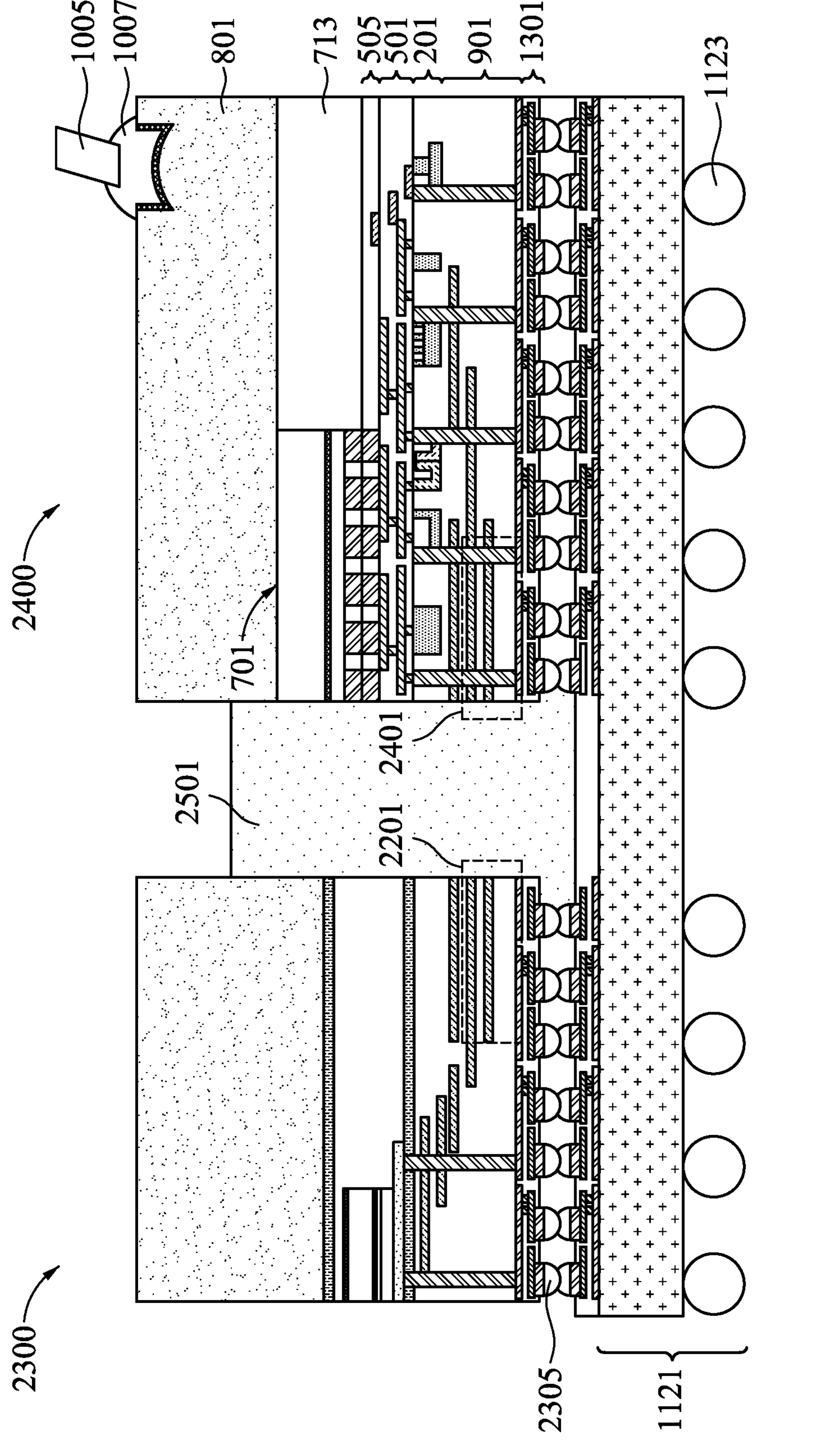

FIG. 26 illustrates another embodiment which uses the first external coupler 2201 and the second external coupler 2401 to transmit light from the transmission device 2300 to the receiving device 2400. In this embodiment, instead of bonding the receiving device 2400 and the transmission device 2300 to the interposer substrate 1101 as discussed above with respect to FIG. 24, the receiving device 2400 and the transmission device 2300 are instead bonded directly to the second substrate 1121. In an embodiment the receiving device 2400 and the transmission device 2300 may be bonded to the second substrate 1121 as described above with respect to FIG. 12, such as by using the first external connectors 1003 and the fifth external connectors 2305. However, any suitable method may be utilized.

Figures 27A, 27B, 27C, 27D, 27E, 27F:
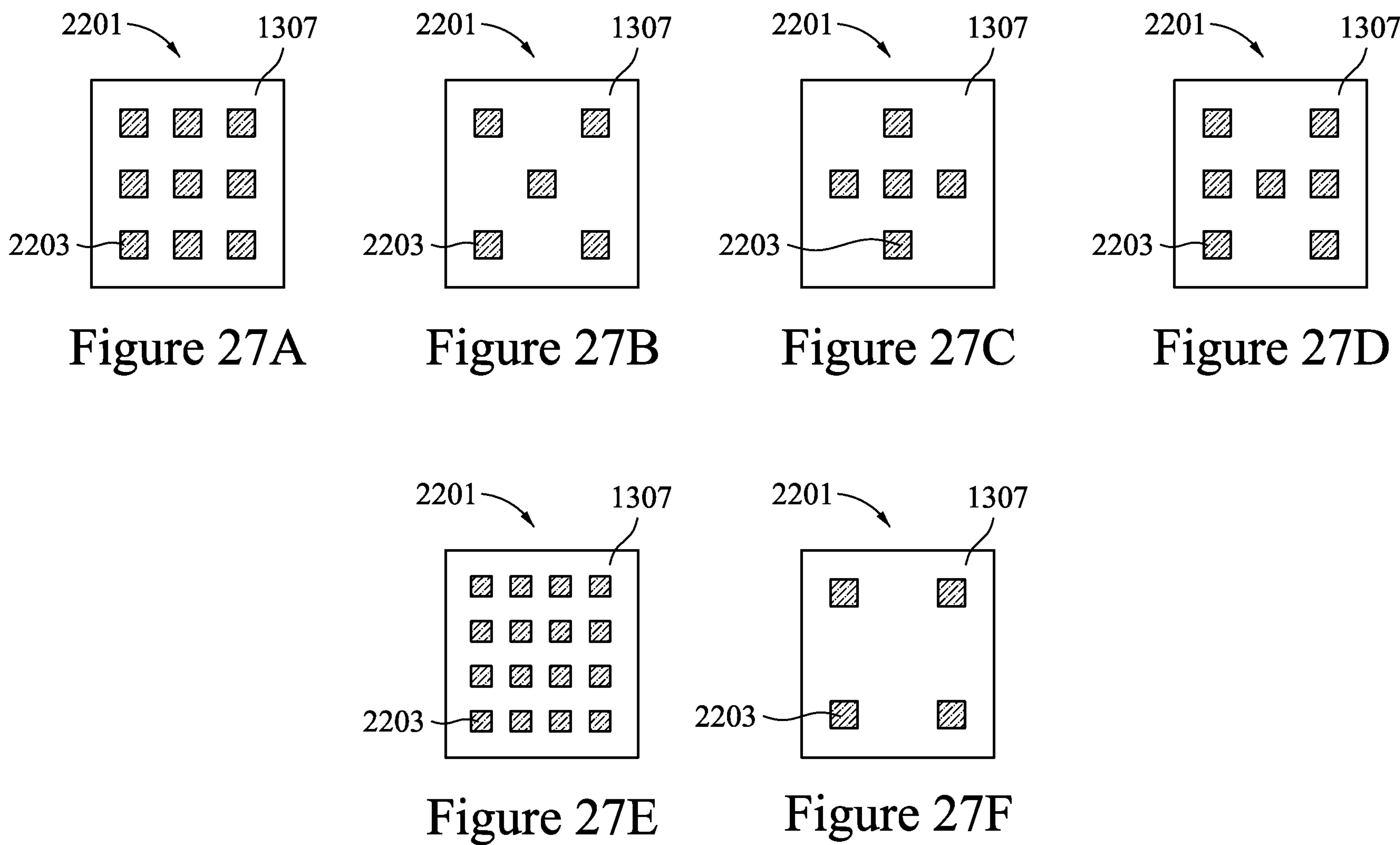

FIGS. 27A-27F illustrate additional embodiments of the first external couplers 2201 (which may also be used as additional embodiments of the second external couplers 2401). In the embodiments illustrated in FIGS. 27A-27F, the plurality of cores 2203 are arranged in such a fashion that the individual cores 2203 are aligned with other ones of the individual cores 2203 in the same columns. For example, FIG. 27A illustrates a 3-3-3 (e.g., 3 rows of individual cores 2203, with each row having 3 individual cores 2203), while FIG. 27B illustrates a 2-1-2 configuration. FIG. 27C illustrates a 1-3-1 configuration, FIG. 27D illustrates a 2-3-2 configuration, FIG. 27E illustrates a 4-4-4-4 configuration, and FIG. 27F illustrates a 2-2 configuration. However, any suitable configuration may be utilized.

Figures 27G, 27H, 27I, 27J, 27K:
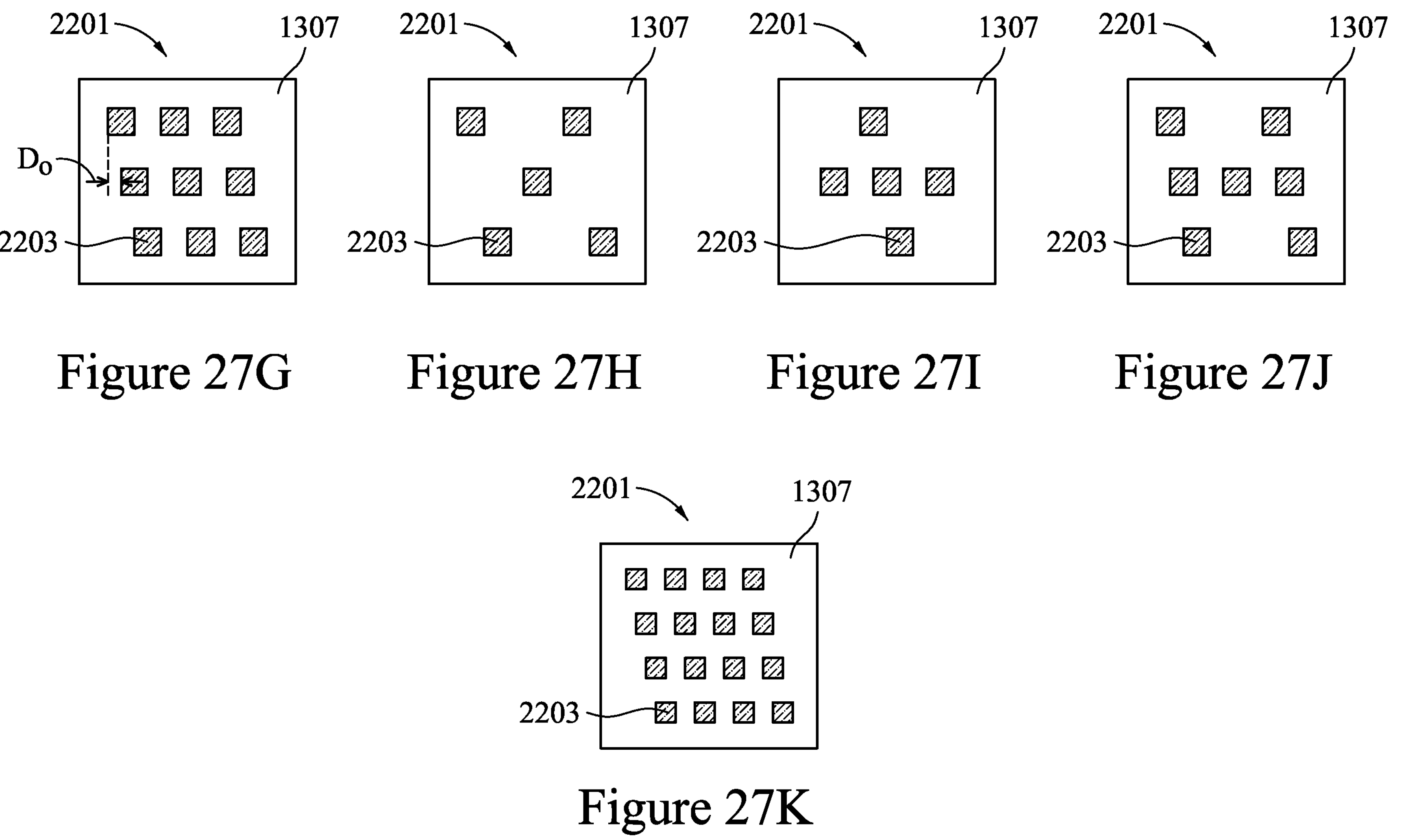

FIGS. 27G-27K illustrate further embodiments of the first external couplers 2201 (which may also be used as additional embodiments of the second external couplers 2401), in which FIG. 27G illustrates a similar configuration as FIG. 27A, FIG. 27H illustrates a similar configuration as FIG. 27B, etc. In the embodiments illustrated in FIGS. 27G-27K, however, the plurality of cores 2203 are arranged in such a fashion that the individual cores 2203 are misaligned with other one of the individual cores 2203 in the same columns. In a particular embodiment cores 2203 in adjacent levels may be offset by a first offset distance $D_o$ of less than about 200 μm. However, any suitable offset distance may be utilized.

During operation of the embodiments utilizing the first external coupler 2201 and the second external coupler 2401, the light generated by the laser die 600 is first evanescently coupled from the laser die to the second active layers 1305 of the fifth optical components 1309 (with, e.g., a coupling efficiency greater than 96%), where it is then reshaped to a wider mode by the first external coupler 2201 located on the side edge of the transmission device 2300. In some embodiments this reshaping could be convergent within 100 μm of traveling inside guideless transmission, and helps to ameliorate the edge coupling scene, causing the light output by the transmission device 2300 to travel in unguided free space with little divergence. The output from the first external coupler 2201 then travels through the optical gel 2501 and meets with the second external coupler 2401, with an efficient transmission of greater than 93%, thereby releasing the trade-off between coupling distance and coupling efficiency.

In one particular example, in an embodiment in which the first external coupler 2201 is in a 3-2-3 configuration (similar to the embodiment illustrated in FIG. 22C), the coupling efficiency at 40 μm may be less than −0.2 dB (which yields a −0.1775 dB at 95%), with a Z offset of +−4.3 μm and a Y offset of +−4.3 μm at an X offset of greater than 100 μm. As such, there is a transmission loss of less than −0.5 dB for even greater than 80 μm of transmission distance.

In another example, in an embodiment in which the first external coupler 2201 is in a 2-2 configuration (similar to the embodiment illustrated in FIG. 27F), where the cores have dimensions of 0.2 μm by 0.15 μm and have a pitch of about 4.2 μm, the coupling efficiency at 40 μm may be less than −0.2 dB (which yields a −0.1775 dB at 95%), with a Z offset of +−6.5 μm and a Y offset of +−6.5 μm at an X offset of greater than 100 μm. As such, TE propagation loss may be about 30% and TM propagation loss may be about 80%, such that there is a transmission loss of less than −0.5 dB for even greater than 80 μm of transmission distance.

Figures 28, 29:
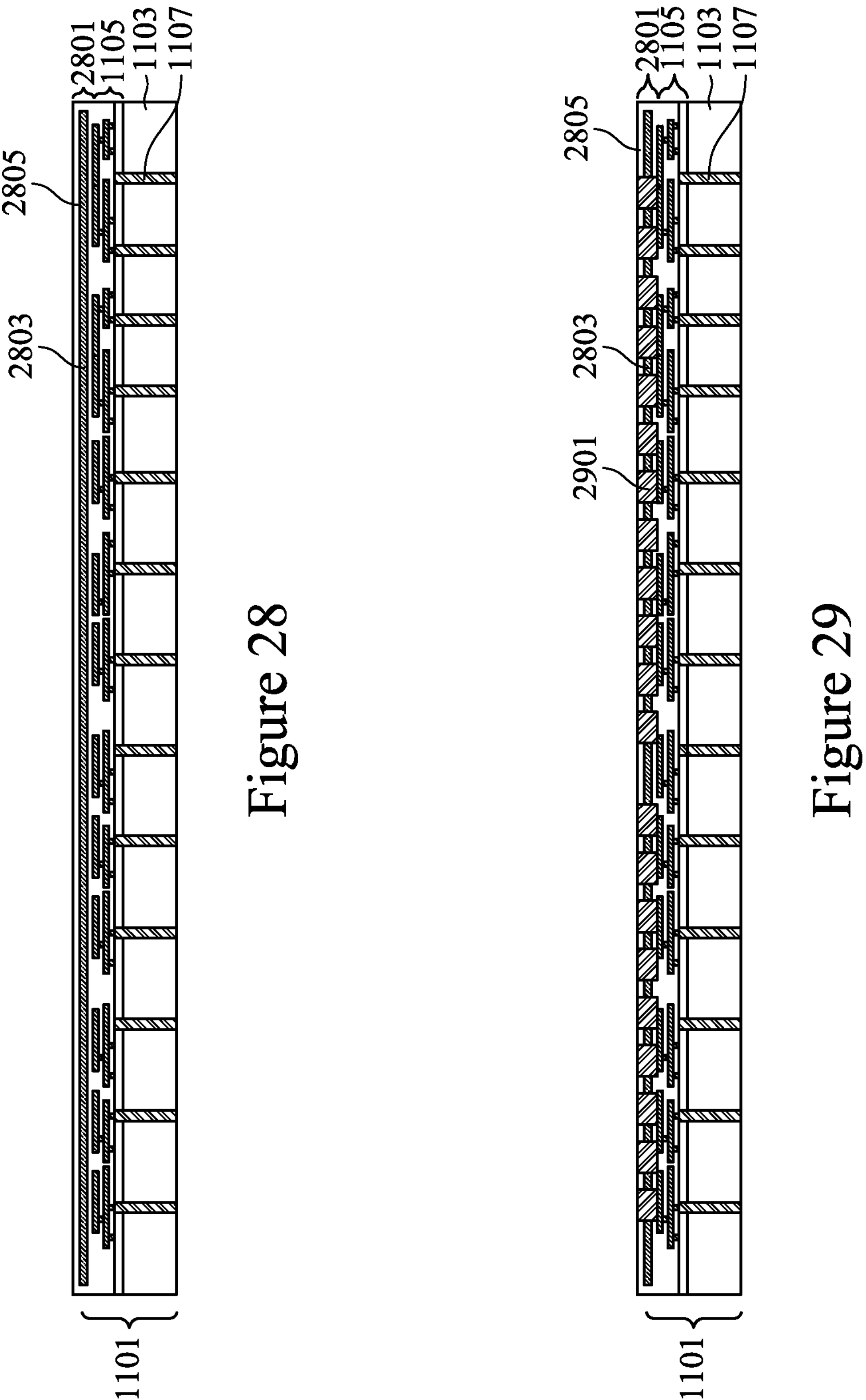
FIGS. 28-35C illustrate formation of an interposer which couples the first transmission device and the second transmission device, in accordance with some embodiments.

FIG. 28 illustrates yet another embodiment in which the laser die 600 is embedded within the transmission device 2300 and the light is transmitted to the receiving device 2400 at least partially through evanescent coupling. In this embodiment, however, instead of transmitting the generated light through the first external coupler 2201, the light is instead evanescently coupled into the interposer substrate 1101. In this embodiment, and looking first at FIG. 28, the interposer substrate 1101 is initially formed as described above with respect to FIG. 11, and includes the semiconductor substrate 1103, the third metallization layers 1105, and the second TDVs 1107. However, any suitable structure and methods may be utilized.

Additionally in this embodiment, once the third metallization layers 1105 have been formed, a second bonding layer 2801 is formed over the third metallization layers 1105. In an embodiment the formation of the second bonding layer 2801 may be started by initially forming sixth optical components 2803 and a second dielectric layer 2805. In an embodiment the sixth optical components 2803 and the second dielectric layer 2805 may be formed using similar processes and similar materials as the third optical components 511 and the first dielectric material 509 described above with respect to FIG. 5. However, any suitable materials and methods may be utilized.

FIG. 29 illustrates that, once the sixth optical components 2803 and the second dielectric layer 2805 have been manufactured, fourth bond pads 2901 are manufactured within the second bonding layer 2801. In an embodiment the fourth bond pads 2901 may be manufactured using similar materials and similar processes as the first bond pads 507 described above with respect to FIG. 5. However, any suitable processes and materials may be utilized.

Figure 30:
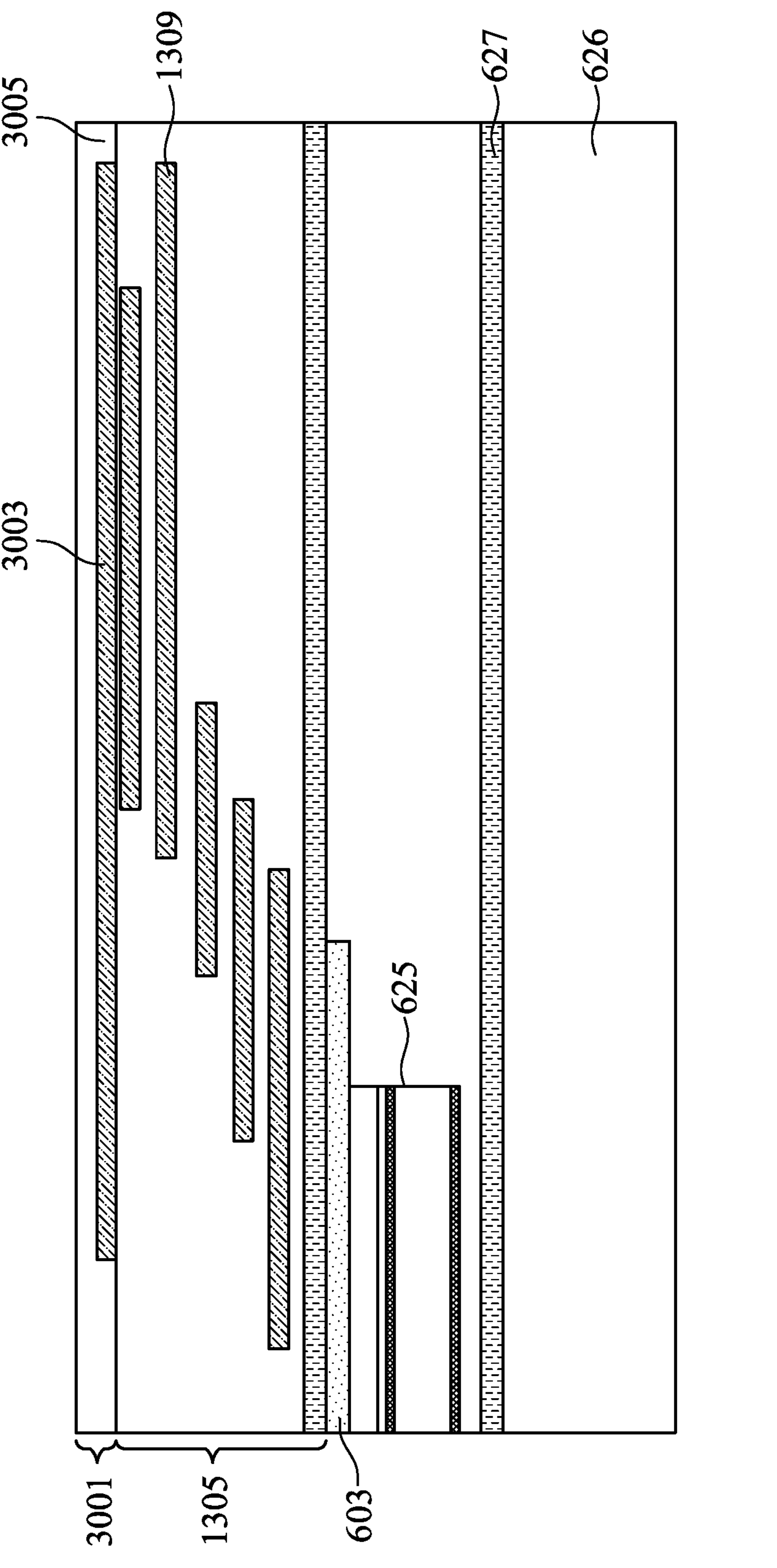

FIG. 30 illustrates preparation of the transmission device 2300 to attach to the interposer substrate 1101 in this embodiment. In an embodiment the formation of the transmission device 2300 in this embodiment may start with a structure similar to the structure illustrated above with respect to FIG. 22A. For example, the laser diode 602 may be manufactured, and the second active layer 1305 of fifth optical components 1309 is manufactured to receive light generated by the laser diode 602.

In this embodiment, however, the first external coupler 2201 is not necessarily formed. Rather, the first external coupler 2201 may be formed or else may be omitted during the manufacture of the transmission device 2300. Additionally, a third bonding layer 3001 (similar to the first bonding layer 505) may be manufactured, with seventh optical components 3003 (similar to the third optical components 511) and a third dielectric material 3005 (similar to the first dielectric material 509), with only the seventh optical components 3003 and the third dielectric material 3005 being illustrated in FIG. 30.

Figure 31A:
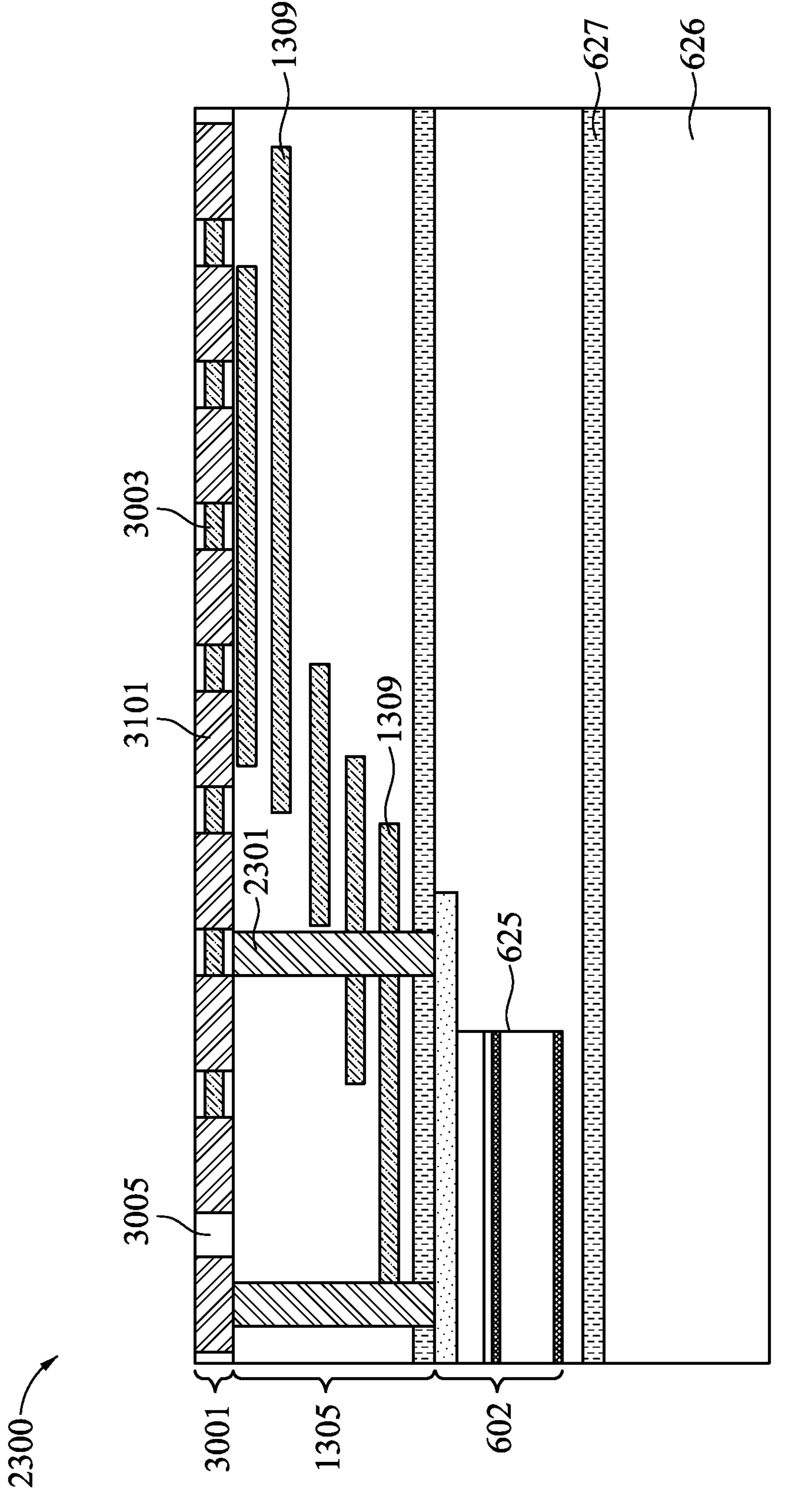

FIG. 31A illustrates a continuation of the process to form the transmission device 2300. In an embodiment, once the seventh optical components 3003 and the third dielectric material 3005 have been manufactured, the second through vias 2301 may be manufactured and the fifth bond pads 3101 may be manufactured in the third bonding layer 3001, such that the seventh optical components 3003 and the fifth bond pads 3101 are both present within the same layer. In an embodiment the fifth bond pads 3101 may be formed using similar processes and materials as described above with respect to the first bond pads 507 described above with respect to FIG. 5. However, any suitable structures and methods may be utilized.

Figure 31B:
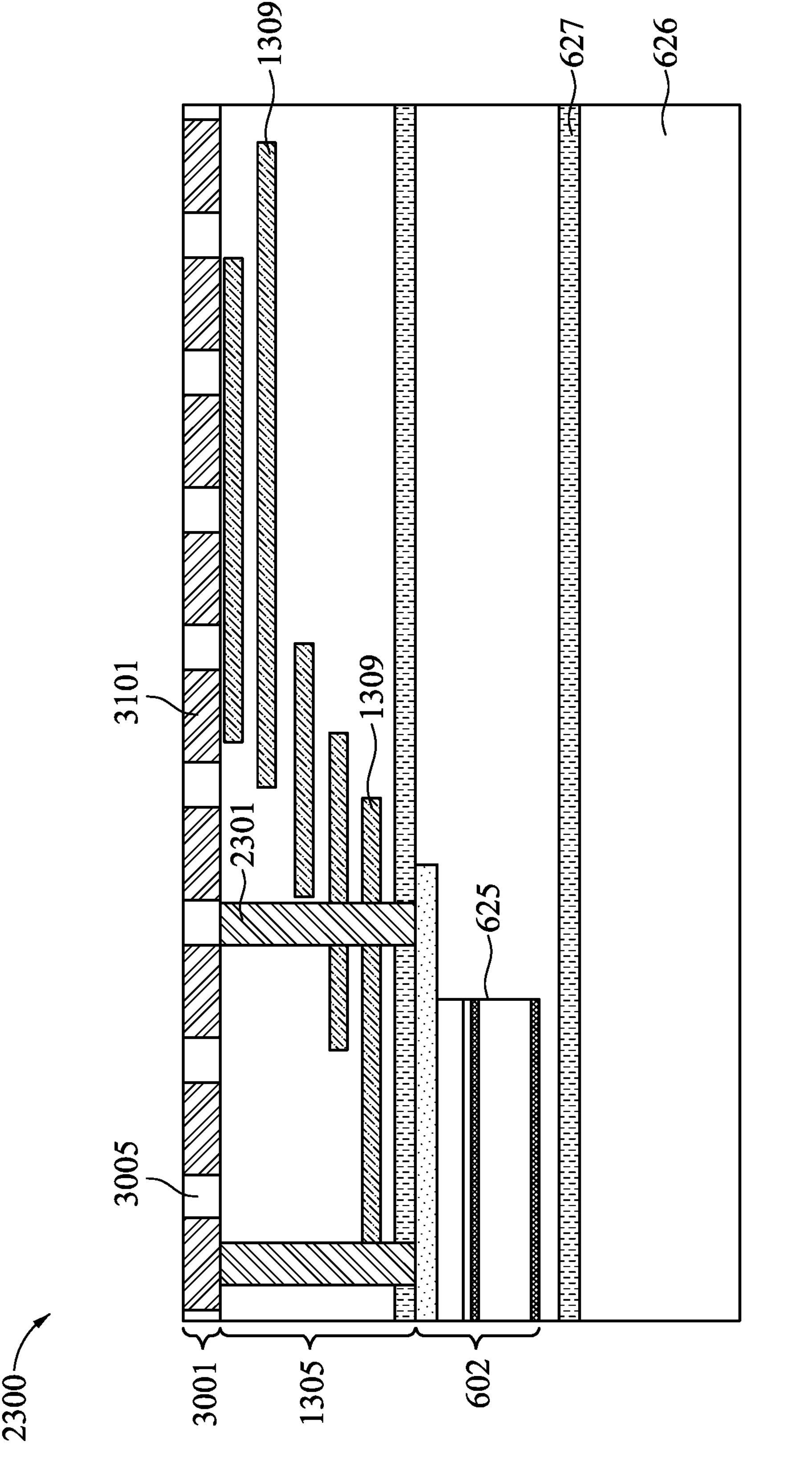

FIG. 31B illustrates another embodiment in which the fifth bond pads 3101 are formed outside of the waveguides. In this embodiment the second active layer 1305 is formed, the third dielectric material 3005 is deposited without formation of the seventh optical components 3003, and the fifth bond pads 3101 are formed within the third dielectric material 3005. However, any suitable methods and materials may be utilized.

Figure 32:
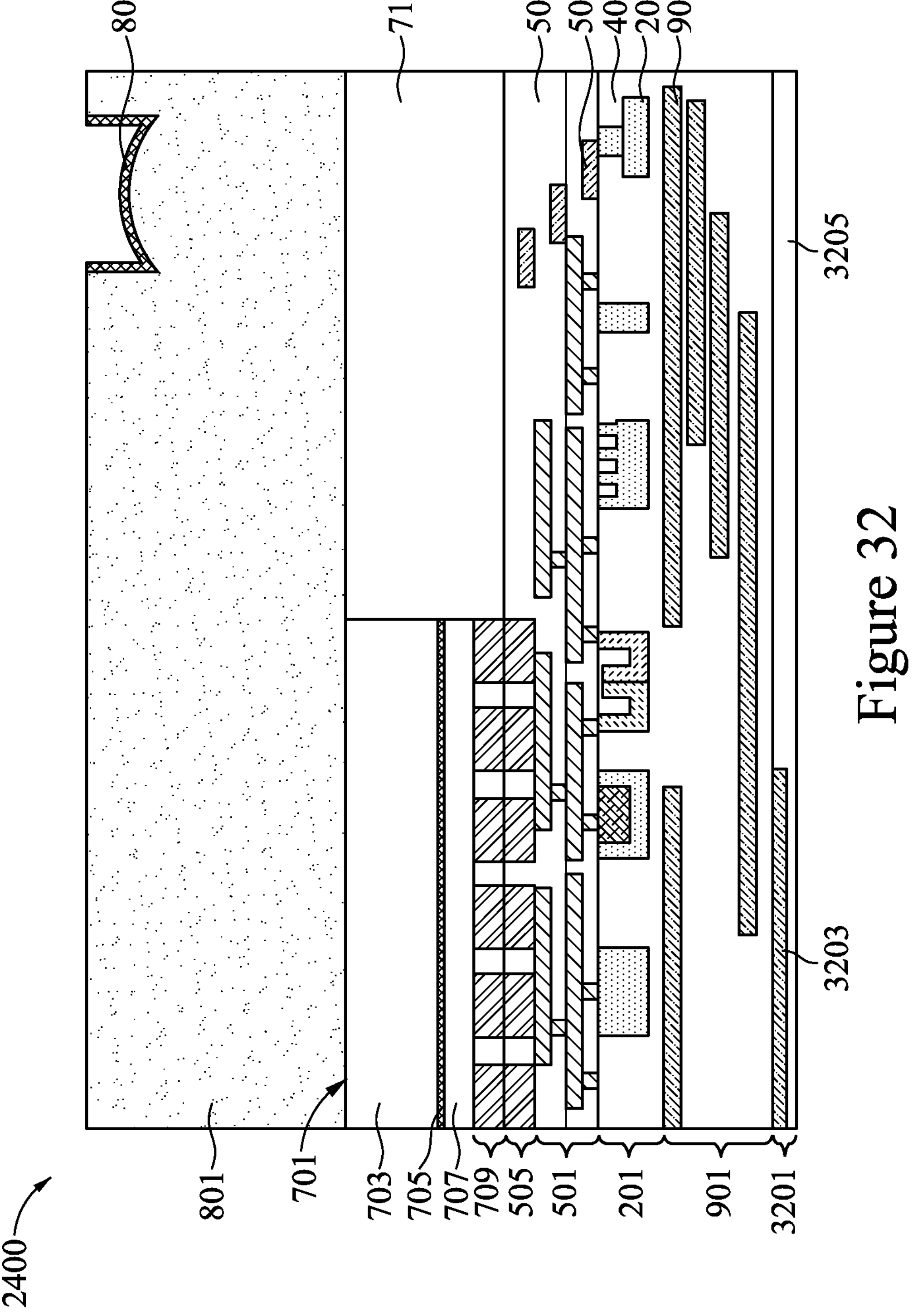

FIG. 32 illustrates a formation of the receiving device 2400 in this embodiment. In an embodiment the manufacturing may be initiated by forming the receiving device 2400 as described above with respect to the structure illustrated in FIG. 9, but without the placement and bonding of the laser die 600. However, any suitable structures and methods of manufacture may be utilized.

Additionally, once the second active layer 901 has been formed, a fourth bonding layer 3201 (similar to the first bonding layer 505) may be manufactured, with eighth optical components 3203 (similar to the third optical components 511) and a fourth dielectric material 3205 (similar to the first dielectric material 509), with only the eighth optical components 3203 and the fourth dielectric material 3205 being illustrated in FIG. 32.

Figure 33:
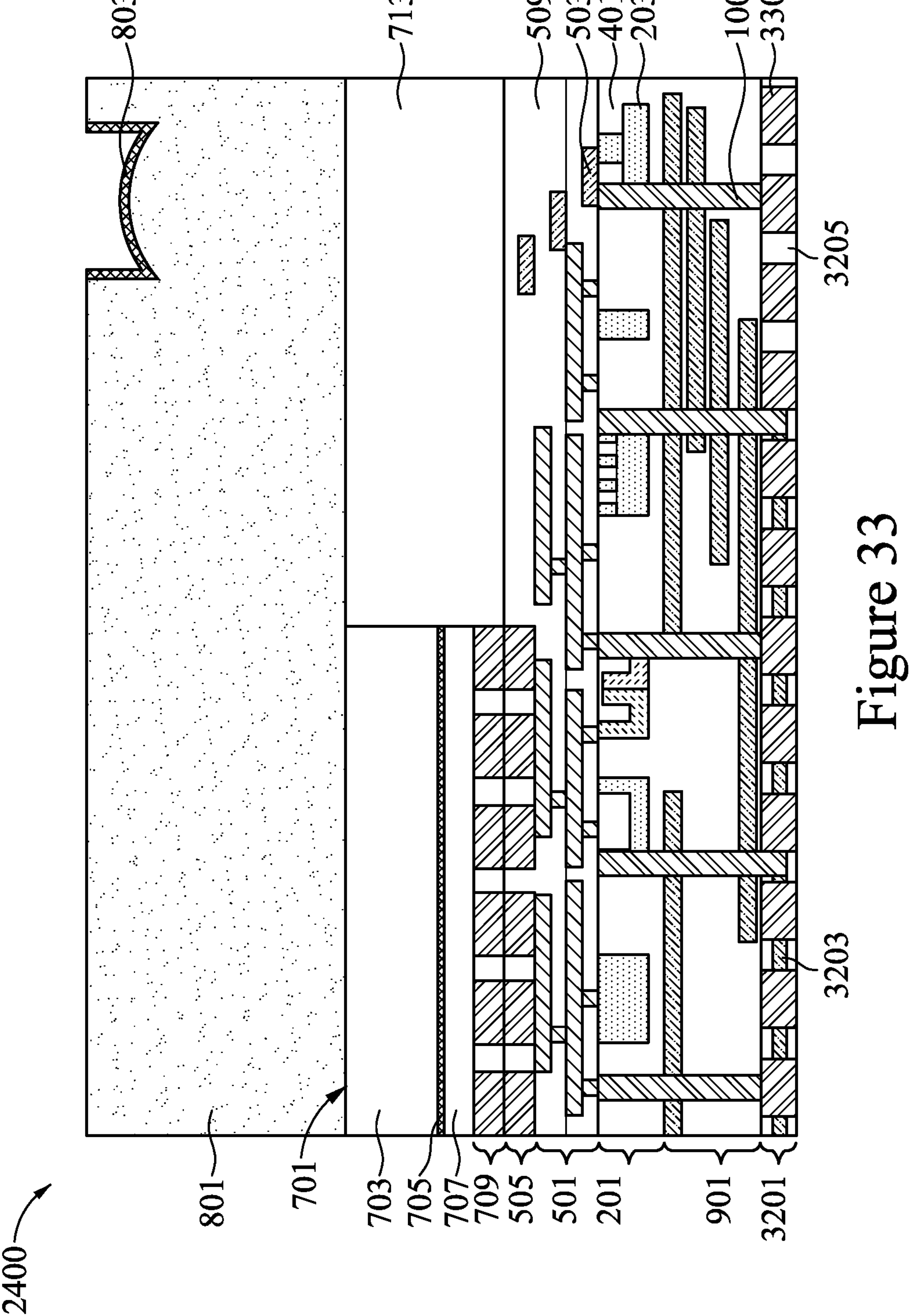

FIG. 33 illustrates that, in this embodiment, once the eighth optical components 3203 and the fourth dielectric material 3205 have been formed, the first through device vias 1001 may be formed. In an embodiment the first through device vias 1001 may be formed as described above with respect to FIG. 10A. However, any suitable method and materials may be utilized.

FIG. 33 additionally illustrates formation of sixth bond pads 3301 as part of the fourth bonding layer 3201. In an embodiment the sixth bond pads 3301 may be formed using similar materials and similar methods as the first bond pads 507 described above with respect to FIG. 5. However, any suitable methods may be utilized.

Figure 34:
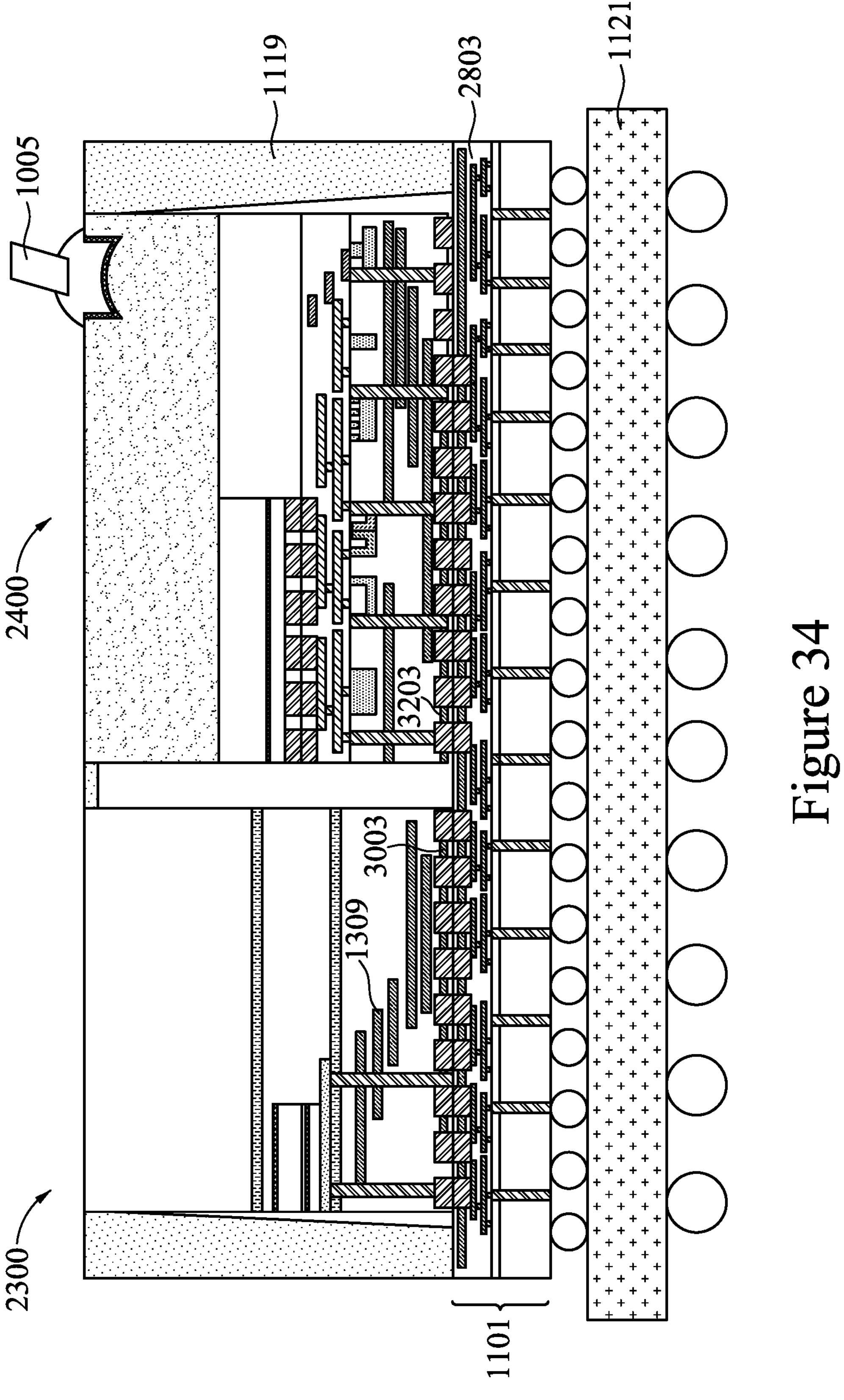

FIG. 34 illustrates a bonding of the transmission device 2300 and the receiving device 2400 with the interposer substrate 1101. In an embodiment each of the transmission device 2300 and the receiving device 2400 may be bonded to the interposer substrate 1101 using, e.g., a dielectric-to-dielectric and a metal-to-metal bonding process, similar to the process described above with respect to FIG. 7. However, any other suitable process, such as a fusion bonding process, may also be utilized.

FIG. 34 additionally illustrates that once the transmission device 2300 and the receiving device 2400 have been bonded to the interposer substrate 1101, the process may be continued. For example, the encapsulant 1119 may be placed around the transmission device 2300 and the receiving device 2400, the interposer substrate 1101 is bonded to the second substrate 1121, and the optical fiber 1005 may be attached.

During operation, light generated by the laser diode 602 embedded within the transmission device 2300 is first coupled into the fifth optical components 1309 and the seventh optical components 3003 within the third bonding layer 3001. From there, the light is evanescently coupled to the sixth optical components 2803 within the interposer substrate 1101, where waveguides within the interposer substrate 1101 route the light to the receiving device 2400, where the light is evanescently coupled into the eighth optical components 3203 of the fourth bonding layer 3201. The light may then be routed around the receiving device 2400 as desired.

As such, the transmission device 2300 and the receiving device 2400 are optically connected by waveguides and evanescent coupling through the interposer substrate 1101. Further, because the coupling is performed in such a fashion, the coupling efficiency between the transmission device 2300 and the receiving device 2400 can be greater than about 96%. Accordingly, most of the optical power is saved and results in efficient energy conversion and usage.

Figures 35A, 35B:
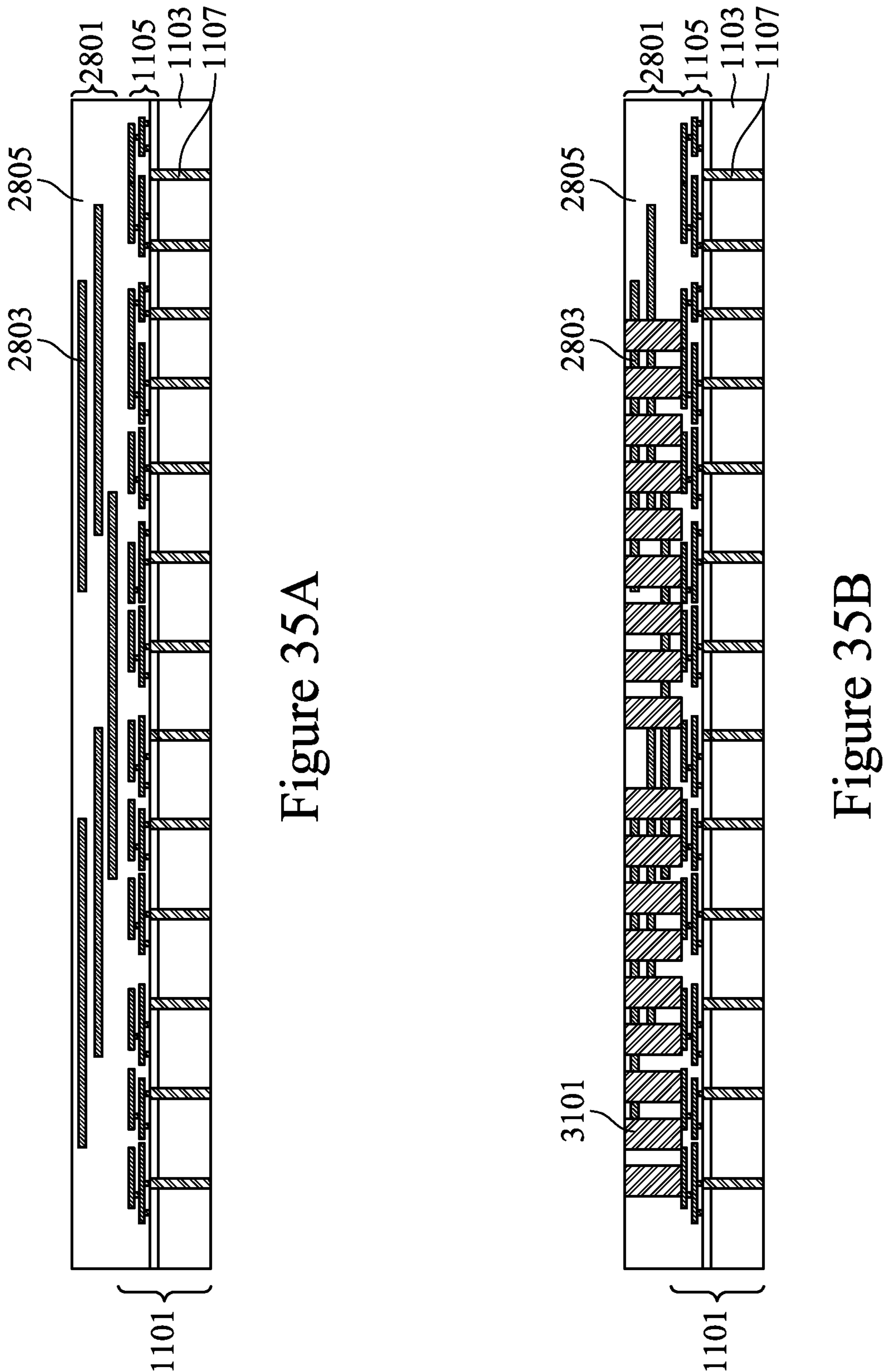
Figure 35C:
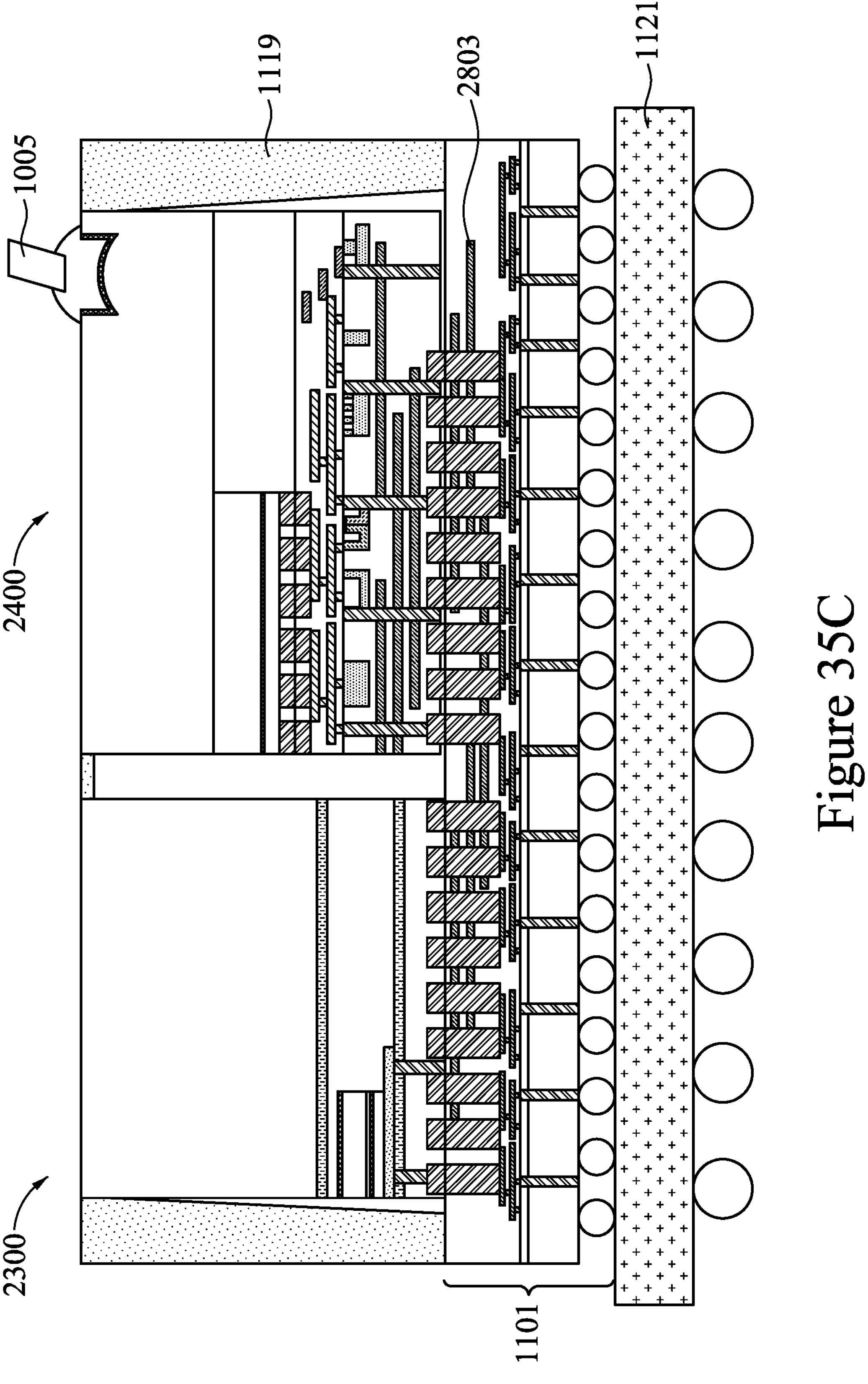

FIGS. 35A-35C illustrate another embodiment in which light is coupled through the interposer substrate 1101. Looking first at FIG. 35A, in this embodiment the sixth optical components 2803 and the second dielectric layer 2805, instead of being within a single layer, are instead formed as multiple layers. As such, there may be three or more layers of the sixth optical components 2803. However, any suitable number of layers of the sixth optical components 2803 and the second dielectric layer 2805 may be formed.

FIG. 35B illustrates a formation of the fifth bond pads 3101. In an embodiment the fifth bond pads 3101 may be formed as described above with respect to FIG. 31A, but are formed to extend through each layer of the sixth optical components 2803 in order to make electrical connection with conductive elements of the third metallization layers 1105. However, any suitable method of formation may be utilized.

FIG. 35C illustrates a continuation of the process, wherein the transmission device 2300 and the receiving device 2400 are bonded and coupled to the interposer substrate 1101. Further, the transmission device 2300 and the receiving device 2400 are encapsulated, and the second substrate 1121 are bonded.

Figures 36A, 36B, 36C:
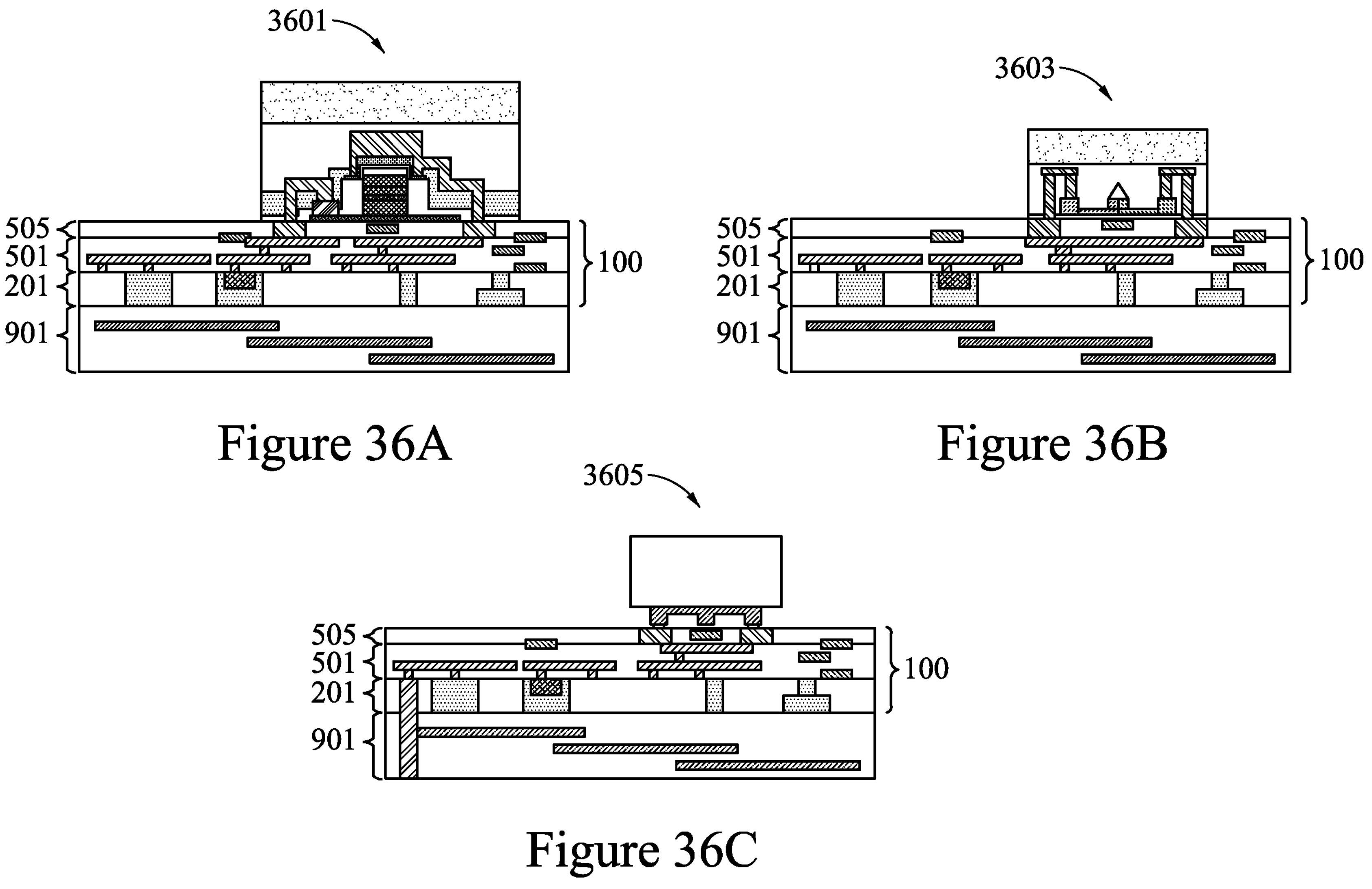
FIGS. 36A-36C illustrate other devices which can be used in addition to the laser die in each embodiment, in accordance with some embodiments.

FIGS. 36A-36C illustrate that, while the embodiments presented above have been presented as they relate to coupling laser dies 600, the ideas presented are not limited to the coupling of laser dies 600. Rather, the ideas presented could be used to couple a wide variety of heterogeneous devices into any of the embodiments described above. For example, FIG. 36A illustrates that evanescent coupling can be used to couple a semiconductor optical amplifier 3601, such as a III-V semiconductor optical amplifier with a stack of materials such as InP, InGaAsP, InAlGaAs, InGaAsP/InP, and InAlAs, to the first bonding layer of the optical interposer 100. Additionally, FIG. 36B illustrates that a silicon germanium-based modulator 3603, with, e.g., germanium overlying a p-n junction of doped silicon, may also be evanescently coupled, while FIG. 36C illustrates that electrical-to-optical converters 3605, such as a lithium niobate modulator, may also be used. All such modulators or similar devices, and all such methods of bonding, may be utilized to interconnect these devices, and all such devices are fully intended to be included within the scope of any of the embodiments presented above with respect to FIGS. 1-35C.

By utilizing the laser die 600 as described above, space that is usually used for the integration of a bulky and over-packaged external laser can be saved. For example, the laser die 600 can be electrically driven by internal metal routing on the interposer substrate 1101 such as the third metallization layers 1105. Additionally, because there is no additional optical fiber coupling such an external laser, the driving power that would otherwise have been loss (e.g., insertion loss through a grating coupler or losses introduced through polarization sensitive passive components) is instead maintained by evanescently coupling the light into the desired optical components, leading to a more energy efficient device.

In an embodiment, a method of manufacturing an optical device includes: receiving a laser die, the laser die comprising a first contact along a first side; bonding the first side of the laser die to an optical interposer, wherein after the bonding the optical interposer comprises a first waveguide adjacent to the laser die and optically coupled to the first contact; and bonding an electrical integrated circuit to the optical interposer. In an embodiment the bonding is performed at least in part with a dielectric-to-dielectric and metal-to-metal bond process. In an embodiment the bonding is performed with a fusion bonding process. In an embodiment the method further includes, after the bonding, forming a through via to the laser die. In an embodiment the method further includes, after the bonding, forming optical components on an opposite side of the optical interposer from the laser die. In an embodiment the method further includes bonding the optical interposer to an interposer substrate. In an embodiment the method further includes bonding the optical interposer to an integrated fan out substrate.

In another embodiment, a method of manufacturing an optical device includes: forming a laser die with a laser diode; forming an external cavity separately from the laser diode; bonding the laser die to an optical interposer, wherein after the bonding the laser diode is coupled with the external cavity; and bonding a first semiconductor device to the optical interposer. In an embodiment the bonding bonds a first conductive portion of the laser die with a second conductive portion of the optical interposer. In an embodiment the bonding process is a fusion bonding process. In an embodiment the method further includes forming a through via through the optical interposer to the laser die. In an embodiment the forming the external cavity forms the external cavity as part of the optical interposer. In an embodiment the forming the external cavity forms the external cavity as part of the laser die. In an embodiment the forming the external cavity forms the external cavity in a ring-bus-ring formation.

In yet another embodiment a method of manufacturing an optical device includes: forming a transmission device, the forming the transmission device including: forming a laser diode; depositing a gap fill material around the laser diode; and forming a first layer of optical components, the first layer of optical components comprising a first external coupler; forming a receiving device, the forming the receiving device including: forming an optical interposer; bonding a first semiconductor device to the optical interposer; and forming a second layer of optical components, the second layer of optical components comprising a second external coupler; and bonding the transmission device and the receiving device to an interposer substrate, wherein after the bonding the transmission device and the receiving device the first external coupler is aligned with the second external coupler. In an embodiment the method further includes transmitting light from the first external coupler to the second external coupler. In an embodiment the first external coupler is a multi-core edge coupler. In an embodiment the multi-core edge coupler comprises eight cores in a 3-2-3 configuration. In an embodiment the multi-core edge coupler comprises multiples columns of cores, wherein cores in each column are aligned with each other. In an embodiment the multi-core edge coupler comprises multiples columns of cores, wherein cores in each column are mis-aligned with each other.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing an optical device, the method comprising:

receiving a laser die, the laser die comprising a first contact along a first side; side, the first side being planar from a first side to a second side opposite the first side;

bonding the first side of the laser die to an optical interposer, wherein after the bonding the optical interposer comprises a first waveguide adjacent to the laser die and optically coupled to the first contact; and bonding an electrical integrated circuit to the optical interposer.

2. The method of claim 1, wherein the bonding the first side of the laser die is performed at least in part with a dielectric-to-dielectric and metal-to-metal bond process.

3. The method of claim 1, wherein the bonding is performed with a fusion bonding process.

4. The method of claim 3, further comprising, after the bonding, forming a through via to the laser die.

5. The method of claim 1, further comprising, after the bonding, forming optical components on an opposite side of the optical interposer from the laser die.

6. The method of claim 1, further comprising bonding the optical interposer to an interposer substrate.

7. The method of claim 1, further comprising bonding the optical interposer to an integrated fan out substrate.

8. An optical device comprising:

a laser die, the laser die comprising a first contact along a first side;

an optical interposer with a planar second side, the planar second side being bonded to the first side of the laser die, wherein the optical interposer comprises a first waveguide adjacent to the laser die and optically coupled to the first contact; and an electrical integrated circuit bonded to the planar second side of the optical interposer.

9. The optical device of claim 8, wherein the optical interposer is bonded to the laser die with a dielectric-to-dielectric bond and a metal-to-metal bond.

10. The optical device of claim 8, wherein the optical interposer is bonded to the laser die with a fusion bond.

11. The optical device of claim 10, wherein a through via is connected to the laser die.

12. The optical device of claim 8, further comprising optical components located on an opposite side of the optical interposer from the laser die.

13. The optical device of claim 8, further comprising an integrated fan out substrate bonded to the optical interposer.

14. An optical device comprising:

a laser die, the laser die comprising a first contact along a first side;

an electrical integrated circuit adjacent to the laser die; and an optical interposer physically bonded to both the electrical integrated circuit and the laser, die along a planar surface, wherein the optical interposer comprises a first waveguide adjacent to the laser die and coupled to the first contact.

15. The optical device of claim 14, wherein the optical interposer is physically bonded to the electrical integrated circuit with a dielectric-to-dielectric and metal-to-metal bond.

16. The optical device of claim 14, wherein the optical interposer is physically bonded to the laser die with a dielectric-to-dielectric and metal-to-metal bond.

17. The optical device of claim 14, further comprising an encapsulant extending between the laser die and the electrical integrated circuit.

18. The optical device of claim 17, further comprising a support substrate bonded to the laser die, the electrical integrated circuit, and the encapsulant.

19. The optical device of claim 18, wherein the support substrate comprises a lens.

20. The optical device of claim 14, wherein the optical interposer comprises external connections.

* * * * *